US011702205B2

(12) United States Patent
Young et al.

(10) Patent No.: US 11,702,205 B2
(45) Date of Patent: Jul. 18, 2023

(54) MONUMENT HAVING ATTACHMENT SYSTEM WITH CORNER BRACKET FITTING

(71) Applicant: The Boeing Company, Chicago, IL (US)

(72) Inventors: Stephen M. Young, Long Beach, CA (US); Saul Ramirez, Long Beach, CA (US); Joshua Youngmin Baek, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 366 days.

(21) Appl. No.: 16/900,460

(22) Filed: Jun. 12, 2020

(65) Prior Publication Data

US 2021/0387728 A1    Dec. 16, 2021

(51) Int. Cl.
| | | |
|---|---|---|
| *B64D 11/00* | (2006.01) | |
| *B64F 5/10* | (2017.01) | |
| *B64C 1/14* | (2006.01) | |
| *B64C 1/18* | (2006.01) | |
| *B64D 11/04* | (2006.01) | |
| *E05B 85/04* | (2014.01) | |
| *F16B 5/00* | (2006.01) | |

(52) U.S. Cl.
CPC ............ *B64D 11/00* (2013.01); *B64C 1/1407* (2013.01); *B64C 1/18* (2013.01); *B64D 11/04* (2013.01); *B64F 5/10* (2017.01); *E05B 85/04* (2013.01); *F16B 5/0004* (2013.01)

(58) Field of Classification Search
CPC ... B64D 11/00; B64D 2011/046; B64D 11/04; F16B 2012/466
See application file for complete search history.

(56) References Cited

U.S. PATENT DOCUMENTS

| | | | | |
|---|---|---|---|---|
| 4,265,423 A | | 5/1981 | Vecchiarelli | |
| 4,558,797 A | * | 12/1985 | Mitchell | ................ B65D 90/08 |
| | | | | 52/282.4 |
| 5,580,181 A | | 12/1996 | Nomura | |

(Continued)

FOREIGN PATENT DOCUMENTS

| | | |
|---|---|---|
| DE | 2925744 A1 | 1/1980 |
| DE | 3711222 A1 | 10/1987 |

(Continued)

OTHER PUBLICATIONS

Extended European Search Report dated Oct. 19, 2021 regarding EP Application No. 21169490.6; 8 pages.

(Continued)

*Primary Examiner* — Philip J Bonzell
(74) *Attorney, Agent, or Firm* — Yee & Associates, P.C.

(57) ABSTRACT

A monument is presented. The monument comprises a floor panel; a left face panel perpendicular to the floor panel; a right face panel perpendicular to the floor panel; and an attachment system connecting the floor panel, the left face panel, and the right face panel. The attachment system comprises a right corner bracket fitting connecting the right face panel to the floor panel; a left corner bracket fitting connecting the left face panel to the floor panel; and a filler panel connected to and extending between the right corner bracket fitting and the left corner bracket fitting.

28 Claims, 32 Drawing Sheets

(56) References Cited

U.S. PATENT DOCUMENTS

| | | | |
|---|---|---|---|
| D378,988 S | 4/1997 | Brown et al. | |
| 6,350,000 B1 * | 2/2002 | Van Benthem | E04H 1/1238 312/236 |
| D564,880 S | 3/2008 | Chang | |
| D626,823 S | 11/2010 | Wood | |
| D678,045 S | 3/2013 | Paolini | |
| 8,540,201 B2 | 9/2013 | Gadd et al. | |
| D712,816 S | 9/2014 | Maholick | |
| D723,294 S | 3/2015 | O'Hara | |
| 8,973,769 B2 * | 3/2015 | Huber | B65D 90/08 220/691 |
| D730,804 S | 6/2015 | Cuddy et al. | |
| D732,862 S | 6/2015 | Lloyd | |
| 9,316,015 B1 | 4/2016 | Elliott | |
| 9,322,180 B2 | 4/2016 | Burt et al. | |
| 9,679,102 B2 | 6/2017 | Lindgren et al. | |
| 9,919,799 B2 | 3/2018 | Altmyer et al. | |
| 10,112,719 B2 | 10/2018 | McIntosh et al. | |
| 10,124,743 B2 | 11/2018 | Talebpour et al. | |
| 10,124,897 B2 | 11/2018 | Talebpour et al. | |
| 10,260,541 B2 | 4/2019 | Lewis et al. | |
| D855,525 S | 8/2019 | Schwartz et al. | |
| D857,480 S | 8/2019 | Ryan | |
| 10,443,635 B2 | 10/2019 | Cuddy | |
| D866,305 S | 11/2019 | Mercier et al. | |
| 10,486,832 B2 | 11/2019 | Abelon et al. | |
| 10,577,074 B2 | 3/2020 | King | |
| 10,633,119 B1 | 4/2020 | Smirnov | |
| D906,788 S | 1/2021 | Ochi | |
| 2004/0155002 A1 * | 8/2004 | Toma | F16B 12/50 211/183 |
| 2006/0226288 A1 | 10/2006 | Vetillard et al. | |
| 2012/0153080 A1 * | 6/2012 | Duggar | B64D 9/003 244/118.1 |
| 2013/0259562 A1 | 10/2013 | Burd | |
| 2014/0131371 A1 * | 5/2014 | Huber | B23P 19/04 220/691 |
| 2014/0151254 A1 * | 6/2014 | Huber | B23P 19/04 206/386 |
| 2014/0312167 A1 | 10/2014 | Rupp et al. | |
| 2017/0094951 A1 | 4/2017 | Keller | |
| 2019/0301504 A1 | 10/2019 | Nelson | |
| 2020/0305597 A1 | 10/2020 | Briosi | |

FOREIGN PATENT DOCUMENTS

| | | | | |
|---|---|---|---|---|
| DE | 102015116585 A1 | | 3/2017 | |
| DE | 102016221111 A1 | | 4/2018 | |
| EP | 0867365 A2 | | 9/1998 | |
| EP | 2465774 A1 | * | 6/2012 | ......... B64D 11/0023 |
| EP | 2848526 A1 | | 3/2015 | |
| GB | 2275938 A | * | 9/1994 | ............ E04B 1/003 |
| KR | 101571264 B1 | * | 1/2006 | ............ F16B 312/10 |
| WO | 2012168305 A1 | | 12/2012 | |
| WO | 2015127925 A1 | | 9/2015 | |

OTHER PUBLICATIONS

Notice of Allowance dated Sep. 29, 2021 regarding Design U.S. Appl. No. 29/737,958; 15 pages.

* cited by examiner

MONUMENT HAVING ATTACHMENT SYSTEM WITH CORNER BRACKET FITTING

BACKGROUND INFORMATION

1. Field

The present disclosure relates generally to monuments in platforms and more specifically to attaching monuments to tracks in platforms. The present disclosure provides an attachment system and methods for attaching a monument with a reduced width.

2. Background

Monuments are used within platforms to provide storage or separation within the platform. Monuments can be attached to a floor structure in any desirable fashion. In aircraft, conventional monument attachment systems limit the size of monuments that can be provided.

Therefore, it would be desirable to have a method and apparatus that takes into account at least some of the issues discussed above, as well as other possible issues.

SUMMARY

An embodiment of the present disclosure provides a monument. The monument comprises a floor panel, a left face panel perpendicular to the floor panel, a right face panel perpendicular to the floor panel, and an attachment system connecting the floor panel, the left face panel, and the right face panel. The attachment system comprises a right corner bracket fitting connecting the right face panel to the floor panel, a left corner bracket fitting connecting the left face panel to the floor panel, and a filler panel connected to and extending between the right corner bracket fitting and the left corner bracket fitting.

Another embodiment of the present disclosure provides an attachment system. The attachment system comprises a right corner bracket fitting configured to be joined to and connect a right face panel to a floor panel, a left corner bracket fitting configured to be joined to and connect a left face panel to a floor panel, and a filler panel configured to be connected to and extend between the right corner bracket fitting and the left corner bracket fitting.

Yet another embodiment of the present disclosure provides a corner bracket fitting. The corner bracket fitting comprises a structural body with a seat track interface, a floor panel structural attachment comprising a flange extending from the structural body, a face panel structural attachment comprising a flange extending from the structural body and substantially perpendicular to the floor panel structural attachment, and a filler panel structural attachment comprising a flange extending from the structural body and substantially perpendicular to both the face panel structural attachment and the floor panel structural attachment.

Another embodiment of the present disclosure provides a method of forming a monument. A floor panel structural attachment of a right corner bracket fitting is fastened to a floor panel. A floor panel structural attachment of a left corner bracket fitting is fastened to the floor panel. A face panel structural attachment of the right corner bracket fitting is fastened to a right face panel. A face panel structural attachment of the left corner bracket fitting is fastened to a left face panel. A filler panel is fastened to a filler panel attachment of the right corner bracket fitting and a filler panel attachment of the left corner bracket fitting such that the filler panel extends between the right corner bracket fitting and the left corner bracket fitting.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations. For example, the illustrative examples recognize and take into account that commercial aircraft utilize interior monuments to provide storage for emergency equipment, passenger amenities, and other items that may be brought on board. The illustrative examples recognize and take into account that in many cases, these monuments utilize the seat tracks within the aircraft to provide structural attachments. Usually, the monument lies over the seat tracks so that its floor fittings are arranged in an orientation perpendicular to the seat tracks.

The illustrative examples recognize and take into account that in other cases, a fixed wall lies directly above the seat track, which allows for the structural fittings to be oriented parallel to the seat tracks. Typically, monuments of this type are accessed from the FWD or AFT direction, and there is no access from the aisle face of the monument. The illustrative examples recognize and take into account that in some cases, it is desirable to provide access to a monument from the aircraft aisle. The illustrative examples recognize and take into account that in some cases, it is desirable to provide monuments with reduced widths. The illustrative examples recognize and take into account that in some cases, it is desirable to provide a monument with reduced width while utilizing a common set of standard parts.

Monuments of the illustrative examples can have a reduced width compared to monuments with conventional attachment system. Monuments of the illustrative examples can have aisle-facing doors.

Figure 1:
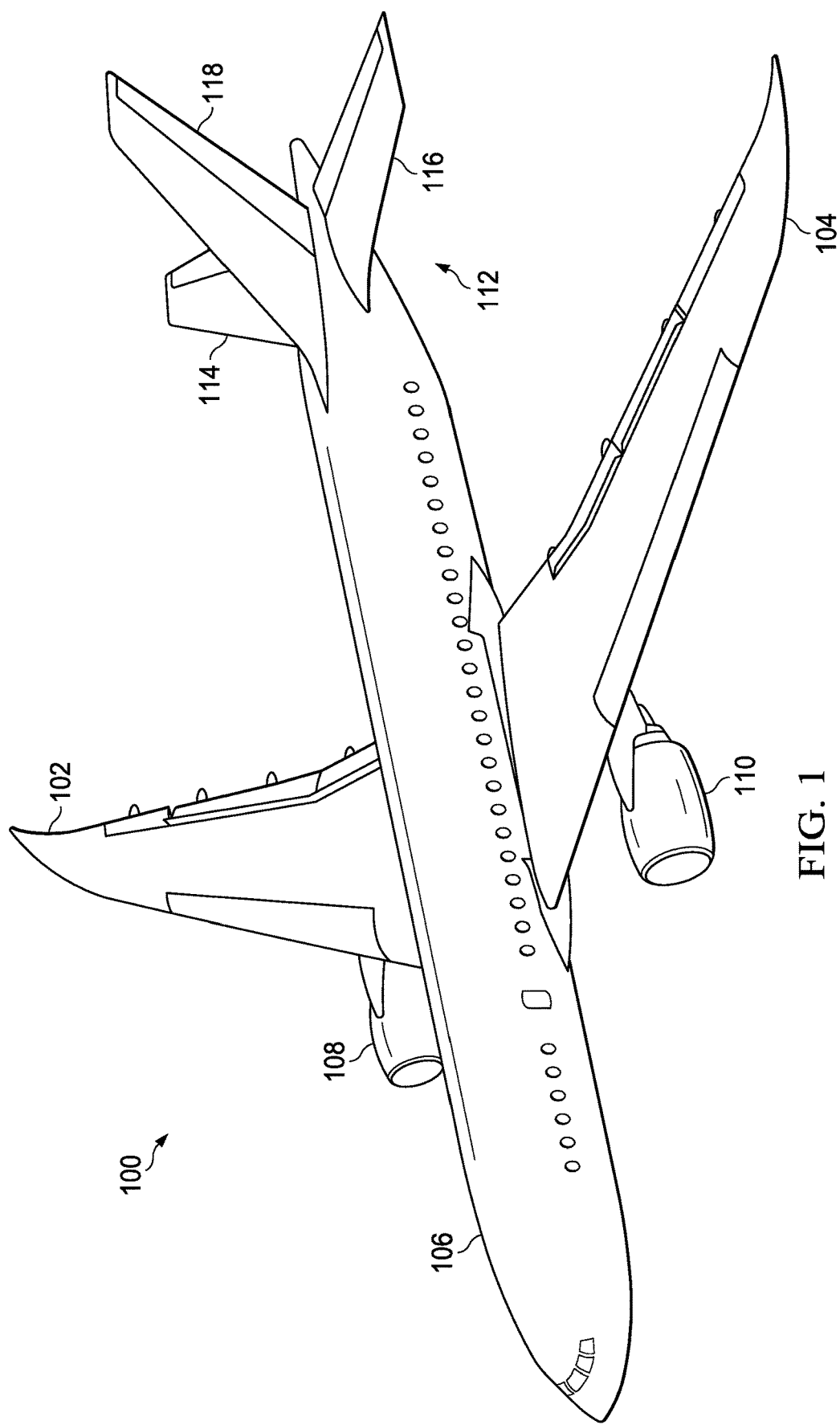
FIG. 1 is an illustration of an aircraft in which an illustrative embodiment may be implemented.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of a platform in which a monument with an attachment system having corner bracket fittings may be implemented in accordance with an illustrative embodiment. Aircraft 100 is an example of an aircraft in which an attachment system having corner bracket fittings can be used to secure a monument to a seat track. The attachment system enables monuments with reduced widths to be secured to seat tracks in body 106 of aircraft 100. The attachment system enables monuments with aisle-facing doors to be secured to seat tracks in body 106 of aircraft 100.

Figure 2:
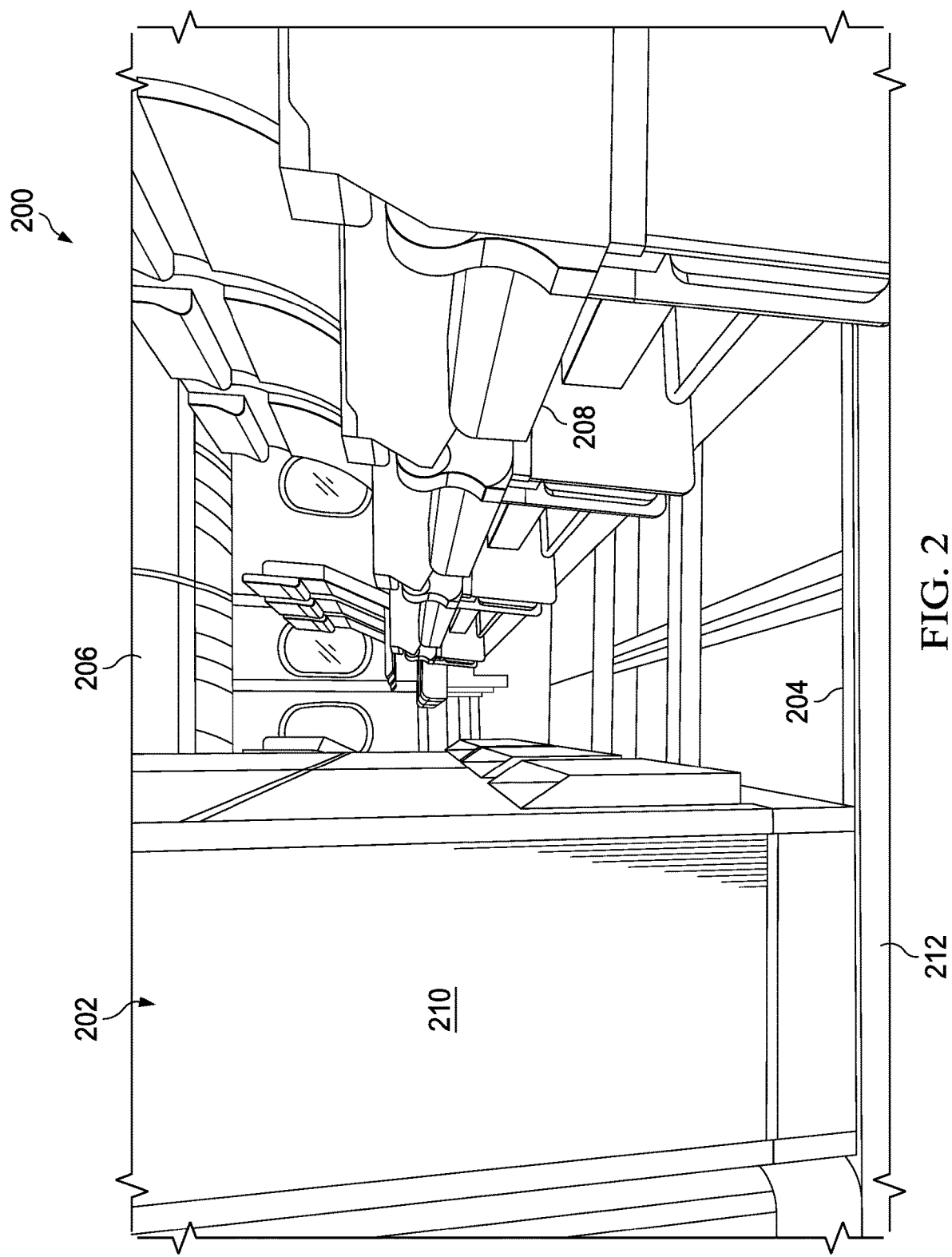
FIG. 2 is an illustration of a monument in an interior of an aircraft in accordance with an illustrative embodiment.

Turning to FIG. 2, an illustration of a monument in an interior of an aircraft is depicted in accordance with an illustrative embodiment. View 200 can be a view within body 106 of aircraft 100 of FIG. 1. In view 200, monument 202 is mounted to seat track 204 within passenger cabin 206. Passenger seats 208 are also mounted to seat track 204. Door 210 of monument 202 faces towards aisle 212 of passenger cabin 206. In some illustrative examples, monument 202 has a reduced width compared to conventional monuments.

Figure 3:
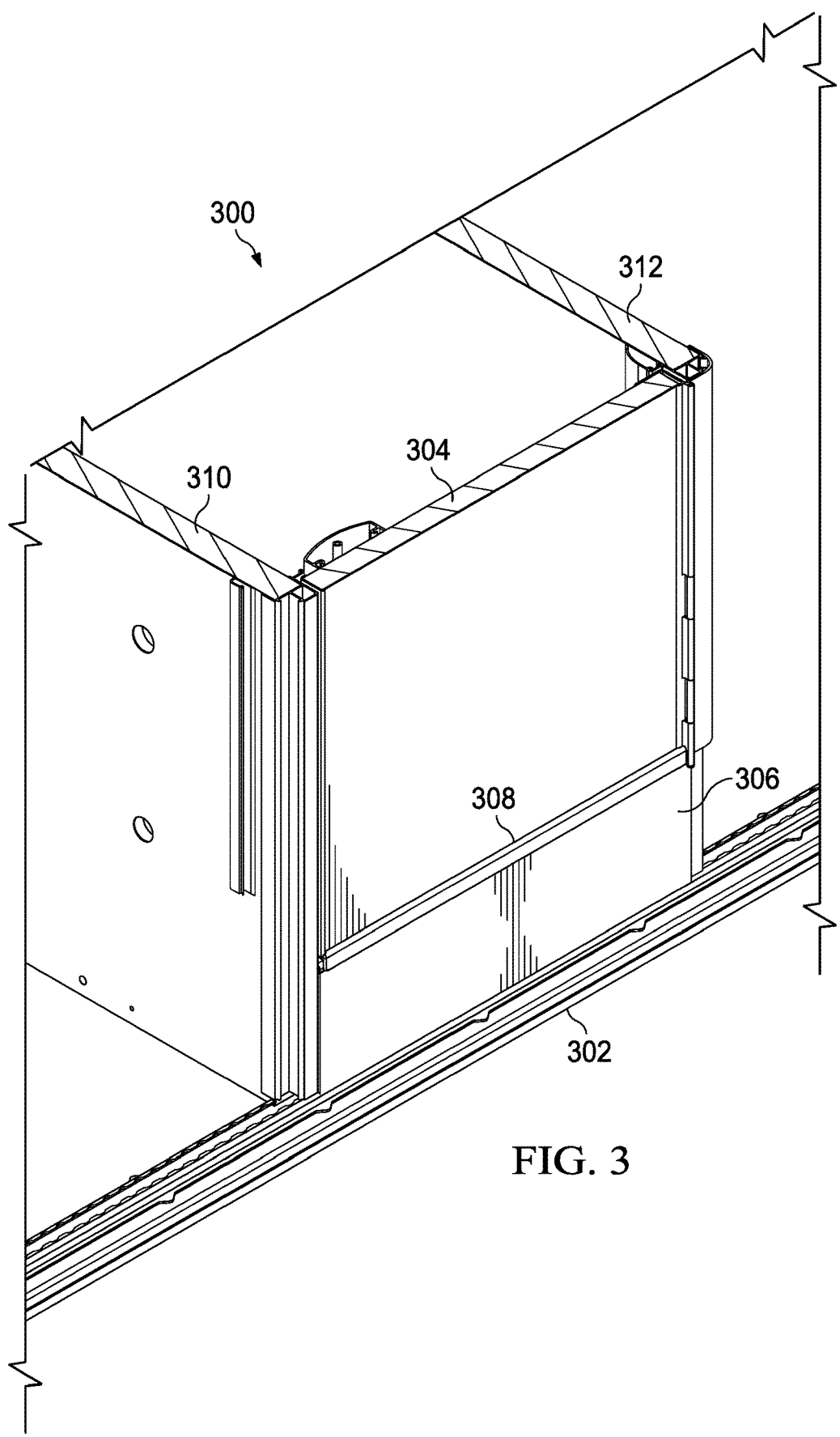
FIG. 3 is an illustration of a front perspective view of a monument with a seat track in accordance with an illustrative embodiment.

Turning to FIG. 3, an illustration of a front perspective view of a monument with a seat track is depicted in accordance with an illustrative embodiment. Monument 300 can be used within body 106 of aircraft 100 of FIG. 1. In some illustrative examples, monument 300 is the same as monument 202 of FIG. 2.

Monument 300 is mounted to seat track 302. Door 304 of monument is parallel to seat track 302. Kick strip 306 between door 304 and seat track 302 is positioned to cover components of attachment system 308 mounting monument 300 to seat track 302. Kick strip 306 increases the aesthetics of monument 300 by concealing components of the attachment system.

Monument 300 has face panel 310 and face panel 312. Face panel 310 is joined to face panel 312 and a floor panel (not visible) by components of attachment system 308.

Figure 4:
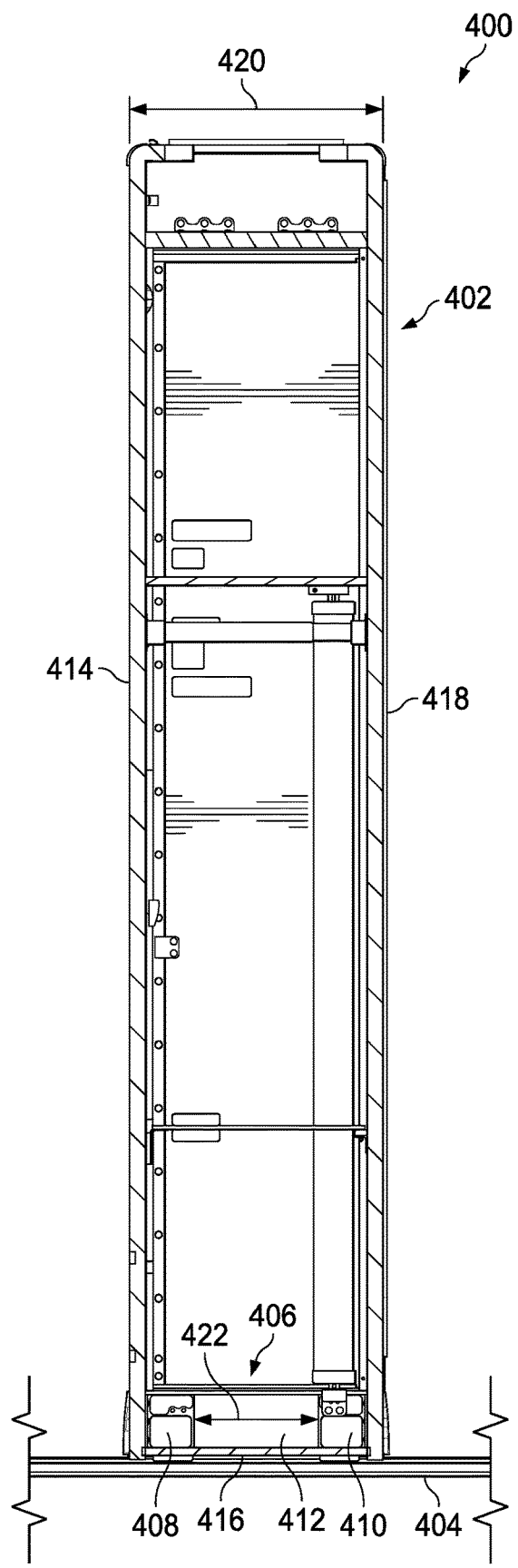
FIG. 4 is an illustration of a back cross-sectional view of a monument with a seat track in accordance with an illustrative embodiment.

Turning to FIG. 4, an illustration of a back cross-sectional view of a monument with a seat track is depicted in accordance with an illustrative embodiment. In some illustrative examples, view 400 is a back cross-sectional view of monument 300 of FIG. 3. View 400 may also be referred to as an interior view of monument 402.

Monument 402 is secured to seat track 404 by attachment system 406. In some illustrative examples, in view 400, components of monument 402 have been removed to better visualize attachment system 406. As an illustrative example, a kick strip can be present to conceal components of attachment system 406 within monument 402.

To prevent undesirable load sharing with the floor structure, a fitting of attachment system 406 on one side of monument 402 does not carry load in the y-direction. Attachment system 406 comprises right corner bracket fitting 408, left corner bracket fitting 410, and filler panel 412. To prevent undesirable load sharing with the floor structure, one of right corner bracket fitting 408 or left corner bracket fitting 410 does not carry load in the y-direction. Right corner bracket fitting 408 is configured to be joined to and connect right face panel 414 to floor panel 416. Left corner bracket fitting 410 is configured to be joined to and connect left face panel 418 to floor panel 416. Filler panel 412 is configured to be connected to and extend between right corner bracket fitting 408 and left corner bracket fitting 410. Filler panel 412 is secured between right corner bracket fitting 408 and left corner bracket fitting 410 to close off monument 402.

Filler panel 412 allows width 420 of monument 402 to be adjustable. Replacing filler panel 412 with a filler panel having a different width than width 422 of filler panel 412, width 420 of monument 402 can be adjusted. When width 420 of monument 402 is adjusted, a door with a different width and a floor panel with a different width will be used.

Figure 5:
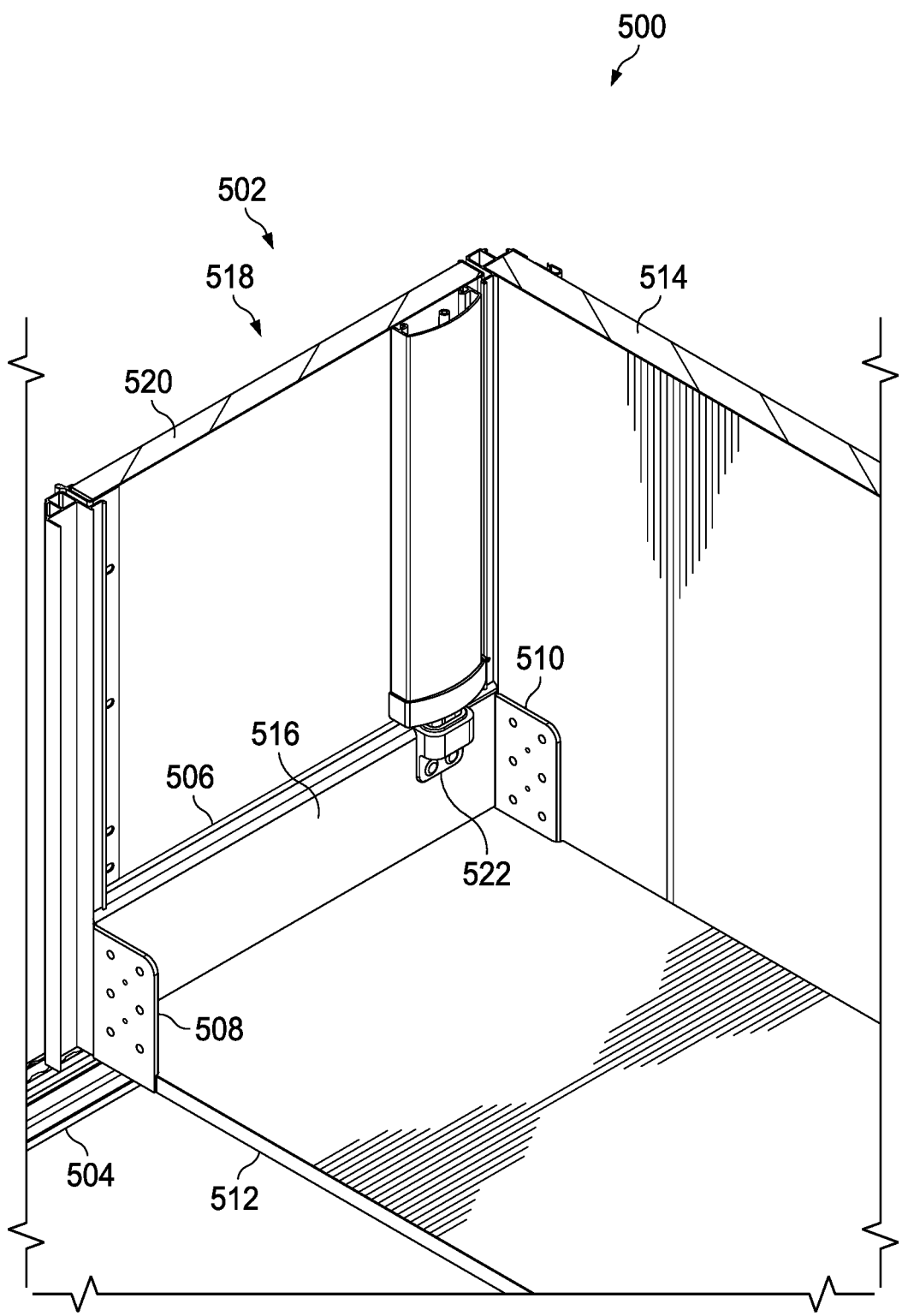
FIG. 5 is an illustration of a perspective cut-away view of a monument with a seat track in accordance with an illustrative embodiment.

Turning to FIG. 5, an illustration of a perspective cut-away view of a monument with a seat track is depicted in accordance with an illustrative embodiment. In some illustrative examples, view 500 is a back cross-sectional view of monument 300 of FIG. 3. Monument 502 is secured to seat track 504 by attachment system 506. Attachment system 506 comprises right corner bracket fitting 508 and left corner bracket fitting 510. Right corner bracket fitting 508 is configured to be joined to and connect a right face panel (not depicted) to floor panel 512. The right face panel is not depicted in view 500 to provide visibility to the interior of monument 502. Left corner bracket fitting 510 is configured to be joined to and connect left face panel 514 to floor panel 512. In view 500, kick strip 516 is positioned to conceal portions of right corner bracket fitting 508, left corner bracket fitting 510, and a filler panel (not depicted) configured to be connected to and extend between right corner bracket fitting 508 and left corner bracket fitting 510.

Monument 502 takes the form of closet 518 with door 520. Door strike 522 is joined to left corner bracket fitting 510 through kick strip 516. Door 520 of monument 502 is held closed by door strike 522 in attachment system 506.

Figure 6:
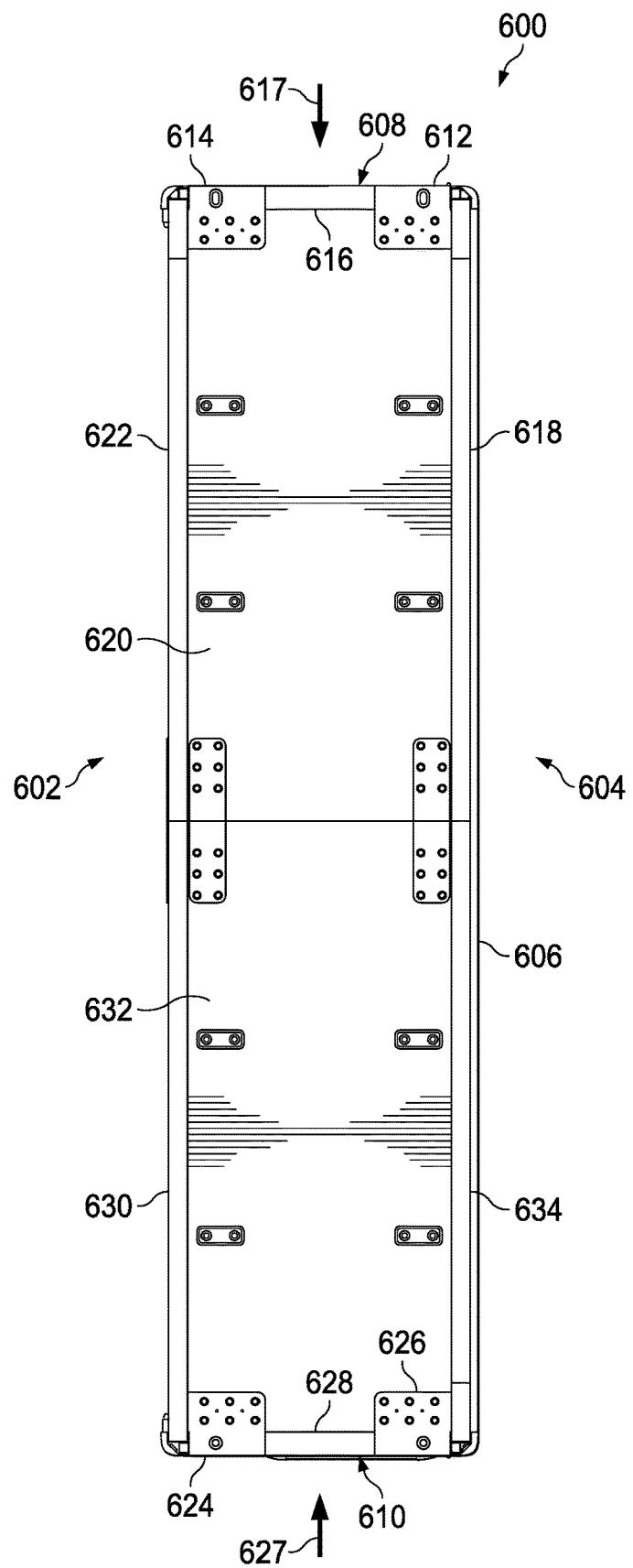
FIG. 6 is an illustration of a bottom view of a monument in accordance with an illustrative embodiment.

Turning to FIG. 6, an illustration of a bottom view of a monument is depicted in accordance with an illustrative embodiment. View 600 is a bottom view of monument 602. Monument 602 includes two opposite facing closets, closet 604 and closet 606. In some illustrative examples, view 600 is a bottom view of monument 202 of FIG. 2. In some illustrative examples, view 600 is a bottom view of monument 300 of FIG. 3. In some illustrative examples, view 600 is a bottom view of monument 402 of FIG. 4. In some illustrative examples, view 600 is a bottom view of monument 502 of FIG. 5.

Closet 604 has attachment system 608. Closet 606 has attachment system 610. Attachment system 608 includes corner bracket fitting 612, corner bracket fitting 614, and filler panel 616. In some illustrative examples, corner bracket fitting 612 is referred to as a right corner bracket fitting. In some illustrative examples, corner bracket fitting 614 is referred to as a left corner bracket fitting. The terms "left" and "right" are used relative to a door of closet 604 as an operator would encounter and open the door of closet 604. The terms "left" and "right" are used relative to a door of closet 604 when viewing the door of closet 604 from direction 617.

Corner bracket fitting 612 is configured to be joined to and connect face panel 618 to floor panel 620. Corner bracket fitting 614 is configured to be joined to and connect face panel 622 to floor panel 620. Face panel 618 may be referred to as a right face panel. Face panel 622 may be referred to as a left face panel. Filler panel 616 is configured to be connected to and extend between corner bracket fitting 612 and corner bracket fitting 614.

Attachment system 610 includes corner bracket fitting 624, corner bracket fitting 626, and filler panel 628. In some illustrative examples, corner bracket fitting 624 is referred to as a right corner bracket fitting. In some illustrative examples, corner bracket fitting 626 is referred to as a left corner bracket fitting. The terms "left" and "right" are used relative to a door of closet 606 as an operator would encounter and open the door of closet 606. The terms "left" and "right" are used relative to a door of closet 606 when viewing the door of closet 606 from direction 627.

Corner bracket fitting 624 is configured to be joined to and connect face panel 630 to floor panel 632. Corner bracket fitting 626 is configured to be joined to and connect face panel 634 to floor panel 632. Face panel 630 may be referred to as a right face panel. Face panel 634 may be referred to as a left face panel. Filler panel 628 is configured to be connected to and extend between corner bracket fitting 624 and corner bracket fitting 626.

Figure 7:
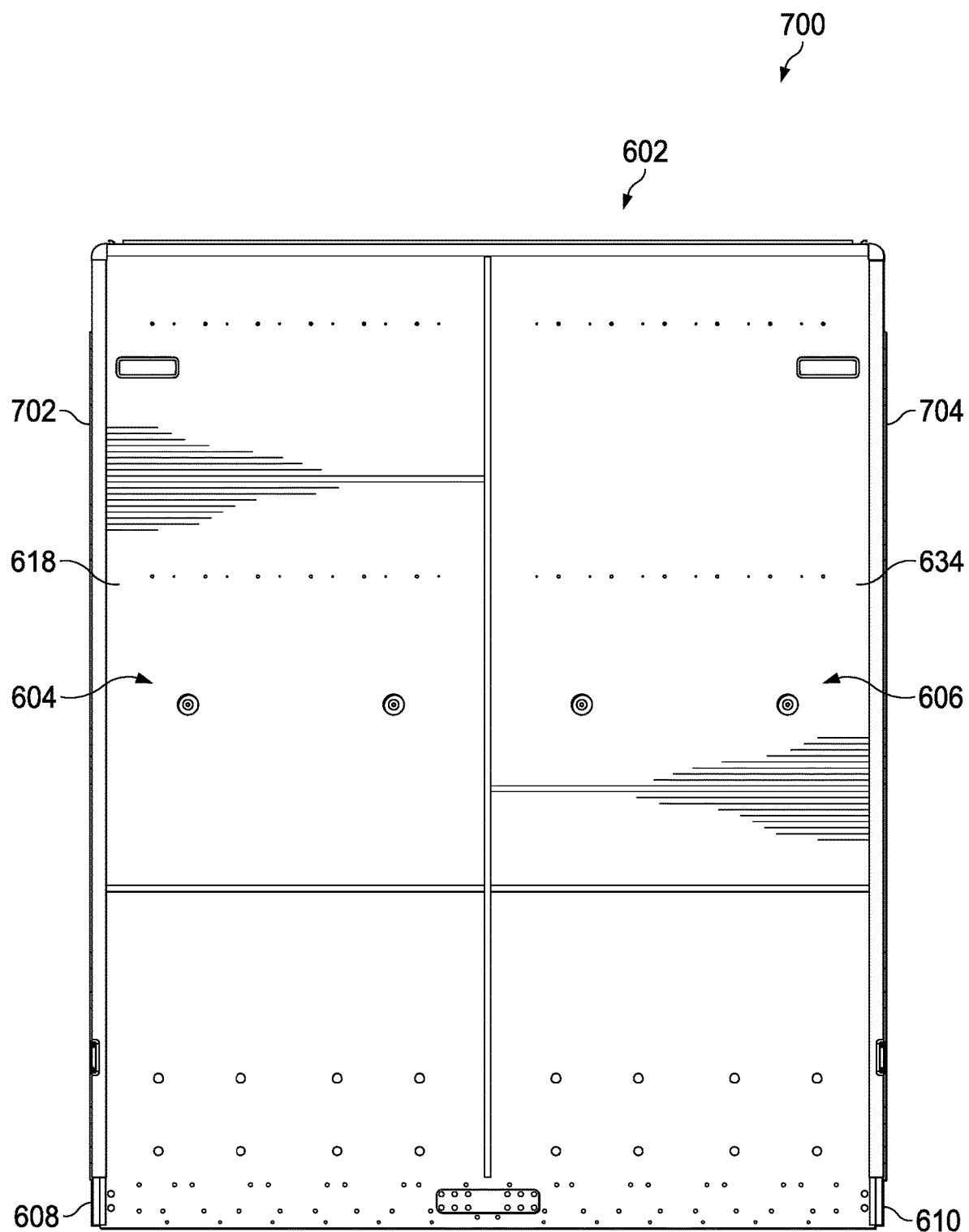
FIG. 7 is an illustration of a side view of a monument in accordance with an illustrative embodiment.

Turning to FIG. 7, an illustration of a side view of a monument is depicted in accordance with an illustrative embodiment. View 700 is a side view of monument 602 of FIG. 6. In view 700, face panel 618 of closet 604 and face panel 634 of closet 606 are visible. Door 702 of closet 604 is perpendicular to face panel 618. Door 704 of closet 606 is perpendicular to face panel 634.

Figure 8:
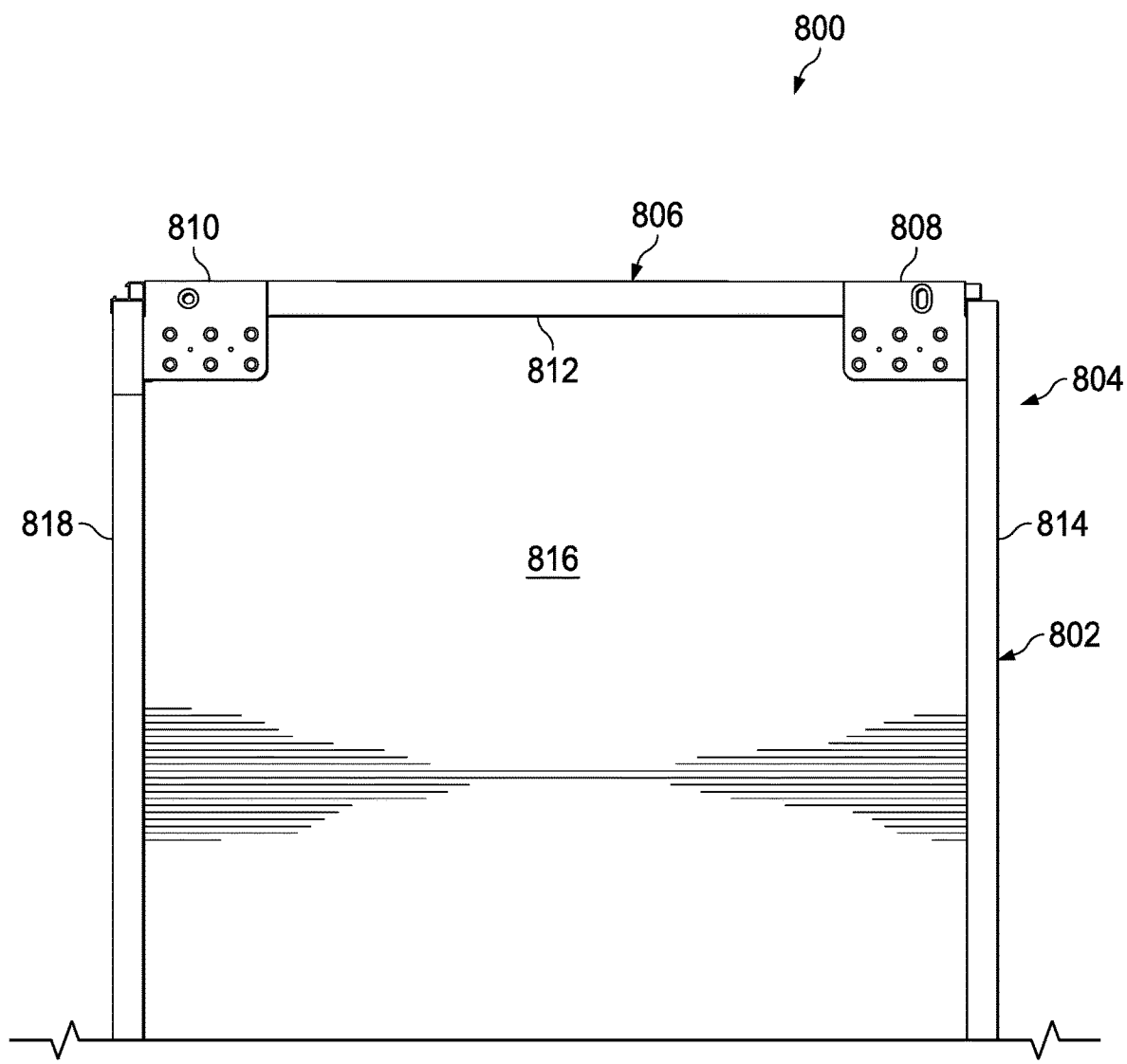
FIG. 8 is an illustration of a bottom view of a monument in accordance with an illustrative embodiment.

Turning to FIG. 8, an illustration of a bottom view of a monument is depicted in accordance with an illustrative embodiment. View 800 is a bottom view of monument 802. Monument 802 takes the form of closet 804. In some illustrative examples, view 800 is a bottom view of monument 202 of FIG. 2. In some illustrative examples, view 800 is a bottom view of monument 300 of FIG. 3. In some illustrative examples, view 800 is a bottom view of monument 402 of FIG. 4. In some illustrative examples, view 800 is a bottom view of monument 502 of FIG. 5.

Closet 804 has attachment system 806. Attachment system 806 includes corner bracket fitting 808, corner bracket fitting 810, and filler panel 812. Corner bracket fitting 808 is configured to be joined to and connect face panel 814 to floor panel 816. Corner bracket fitting 810 is configured to be joined to and connect face panel 818 to floor panel 816. Filler panel 812 is configured to be connected to and extend between corner bracket fitting 808 and corner bracket fitting 810.

In some illustrative examples, corner bracket fitting 808 can be referred to as a right corner bracket fitting and corner bracket fitting 810 can be referred to as a left corner bracket fitting. In some illustrative examples, face panel 814 is referred to as a right face panel and face panel 818 is referred to as a left face panel.

Figure 9:
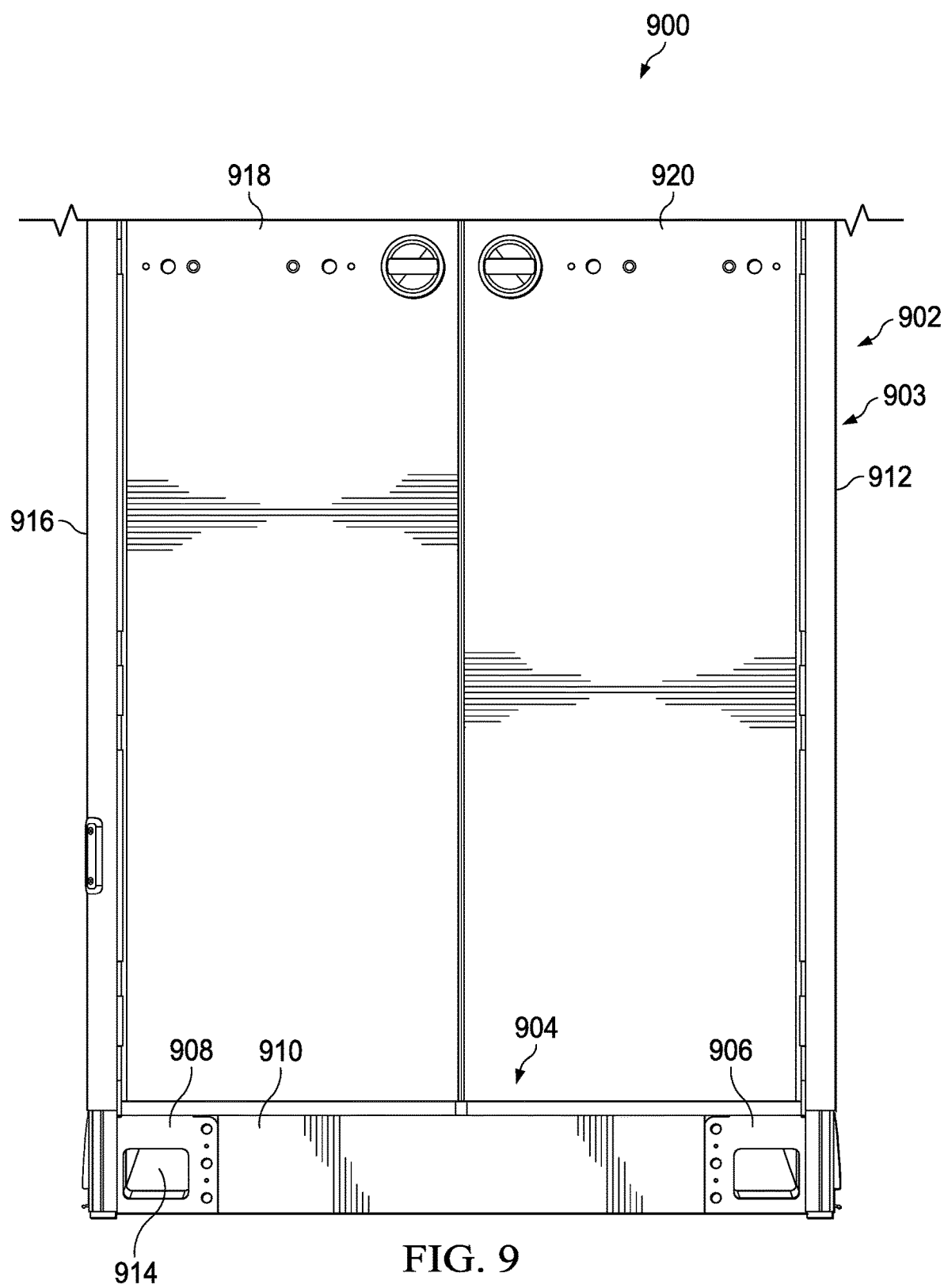
FIG. 9 is an illustration of a front view of a monument in accordance with an illustrative embodiment.

Turning to FIG. 9, an illustration of a front view of a monument is depicted in accordance with an illustrative embodiment. View 900 is a front view of monument 902. Monument 902 takes the form of closet 903. In some illustrative examples, view 900 is a front view of monument 602 of FIGS. 6 and 7. In some illustrative examples, view 900 is a front view of monument 802 of FIG. 8. In some illustrative examples, monument 902 can be installed within aircraft 100 of FIG. 1. In some illustrative examples, monument 902 is an alternative to monument 202 of FIG. 2. In some illustrative examples, monument 902 is an alternative to monument 300 of FIG. 3. In some illustrative examples, monument 902 is an alternative to monument 402 of FIG. 4. In some illustrative examples, monument 902 is an alternative to monument 502 of FIG. 5.

Monument 902 has attachment system 904 configured to mount monument 902 to a seat track. Attachment system 904 includes corner bracket fitting 906, corner bracket fitting 908, and filler panel 910. Corner bracket fitting 906 is configured to be joined to and connect face panel 912 to floor panel 914. Corner bracket fitting 908 is configured to be joined to and connect face panel 916 to floor panel 914. Filler panel 910 is configured to be connected to and extend between corner bracket fitting 906 and corner bracket fitting 908. Monument 902 has door 918 and door 920. In view 900, some components of attachment system 904 are removed for illustrative purposes. For example, kick strips are removed for visibility of corner bracket fitting 906 and corner bracket fitting 908.

Corner bracket fitting 906 can be referred to as a right corner bracket fitting. Corner bracket fitting 906 has a face panel structural attachment extending into and out of the page on the right side of corner bracket fitting 906 in view 900. Corner bracket fitting 908 can be referred to as a left corner bracket fitting. Corner bracket fitting 908 has a face panel structural attachment extending into and out of the page on the left side of corner bracket fitting 908 in view 900.

Figure 10:
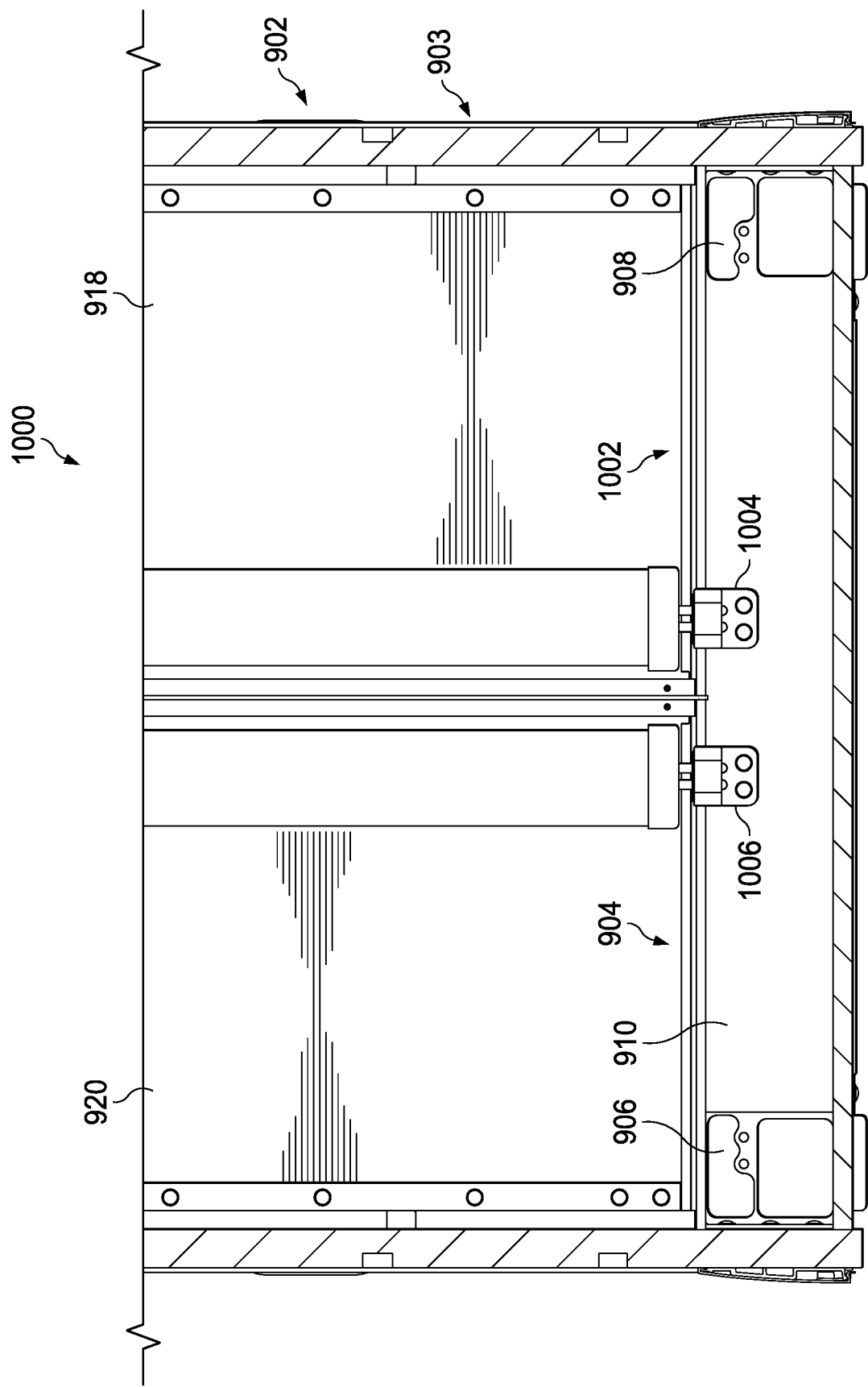
FIG. 10 is an illustration of an interior view of a monument in accordance with an illustrative embodiment.

Turning to FIG. 10, an illustration of an interior view of a monument is depicted in accordance with an illustrative embodiment. View 1000 is an internal view of monument 902 of FIG. 9. View 1000 may also be referred to as a back cross-sectional view. In view 1000, some components of attachment system 904 are removed for illustrative purposes. For example, kick strips are removed for visibility of corner bracket fitting 906 and corner bracket fitting 908.

In monument 902, number of door strikes 1002 is connected to filler panel 910. Number of door strikes 1002 includes door strike 1004 and door strike 1006. Door strike 1004 secures door 918 in a closed position. Door strike 1006 secures door 920 in a closed position.

Figure 11:
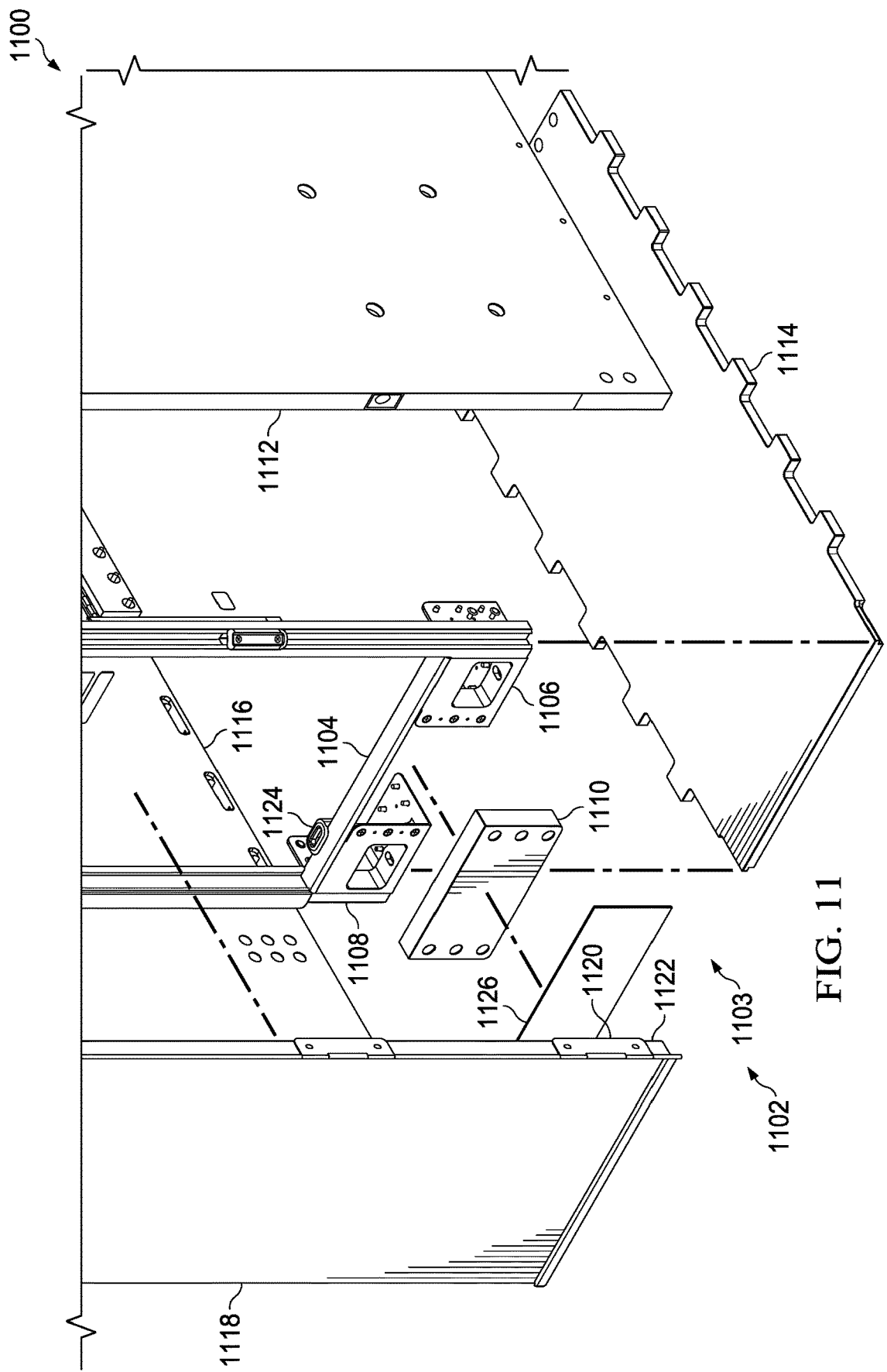
FIG. 11 is an illustration of an exploded perspective view of a monument in accordance with an illustrative embodiment.

Turning to FIG. 11, an illustration of an exploded perspective view of a monument is depicted in accordance with an illustrative embodiment. View 1100 is an exploded perspective view of monument 1102. Monument 1102 takes the form of closet 1103. In some illustrative examples, view 1100 is an exploded view of monument 202 of FIG. 2. In some illustrative examples, view 1100 is an exploded view of monument 300 of FIG. 3. In some illustrative examples, view 1100 is an exploded view of monument 402 of FIG. 4. In some illustrative examples, view 1100 is an exploded view of monument 502 of FIG. 5. In some illustrative examples, view 1100 is an exploded view of a portion of monument 602 of FIGS. 6 and 7. Monument 1102 can be installed within aircraft 100 of FIG. 1. In some illustrative examples, monument 1102 is an alternative to monument 902 of FIGS. 9 and 10.

Monument 1102 has attachment system 1104 configured to mount monument 1102 to a seat track. Attachment system 1104 includes corner bracket fitting 1106, corner bracket fitting 1108, and filler panel 1110. Corner bracket fitting 1106 is configured to be joined to and connect face panel 1112 to floor panel 1114. Corner bracket fitting 1108 is configured to be joined to and connect face panel 1116 to floor panel 1114. Filler panel 1110 is configured to be connected to and extend between corner bracket fitting 1106 and corner bracket fitting 1108. Monument 1102 has door 1118.

Door 1118 has hinges 1120 on side 1122 associated with corner bracket fitting 1106. Door 1118 swings outward away from corner bracket fitting 1108 and towards corner bracket fitting 1106. Door 1118 is secured in a closed position by door strike 1124. Door strike 1124 is secured to corner bracket fitting 1108.

In view 1100 piece of trim 1126 is present. Attachment system 1104 includes piece of trim 1126 configured to cover a top face of each of the two corner bracket fittings, corner bracket fitting 1108 and corner bracket fitting 1106, and filler panel 1110.

Figure 12:
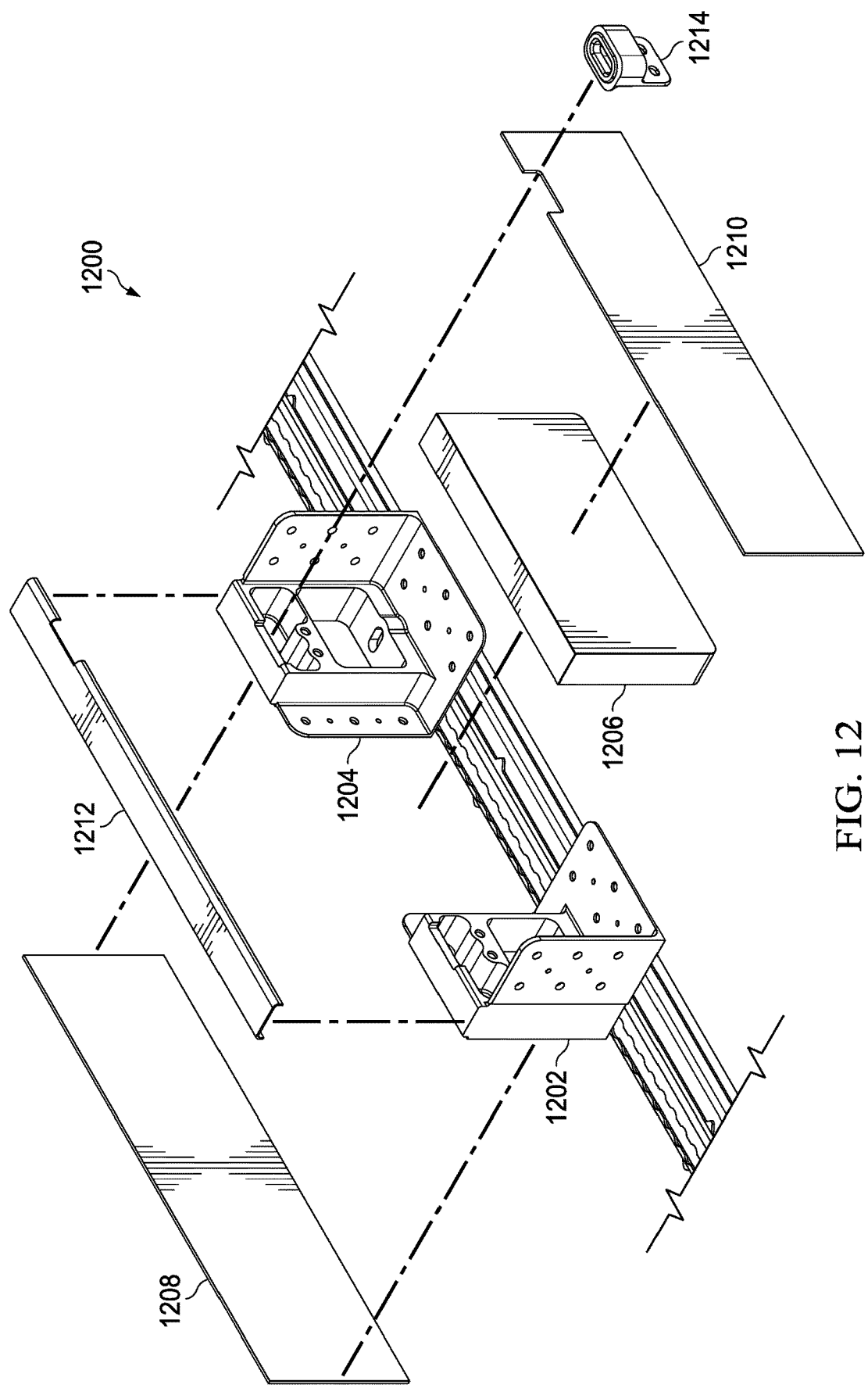
FIG. 12 is an illustration of an exploded perspective back view of an attachment system in accordance with an illustrative embodiment.

Turning to FIG. 12, an illustration of an exploded perspective back view of an attachment system is depicted in accordance with an illustrative embodiment. In some illustrative examples, attachment system 1200 is used to attach monument 202 to seat track 204. In some illustrative examples, attachment system 1200 is used to attach monument 300 to seat track 302. In some illustrative examples, attachment system 1200 is the same as attachment system 406 of FIG. 4. In some illustrative examples, attachment system 1200 is the same as attachment system 506 of FIG. 5. In some illustrative examples, attachment system 1200 is the same as attachment system 608 of FIG. 6. In some illustrative examples, attachment system 1200 is the same as attachment system 1104 of FIG. 11.

Attachment system 1200 includes right corner bracket fitting 1202, left corner bracket fitting 1204, and filler panel 1206. Right corner bracket fitting 1202 is configured to be joined to and connect right face panel to floor panel. Left corner bracket fitting 1204 is configured to be joined to and connect left face panel to floor panel. Filler panel 1206 is configured to be connected to and extend between right corner bracket fitting 1202 and left corner bracket fitting 1204.

In this illustrative example, attachment system 1200 also includes kick strip 1208, kick strip 1210, trim 1212, and door strike 1214. Kick strip 1208, kick strip 1210, and trim 1212 conceal surfaces of right corner bracket fitting 1202, left corner bracket fitting 1204, and filler panel 1206. Kick strip 1208, kick strip 1210, and trim 1212 conceal fasteners of attachment system 1200.

In attachment system 1200, door strike 1214 can be attached to either right corner bracket fitting 1202 or left corner bracket fitting 1204. As depicted, door strike 1214 will be joined to left corner bracket fitting 1204.

In this illustrative example, right corner bracket fitting 1202 and left corner bracket fitting 1204

Figure 13:
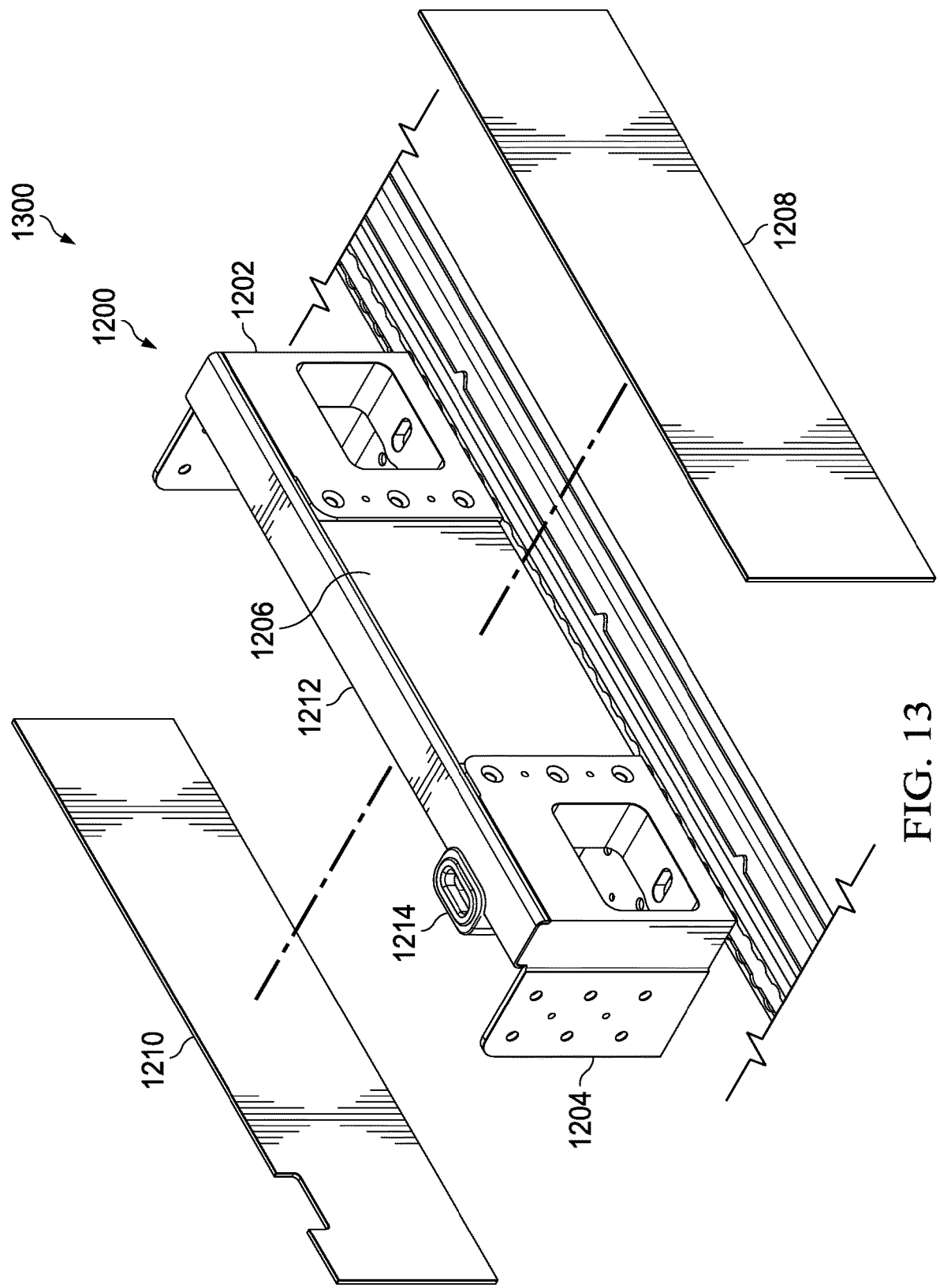
FIG. 13 is an illustration of a partially exploded perspective front view of an attachment system in accordance with an illustrative embodiment.

Turning to FIG. 13, an illustration of a partially exploded perspective front view of an attachment system is depicted in accordance with an illustrative embodiment. View 1300 is a partially assembled view of attachment system 1200 of FIG. 12.

In view 1300 filler panel 1206 is joined to right corner bracket fitting 1202 and left corner bracket fitting 1204. Door strike 1214 has been joined to left corner bracket fitting 1204. Kick strip 1208 and kick strip 1210 have not yet been attached to conceal right corner bracket fitting 1202 and left corner bracket fitting 1204.

FIGS. 14-21 are illustrations of pairs of corner bracket fittings that could be utilized in an attachment system. The corner bracket fittings of FIGS. 14-21 have seat track interfaces selected based on expected loads in the location of the monument in a platform. The corner bracket fittings depicted in FIGS. 14-21 are interchangeable within an attachment system. A pair of corner bracket fittings from FIGS. 14-21 is selected based on at least one of a location of the monument within the platform, a design of the monument, or expected loads at a desired installation location.

Figure 14:
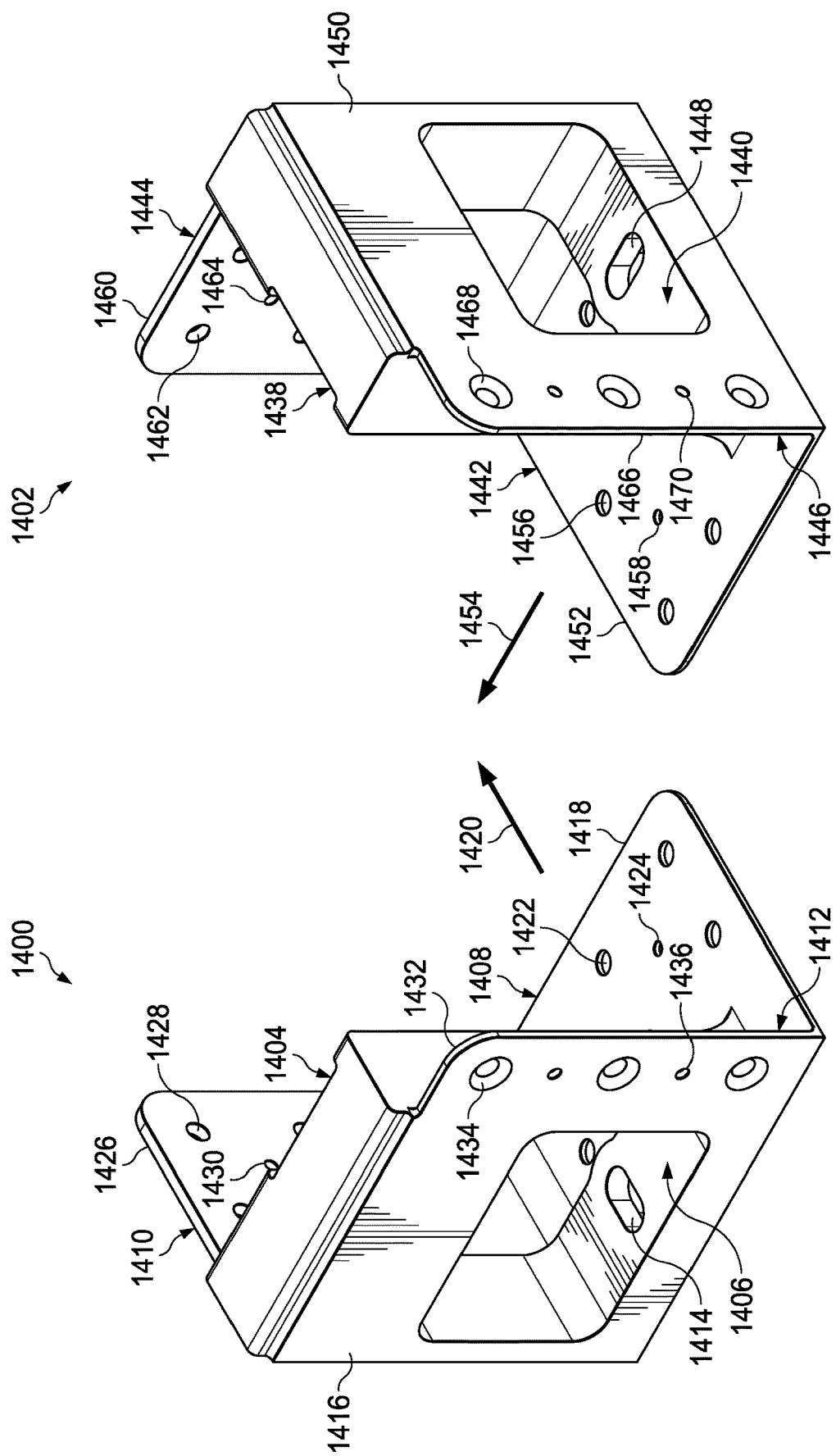
FIG. 14 is an illustration of a perspective front view of a pair of corner brackets of an attachment system in accordance with an illustrative embodiment.

Turning to FIG. 14, an illustration of a perspective front view of a pair of corner bracket fittings of an attachment system is depicted in accordance with an illustrative embodiment. Corner bracket fitting 1400 and corner bracket fitting 1402 are components of an attachment system for a monument. Corner bracket fitting 1400 and corner bracket fitting 1402 can be used in any desirable type of monument, such as monument 202 of FIG. 2, monument 300 of FIG. 3, monument 402 of FIG. 4, monument 502 of FIG. 5, monument 602 of FIGS. 6 and 7, monument 802 of FIG. 8, monument 902 of FIGS. 9 and 10, or monument 1102 of FIG. 11. In some illustrative examples, corner bracket fitting 1400 and corner bracket fitting 1402 are components of attachment system 1200 of FIGS. 12 and 13.

Corner bracket fitting 1400 can be referred to as a left bracket fitting. Corner bracket fitting 1402 can be referred to as a right bracket. In this illustrative example, corner bracket fitting 1400 and corner bracket fitting 1402 are mirror images of each other.

Corner bracket fitting 1400 comprises structural body 1404 with seat track interface 1406, floor panel structural attachment 1408, face panel structural attachment 1410, and filler panel structural attachment 1412. Seat track interface 1406 comprises slot 1414 extending perpendicular to front face 1416 of corner bracket fitting 1400. Slot 1414 is present to prevent undesirable load sharing with a floor structure. Slot 1414 allows a monument containing corner bracket fitting 1400 to not carry load in a y-direction.

Floor panel structural attachment 1408 comprises flange 1418 extending from structural body 1404 in direction 1420 parallel to slot 1414. Floor panel structural attachment 1408 further comprises plurality of holes 1422 in flange 1418 configured to receive a plurality of fasteners. The plurality of fasteners extending through plurality of holes 1422 will secure floor panel structural attachment 1408 to a floor panel (not depicted). Floor panel structural attachment 1408 also comprises plurality of weep holes 1424. Plurality of weep holes 1424 allow for adhesive to flow from between floor panel structural attachment 1408 and a floor panel.

Face panel structural attachment 1410 comprises flange 1426 extending from structural body 1404 and substantially perpendicular to floor panel structural attachment 1408. When viewing corner bracket fitting 1400 from front face 1416, face panel structural attachment 1410 is on the left side of structural body 1404. Corner bracket fitting 1400 can be referred to as a left corner bracket fitting. Face panel structural attachment 1410 has plurality of holes 1428 in flange 1426 configured to receive a plurality of fasteners. The plurality of fasteners extending through plurality of holes 1428 will secure face panel structural attachment 1410 to a face panel (not depicted). Face panel structural attachment 1410 also comprises plurality of weep holes 1430. Plurality of weep holes 1430 allows for adhesive to flow from between face panel structural attachment 1410 and a face panel.

Filler panel structural attachment 1412 comprises flange 1432 extending from structural body 1404 and substantially perpendicular to both face panel structural attachment 1410 and floor panel structural attachment 1408. Filler panel structural attachment 1412 has plurality of holes 1434 in flange 1432 configured to receive a plurality of fasteners. The plurality of fasteners extending through plurality of holes 1434 will secure filler panel structural attachment 1412 to a filler panel (not depicted). Filler panel structural attachment 1412 also comprises plurality of weep holes 1436. Plurality of weep holes 1436 allow for adhesive to flow from between filler panel structural attachment 1412 and a filler panel.

Corner bracket fitting 1402 comprises structural body 1438 with seat track interface 1440, floor panel structural attachment 1442, face panel structural attachment 1444, and filler panel structural attachment 1446. Seat track interface 1440 comprises slot 1448 extending perpendicular to front face 1450 of corner bracket fitting 1402. Slot 1448 is present to prevent undesirable load sharing with a floor structure. Slot 1448 allows a monument containing corner bracket fitting 1402 to not carry load in a y-direction.

Floor panel structural attachment 1442 comprises flange 1452 extending from structural body 1438 in direction 1454 parallel to slot 1448. Floor panel structural attachment 1442 further comprises plurality of holes 1456 in flange 1452 configured to receive a plurality of fasteners. The plurality of fasteners extending through plurality of holes 1456 will secure floor panel structural attachment 1442 to a floor panel (not depicted). Floor panel structural attachment 1442 also comprises plurality of weep holes 1458. Plurality of weep holes 1458 allow for adhesive to flow from between floor panel structural attachment 1442 and a floor panel.

Face panel structural attachment 1444 comprises flange 1460 extending from structural body 1438 and substantially perpendicular to floor panel structural attachment 1442. When viewing corner bracket fitting 1402 from front face 1450, face panel structural attachment 1444 is on the right side of structural body 1438. Corner bracket fitting 1402 can be referred to as a right corner bracket fitting. Face panel structural attachment 1444 has plurality of holes 1462 in flange 1460 configured to receive a plurality of fasteners. The plurality of fasteners extending through plurality of holes 1462 will secure face panel structural attachment 1444 to a face panel (not depicted). Face panel structural attachment 1444 also comprises plurality of weep holes 1464. Plurality of weep holes 1464 allow for adhesive to flow from between face panel structural attachment 1444 and a face panel.

Filler panel structural attachment 1446 comprises flange 1466 extending from structural body 1438 and substantially perpendicular to both face panel structural attachment 1444 and floor panel structural attachment 1442. Filler panel structural attachment 1446 has plurality of holes 1468 in flange 1466 configured to receive a plurality of fasteners.

The plurality of fasteners extending through plurality of holes 1468 will secure filler panel structural attachment 1446 to a filler panel (not depicted). Filler panel structural attachment 1446 also comprises plurality of weep holes 1470. Plurality of weep holes 1470 allow for adhesive to flow from between filler panel structural attachment 1446 and a filler panel.

The illustration of corner bracket fitting 1400 and corner bracket fitting 1402 in FIG. 14 is not meant to imply physical or architectural limitations to the manner in which an illustrative embodiment may be implemented. Other components in addition to or in place of the ones illustrated may be used. Some components may be unnecessary. For example, at least one of plurality of weep holes 1424, plurality of weep holes 1430, or plurality of weep holes 1436 are optional.

Figure 15:
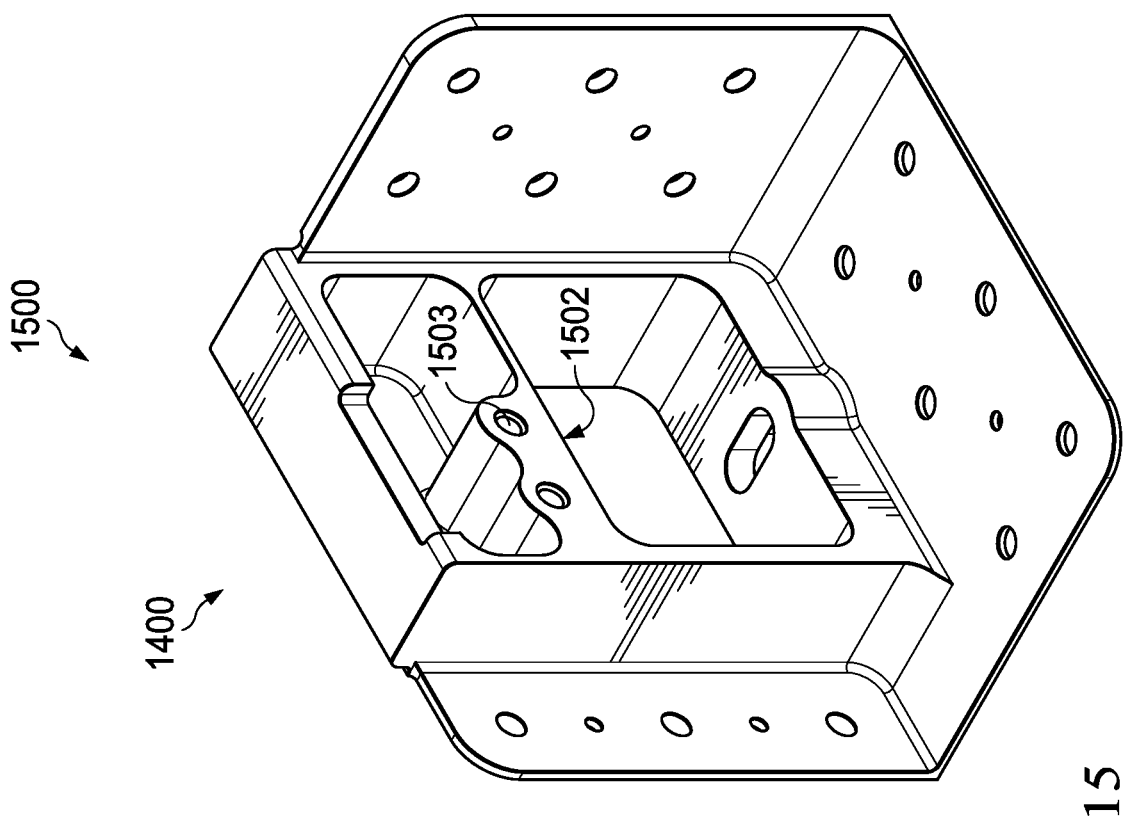
FIG. 15 is an illustration of a perspective back view of a pair of corner brackets of an attachment system in accordance with an illustrative embodiment.
Figure 15:
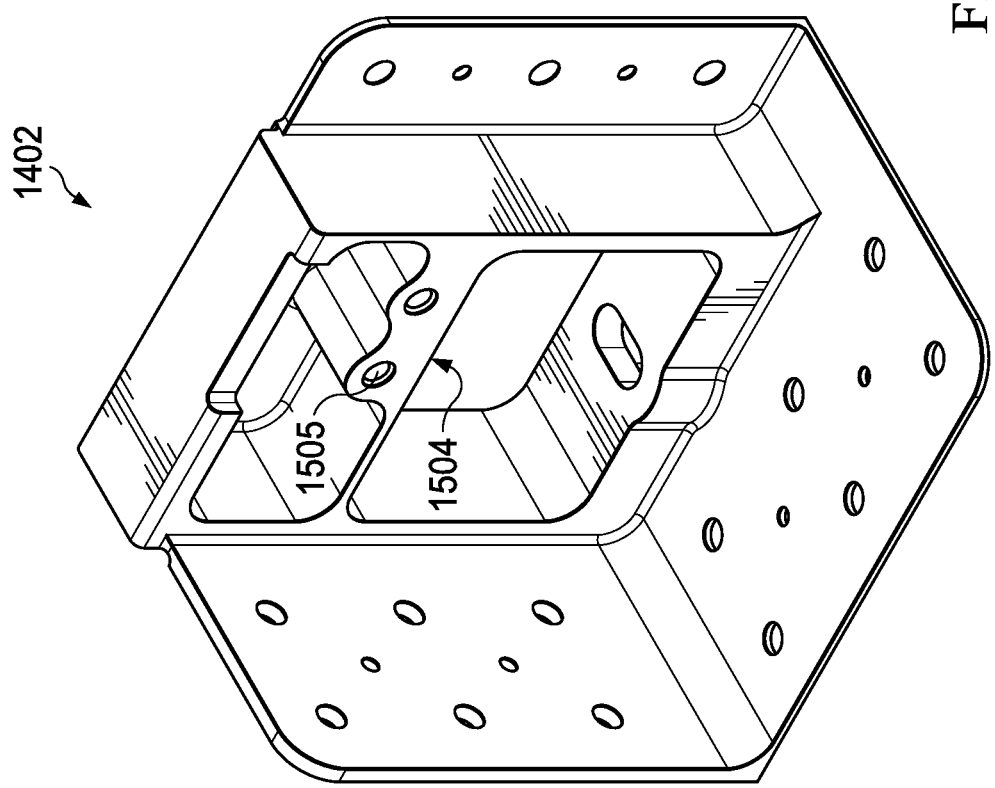

Turning to FIG. 15, an illustration of a perspective back view of a pair of corner bracket fittings of an attachment system is depicted in accordance with an illustrative embodiment. View 1500 is a back-perspective view of corner bracket fitting 1400 and corner bracket fitting 1402. Corner bracket fitting 1400 has connector 1502 in structural body 1404. Corner bracket fitting 1402 has connector 1504 in structural body 1438. Connector 1502 is configured to connect to a door strike. Connector 1502 is a built-in door strike provision. Connector 1502 accommodates forward or aft doors. In some illustrative examples, connector 1502 is hidden from view by a kick strip when not in use. Connector 1502 includes number of tapped holes 1503 to receive a number of helical coils. Number of tapped holes 1503 receives a number of helical coils to allow a door strike to be mechanically fastened to Corner bracket fitting 1400.

Connector 1504 is configured to connect to a door strike. Connector 1504 is a built-in door strike provision. Connector 1504 accommodates forward or aft doors. In some illustrative examples, connector 1504 is hidden from view by a kick strip when not in use. Connector 1504 includes number of tapped holes 1505 to receive a number of helical coils. Number of tapped holes 1505 receives a number of helical coils to allow a door strike to be mechanically fastened to Corner bracket fitting 1402.

Figure 16:
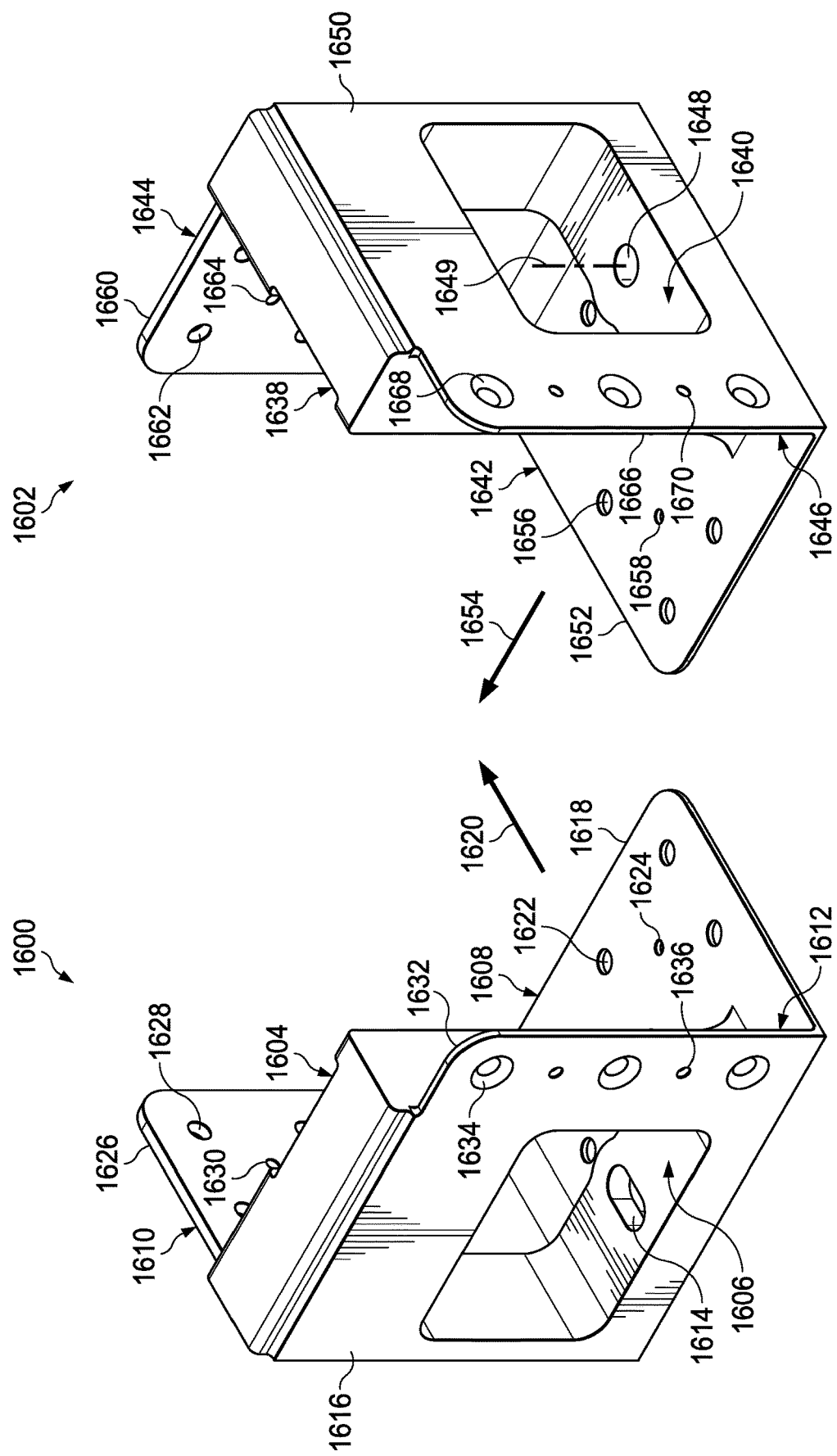
FIG. 16 is an illustration of a perspective front view of a pair of corner brackets of an attachment system in accordance with an illustrative embodiment.

Turning to FIG. 16, an illustration of a perspective front view of a pair of corner bracket fittings of an attachment system is depicted in accordance with an illustrative embodiment. Corner bracket fitting 1600 and corner bracket fitting 1602 are components of an attachment system for a monument. Corner bracket fitting 1600 and corner bracket fitting 1602 can be used in any desirable type of monument, such as monument 202 of FIG. 2, monument 300 of FIG. 3, monument 402 of FIG. 4, monument 502 of FIG. 5, monument 602 of FIGS. 6 and 7, monument 802 of FIG. 8, monument 902 of FIGS. 9 and 10, or monument 1102 of FIG. 11. In some illustrative examples, corner bracket fitting 1600 and corner bracket fitting 1602 are components of attachment system 1200 of FIGS. 12 and 13. In some illustrative examples, corner bracket fitting 1600 is the same as corner bracket fitting 1400 of FIGS. 14 and 15. Corner bracket fitting 1602 is an alternative design to corner bracket fitting 1402 of FIGS. 14 and 15.

Corner bracket fitting 1600 can be referred to as a left bracket fitting. Corner bracket fitting 1602 can be referred to as a right bracket. In this illustrative example, corner bracket fitting 1600 and corner bracket fitting 1602 are mirror images of each other.

Corner bracket fitting 1600 comprises structural body 1604 with seat track interface 1606, floor panel structural attachment 1608, face panel structural attachment 1610, and filler panel structural attachment 1612. Seat track interface 1606 comprises slot 1614 extending perpendicular to front face 1616 of corner bracket fitting 1600. Slot 1614 is present to prevent undesirable load sharing with a floor structure. Slot 1614 allows a monument containing corner bracket fitting 1600 to not carry load in a y-direction.

Floor panel structural attachment 1608 comprises flange 1618 extending from structural body 1604 in direction 1620 parallel to slot 1614. Floor panel structural attachment 1608 further comprises plurality of holes 1622 in flange 1618 configured to receive a plurality of fasteners. The plurality of fasteners extending through plurality of holes 1622 will secure floor panel structural attachment 1608 to a floor panel (not depicted). Floor panel structural attachment 1608 also comprises plurality of weep holes 1624. Plurality of weep holes 1624 allow for adhesive to flow from between floor panel structural attachment 1608 and a floor panel.

Face panel structural attachment 1610 comprises flange 1626 extending from structural body 1604 and substantially perpendicular to floor panel structural attachment 1608. When viewing corner bracket fitting 1600 from front face 1616, face panel structural attachment 1610 is on the left side of structural body 1604. Corner bracket fitting 1600 can be referred to as a left corner bracket fitting. Face panel structural attachment 1610 has plurality of holes 1628 in flange 1626 configured to receive a plurality of fasteners. The plurality of fasteners extending through plurality of holes 1628 will secure face panel structural attachment 1610 to a face panel (not depicted). Face panel structural attachment 1610 also comprises plurality of weep holes 1630. Plurality of weep holes 1630 allow for adhesive to flow from between face panel structural attachment 1610 and a face panel.

Filler panel structural attachment 1612 comprises flange 1632 extending from structural body 1604 and substantially perpendicular to both face panel structural attachment 1610 and floor panel structural attachment 1608. Filler panel structural attachment 1612 has plurality of holes 1634 in flange 1632 configured to receive a plurality of fasteners. The plurality of fasteners extending through plurality of holes 1634 will secure filler panel structural attachment 1612 to a filler panel (not depicted). Filler panel structural attachment 1612 also comprises plurality of weep holes 1636. Plurality of weep holes 1636 allow for adhesive to flow from between filler panel structural attachment 1612 and a filler panel.

Corner bracket fitting 1602 comprises structural body 1638 with seat track interface 1640, floor panel structural attachment 1642, face panel structural attachment 1644, and filler panel structural attachment 1646. Seat track interface 1640 comprises cylindrical channel 1648. Cylindrical channel 1648 extends through structural body 1638. Centerline 1649 of cylindrical channel 1648 is parallel to front face 1650 of corner bracket fitting 1602.

Floor panel structural attachment 1642 comprises flange 1652 extending away from front face 1650 of structural body 1638 in direction 1654. When viewing corner bracket fitting 1602 from front face 1650, face panel structural attachment 1644 is on the right side of structural body 1638. Corner bracket fitting 1602 can be referred to as a right corner bracket fitting. Floor panel structural attachment 1642 further comprises plurality of holes 1656 in flange 1652 configured to receive a plurality of fasteners. The plurality of fasteners extending through plurality of holes 1656 will secure floor panel structural attachment 1642 to a floor panel (not depicted). Floor panel structural attachment 1642 also comprises plurality of weep holes 1658. Plurality of weep holes 1658 allow for adhesive to flow from between floor panel structural attachment 1642 and a floor panel.

Face panel structural attachment 1644 comprises flange 1660 extending from structural body 1638 and substantially perpendicular to floor panel structural attachment 1642. Face panel structural attachment 1644 has plurality of holes 1662 in flange 1660 configured to receive a plurality of fasteners. The plurality of fasteners extending through plurality of holes 1662 will secure face panel structural attachment 1644 to a face panel (not depicted). Face panel structural attachment 1644 also comprises plurality of weep holes 1664. Plurality of weep holes 1664 allow for adhesive to flow from between face panel structural attachment 1644 and a face panel.

Filler panel structural attachment 1646 comprises flange 1666 extending from structural body 1638 and substantially perpendicular to both face panel structural attachment 1644 and floor panel structural attachment 1642. Filler panel structural attachment 1646 has plurality of holes 1668 in flange 1666 configured to receive a plurality of fasteners. The plurality of fasteners extending through plurality of holes 1668 will secure filler panel structural attachment 1646 to a filler panel (not depicted). Filler panel structural attachment 1646 also comprises plurality of weep holes 1670. Plurality of weep holes 1670 allow for adhesive to flow from between filler panel structural attachment 1646 and a filler panel.

The illustration of corner bracket fitting 1600 and corner bracket fitting 1602 in FIG. 16 is not meant to imply physical or architectural limitations to the manner in which an illustrative embodiment may be implemented. Other components in addition to or in place of the ones illustrated may be used. Some components may be unnecessary. For example, at least one of plurality of weep holes 1624, plurality of weep holes 1630, or plurality of weep holes 1636 are optional.

Figure 17:
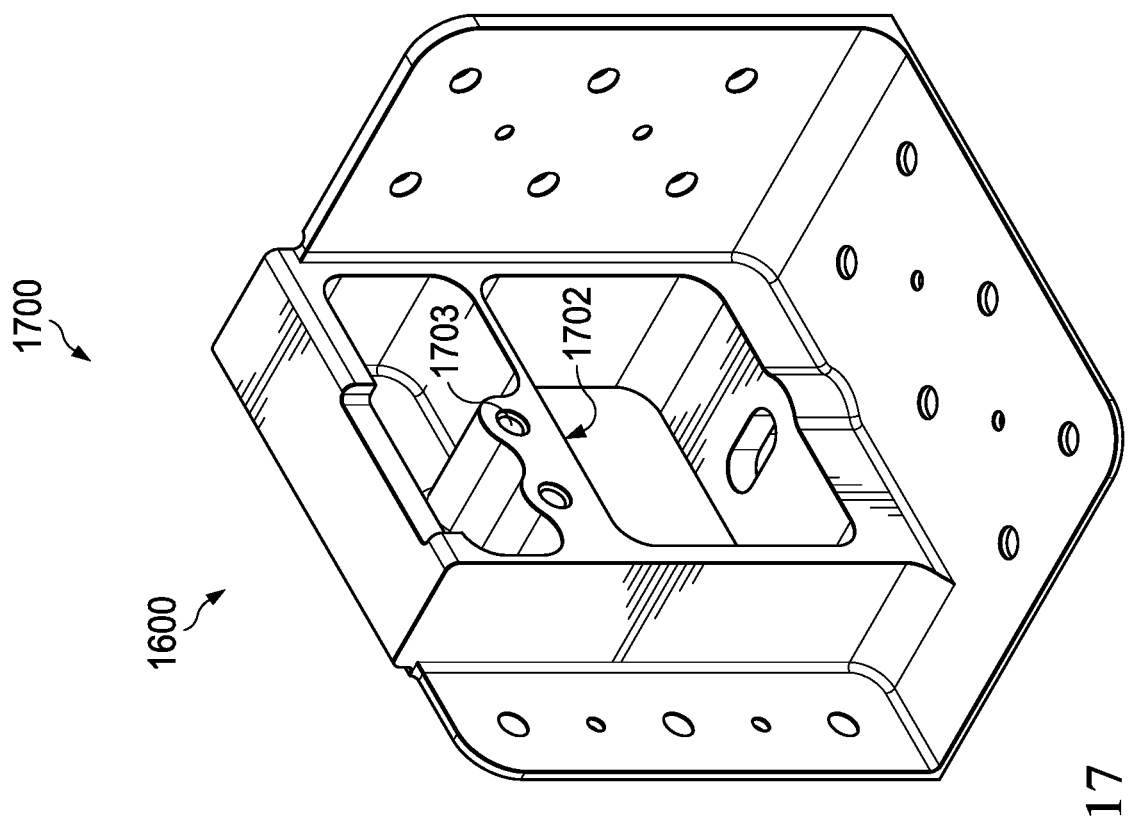
FIG. 17 is an illustration of a perspective back view of a pair of corner brackets of an attachment system in accordance with an illustrative embodiment.
Figure 17:
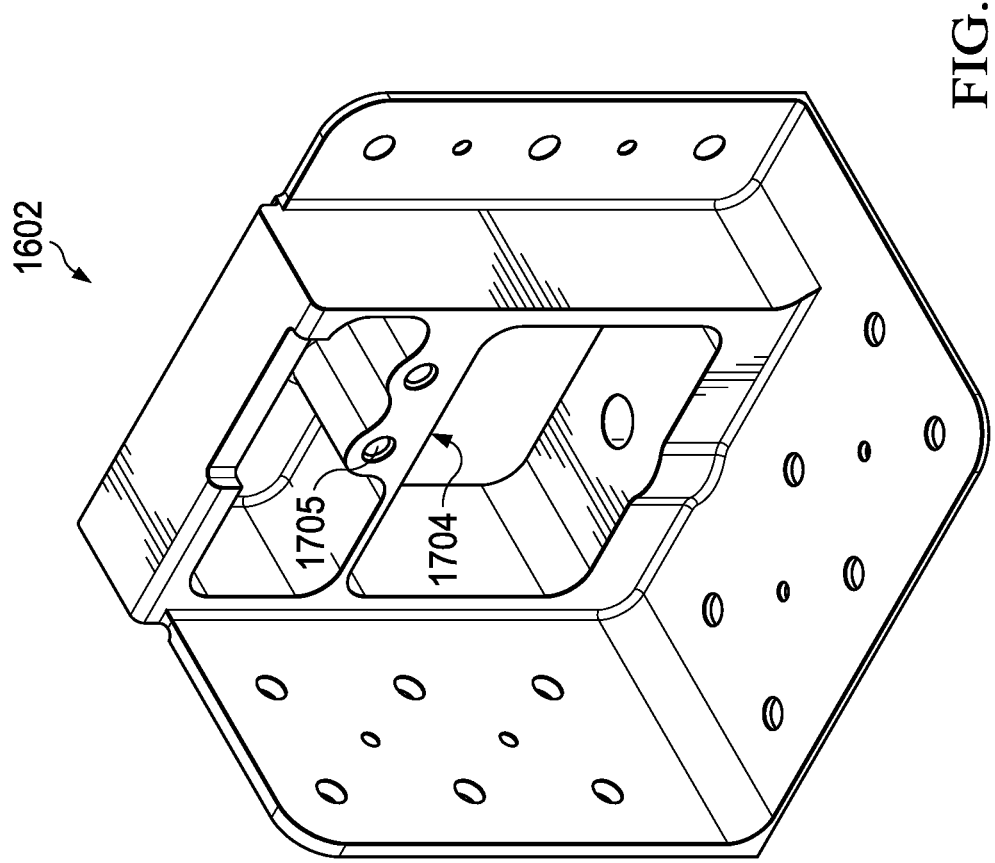

Turning to FIG. 17, an illustration of a perspective back view of a pair of corner bracket fittings of an attachment system is depicted in accordance with an illustrative embodiment. View 1700 is a back-perspective view of corner bracket fitting 1600 and corner bracket fitting 1602. Corner bracket fitting 1600 has connector 1702 in structural body 1604. Corner bracket fitting 1602 has connector 1704 in structural body 1638. Connector 1702 is configured to connect to a door strike. Connector 1702 is a built-in door strike provision. Connector 1702 accommodates forward or aft doors. In some illustrative examples, connector 1702 is hidden from view by a kick strip when not in use. Connector 1702 includes number of tapped holes 1703 to receive a number of helical coils. Number of tapped holes 1703 receives a number of helical coils to allow a door strike to be mechanically fastened to Corner bracket fitting 1600.

Connector 1704 is configured to connect to a door strike. Connector 1704 is a built-in door strike provision. Connector 1704 accommodates forward or aft doors. In some illustrative examples, connector 1704 is hidden from view by a kick strip when not in use. Connector 1704 includes number of tapped holes 1705 to receive a number of helical coils. Number of tapped holes 1705 receives a number of helical coils to allow a door strike to be mechanically fastened to Corner bracket fitting 1602.

Figure 18:
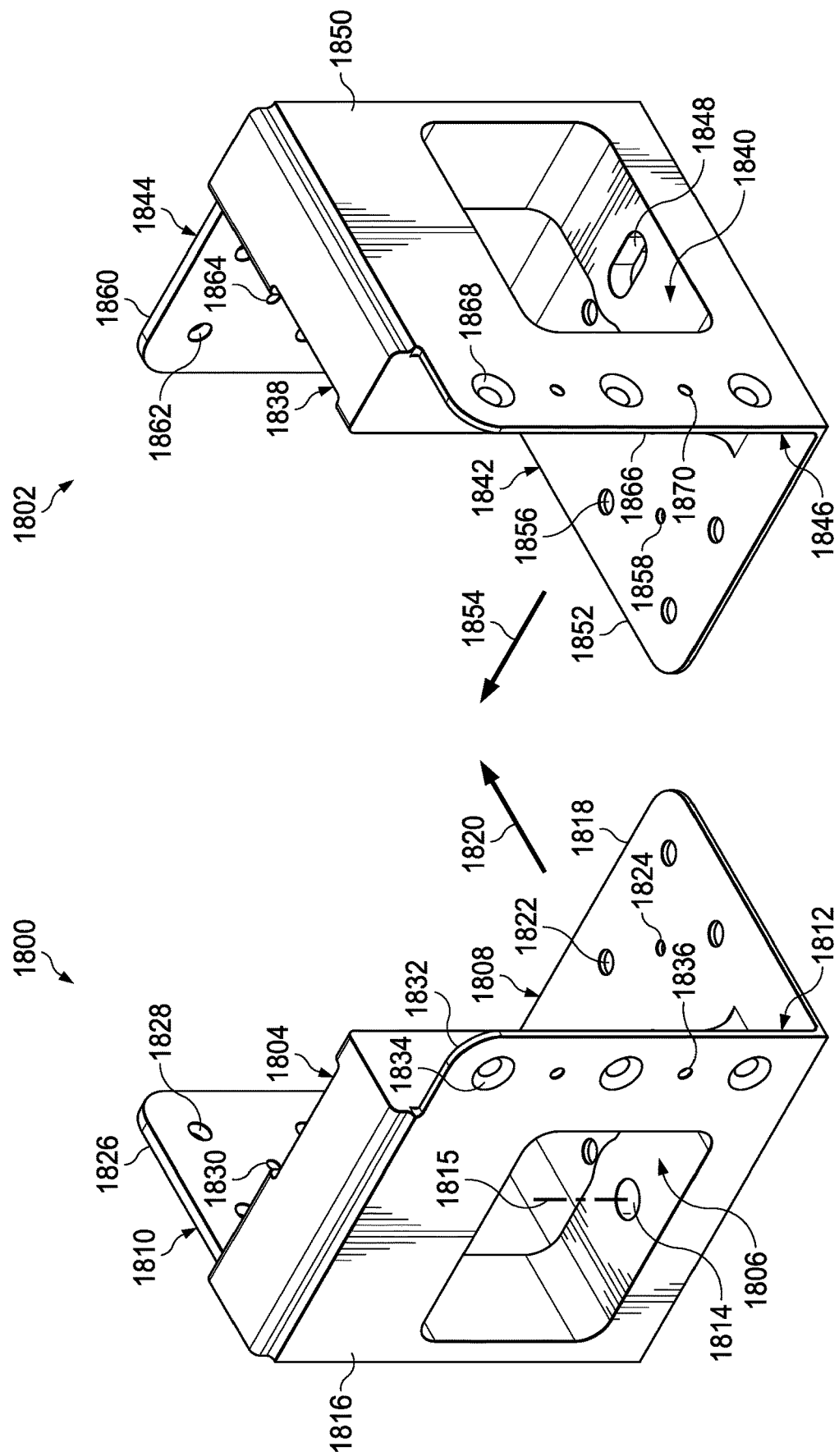
FIG. 18 is an illustration of a perspective view of a pair of corner brackets of an attachment system in accordance with an illustrative embodiment.

Turning to FIG. 18, an illustration of a perspective front view of a pair of corner bracket fittings of an attachment system is depicted in accordance with an illustrative embodiment. Corner bracket fitting 1800 and corner bracket fitting 1802 are components of an attachment system for a monument. Corner bracket fitting 1800 and corner bracket fitting 1802 can be used in any desirable type of monument, such as monument 202 of FIG. 2, monument 300 of FIG. 3, monument 402 of FIG. 4, monument 502 of FIG. 5, monument 602 of FIGS. 6 and 7, monument 802 of FIG. 8, monument 902 of FIGS. 9 and 10, or monument 1102 of FIG. 11. In some illustrative examples, corner bracket fitting 1800 and corner bracket fitting 1802 are components of attachment system 1200 of FIGS. 12 and 13. In some illustrative examples, corner bracket fitting 1800 is the same as corner bracket fitting 1400 of FIGS. 14 and 15. Corner bracket fitting 1802 is an alternative design to corner bracket fitting 1402 of FIGS. 14 and 15.

Corner bracket fitting 1800 can be referred to as a left bracket fitting. Corner bracket fitting 1802 can be referred to as a right bracket. In this illustrative example, corner bracket fitting 1800 and corner bracket fitting 1802 are mirror images of each other.

Corner bracket fitting 1800 comprises structural body 1804 with seat track interface 1806, floor panel structural attachment 1808, face panel structural attachment 1810, and filler panel structural attachment 1812. Seat track interface 1806 comprises cylindrical channel 1814. Cylindrical channel 1814 extends through structural body 1804. Centerline 1815 of cylindrical channel 1814 is parallel to front face 1816 of corner bracket fitting 1800.

Floor panel structural attachment 1808 comprises flange 1818 extending away from front face 1816 of structural body 1804 in direction 1820. Floor panel structural attachment 1808 comprises flange 1818 extending from structural body 1804. Floor panel structural attachment 1808 further comprises plurality of holes 1822 in flange 1818 configured to receive a plurality of fasteners. The plurality of fasteners extending through plurality of holes 1822 will secure floor panel structural attachment 1808 to a floor panel (not depicted). Floor panel structural attachment 1808 also comprises plurality of weep holes 1824. Plurality of weep holes 1824 allow for adhesive to flow from between floor panel structural attachment 1808 and a floor panel.

Face panel structural attachment 1810 comprises flange 1826 extending from structural body 1804 and substantially perpendicular to floor panel structural attachment 1808. When viewing corner bracket fitting 1800 from front face 1816, face panel structural attachment 1810 is on the left side of structural body 1804. Corner bracket fitting 1800 can be referred to as a left corner bracket fitting. Face panel structural attachment 1810 has plurality of holes 1828 in flange 1826 configured to receive a plurality of fasteners. The plurality of fasteners extending through plurality of holes 1828 will secure face panel structural attachment 1810 to a face panel (not depicted). Face panel structural attachment 1810 also comprises plurality of weep holes 1830. Plurality of weep holes 1830 allow for adhesive to flow from between face panel structural attachment 1810 and a face panel.

Filler panel structural attachment 1812 comprises flange 1832 extending from structural body 1804 and substantially perpendicular to both face panel structural attachment 1810 and floor panel structural attachment 1808. Filler panel structural attachment 1812 has plurality of holes 1834 in flange 1832 configured to receive a plurality of fasteners. The plurality of fasteners extending through plurality of holes 1834 will secure filler panel structural attachment 1812 to a filler panel (not depicted). Filler panel structural attachment 1812 also comprises plurality of weep holes 1836. Plurality of weep holes 1836 allow for adhesive to flow from between filler panel structural attachment 1812 and a filler panel.

Corner bracket fitting 1802 comprises structural body 1838 with seat track interface 1840, floor panel structural attachment 1842, face panel structural attachment 1844, and filler panel structural attachment 1846. Seat track interface 1840 comprises slot 1848 extending perpendicular to front face 1850 of corner bracket fitting 1802. Slot 1848 is present to prevent undesirable load sharing with a floor structure. Slot 1848 allows a monument containing corner bracket fitting 1802 to not carry load in a y-direction.

Floor panel structural attachment 1842 comprises flange 1852 extending from structural body 1838 in direction 1854 parallel to slot 1848. Floor panel structural attachment 1842 further comprises plurality of holes 1856 in flange 1852 configured to receive a plurality of fasteners. The plurality of fasteners extending through plurality of holes 1856 will secure floor panel structural attachment 1842 to a floor panel (not depicted). Floor panel structural attachment 1842 also comprises plurality of weep holes 1858. Plurality of weep holes 1858 allow for adhesive to flow from between floor panel structural attachment 1842 and a floor panel.

Face panel structural attachment 1844 comprises flange 1860 extending from structural body 1838 and substantially perpendicular to floor panel structural attachment 1842. When viewing corner bracket fitting 1802 from front face 1850, face panel structural attachment 1844 is on the right side of structural body 1838. Corner bracket fitting 1802 can be referred to as a right corner bracket fitting. Face panel structural attachment 1844 has plurality of holes 1862 in flange 1860 configured to receive a plurality of fasteners. Face panel structural attachment 1844 also comprises plurality of weep holes 1864. Plurality of weep holes 1864 allow for adhesive to flow from between face panel structural attachment 1844 and a face panel.

Filler panel structural attachment 1846 comprises flange 1866 extending from structural body 1838 and substantially perpendicular to both face panel structural attachment 1844 and floor panel structural attachment 1842. Filler panel structural attachment 1846 has plurality of holes 1868 in flange 1866 configured to receive a plurality of fasteners. Filler panel structural attachment 1846 also comprises plurality of weep holes 1870. Plurality of weep holes 1870 allow for adhesive to flow from between filler panel structural attachment 1846 and a filler panel.

The illustration of corner bracket fitting 1800 and corner bracket fitting 1802 in FIG. 18 is not meant to imply physical or architectural limitations to the manner in which an illustrative embodiment may be implemented. Other components in addition to or in place of the ones illustrated may be used. Some components may be unnecessary. For example, at least one of plurality of weep holes 1824, plurality of weep holes 1830, or plurality of weep holes 1836 are optional.

Figure 19:
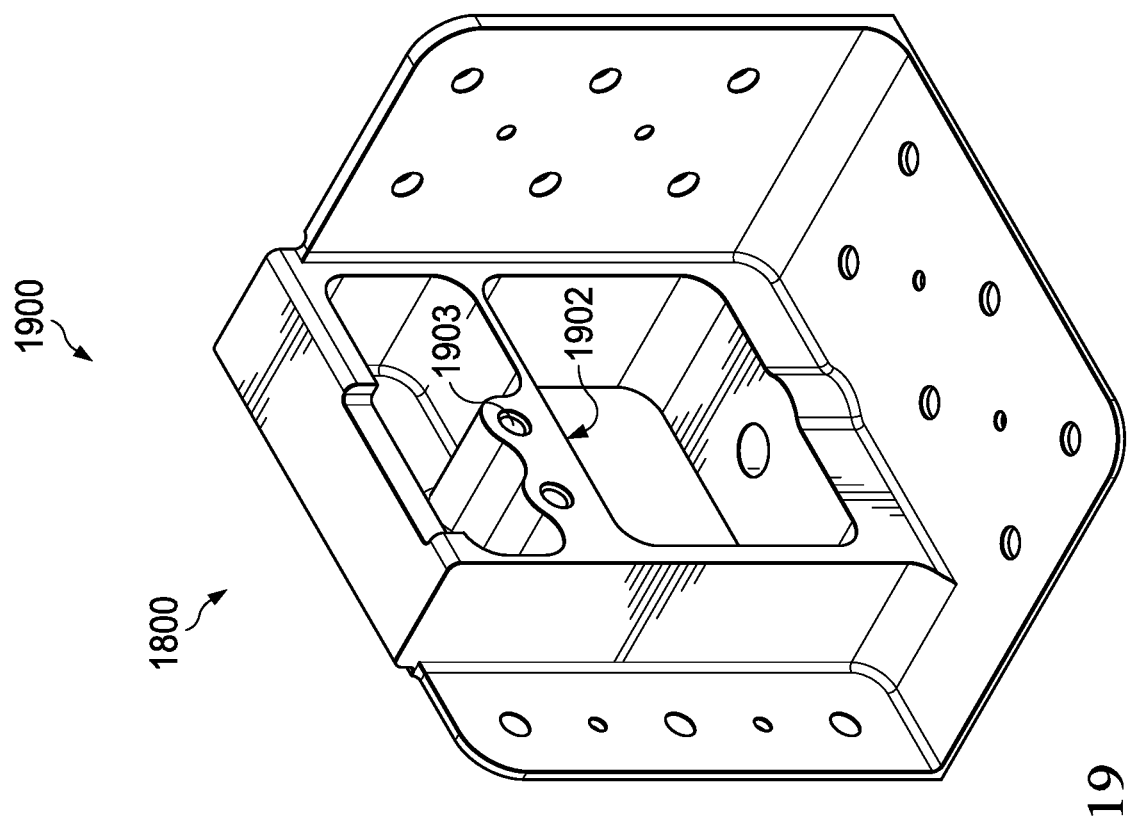
FIG. 19 is an illustration of a perspective back view of a pair of corner brackets of an attachment system in accordance with an illustrative embodiment.
Figure 19:
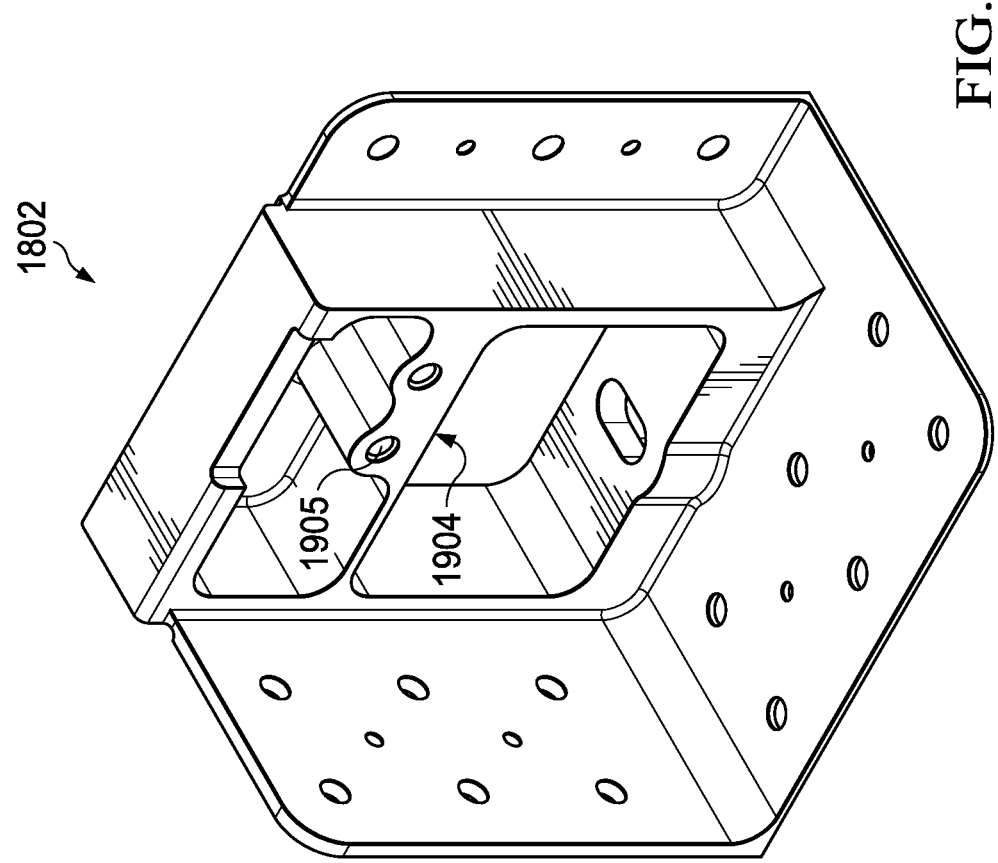

Turning to FIG. 19, an illustration of a perspective back view of a pair of corner bracket fittings of an attachment system is depicted in accordance with an illustrative embodiment. View 1900 is a back-perspective view of corner bracket fitting 1800 and corner bracket fitting 1802. Corner bracket fitting 1800 has connector 1902 in structural body 1804. Corner bracket fitting 1802 has connector 1904 in structural body 1838. Connector 1902 is configured to connect to a door strike. Connector 1902 is a built-in door strike provision. Connector 1902 accommodates forward or aft doors. In some illustrative examples, connector 1902 is hidden from view by a kick strip when not in use. Connector 1902 includes number of tapped holes 1903 to receive a number of helical coils. Number of tapped holes 1903 receives a number of helical coils to allow a door strike to be mechanically fastened to Corner bracket fitting 1800.

Connector 1904 is configured to connect to a door strike. Connector 1904 is a built-in door strike provision. Connector 1904 accommodates forward or aft doors. In some illustrative examples, connector 1904 is hidden from view by a kick strip when not in use. Connector 1904 includes number of tapped holes 1905 to receive a number of helical coils. Number of tapped holes 1905 receives a number of helical coils to allow a door strike to be mechanically fastened to Corner bracket fitting 1802.

Figure 20:
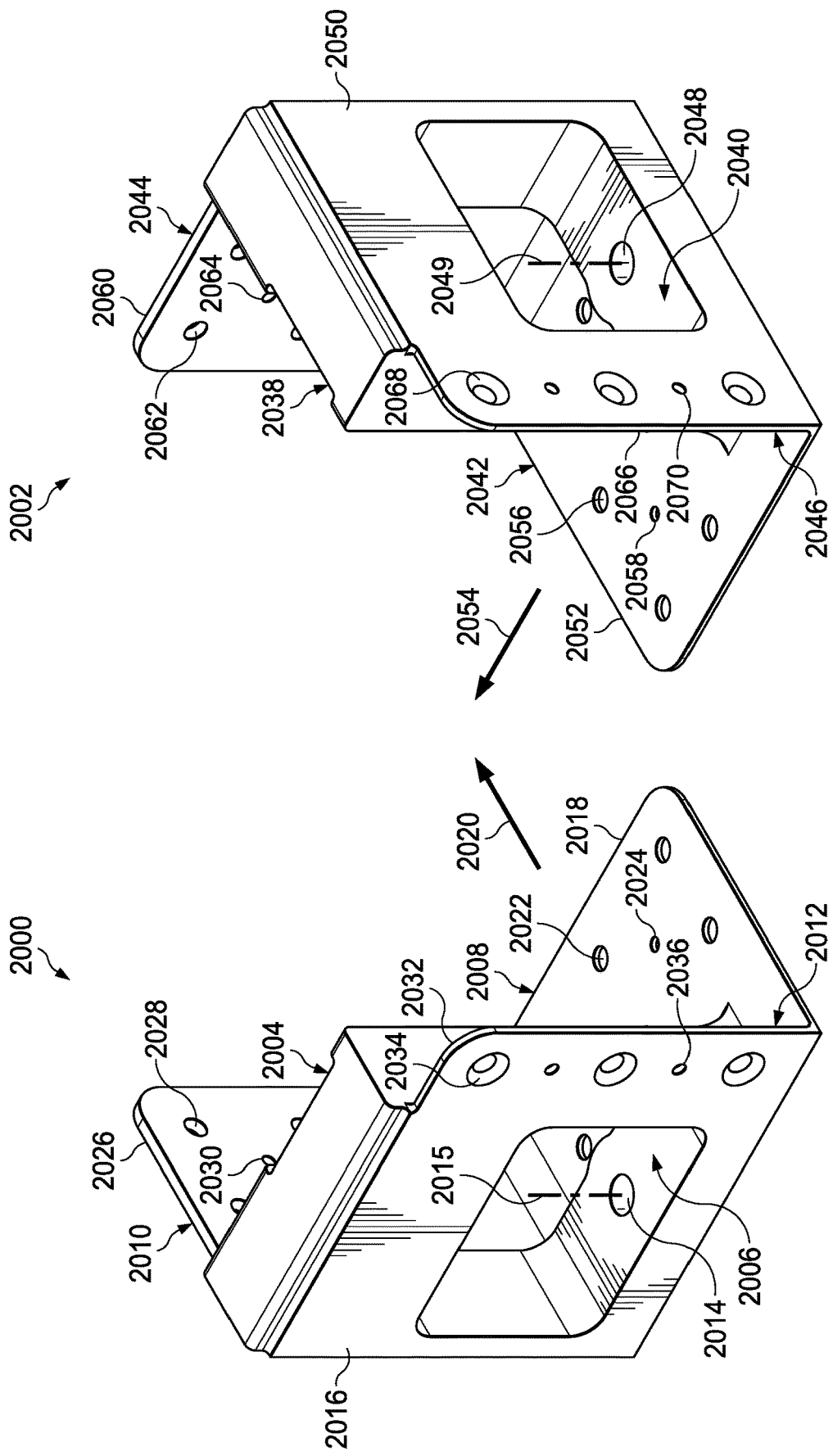
FIG. 20 is an illustration of a perspective view of a pair of corner brackets of an attachment system in accordance with an illustrative embodiment.

Turning to FIG. 20, an illustration of a perspective front view of a pair of corner bracket fittings of an attachment system is depicted in accordance with an illustrative embodiment. Corner bracket fitting 2000 and corner bracket fitting 2002 are components of an attachment system for a monument. Corner bracket fitting 2000 and corner bracket fitting 2002 can be used in any desirable type of monument, such as monument 202 of FIG. 2, monument 300 of FIG. 3, monument 402 of FIG. 4, monument 502 of FIG. 5, monument 602 of FIGS. 6 and 7, monument 802 of FIG. 8, monument 902 of FIGS. 9 and 10, or monument 1102 of FIG. 11. In some illustrative examples, corner bracket fitting 2000 and corner bracket fitting 2002 are components of attachment system 1200 of FIGS. 12 and 13. In some illustrative examples, corner bracket fitting 2000 is the same as corner bracket fitting 1400 of FIGS. 14 and 15. Corner bracket fitting 2002 is an alternative design to corner bracket fitting 1402 of FIGS. 14 and 15.

Corner bracket fitting 2000 can be referred to as a left bracket fitting. Corner bracket fitting 2002 can be referred to as a right bracket. In this illustrative example, corner bracket fitting 2000 and corner bracket fitting 2002 are mirror images of each other.

Corner bracket fitting 2000 comprises structural body 2004 with seat track interface 2006, floor panel structural attachment 2008, face panel structural attachment 2010, and filler panel structural attachment 2012. Seat track interface 2006 comprises cylindrical channel 2014. Cylindrical channel 2014 extends through structural body 2004. Centerline 2015 of cylindrical channel 2014 is parallel to front face 2016 of corner bracket fitting 2000.

Floor panel structural attachment 2008 comprises flange 2018 extending away from front face 2016 of structural body 2004 in direction 2020. Floor panel structural attachment 2008 comprises flange 2018 extending from structural body 2004. Floor panel structural attachment 2008 further comprises plurality of holes 2022 in flange 2018 configured to receive a plurality of fasteners. The plurality of fasteners extending through plurality of holes 2022 will secure floor panel structural attachment 2008 to a floor panel (not depicted). Floor panel structural attachment 2008 also comprises plurality of weep holes 2024. Plurality of weep holes 2024 allow for adhesive to flow from between floor panel structural attachment 2008 and a floor panel.

Face panel structural attachment 2010 comprises flange 2026 extending from structural body 2004 and substantially perpendicular to floor panel structural attachment 2008. When viewing corner bracket fitting 2000 from front face 2016, face panel structural attachment 2010 is on the left side of structural body 2004. Corner bracket fitting 2000 can be referred to as a left corner bracket fitting. Face panel structural attachment 2010 has plurality of holes 2028 in flange 2026 configured to receive a plurality of fasteners. The plurality of fasteners extending through plurality of holes 2028 will secure face panel structural attachment 2010 to a face panel (not depicted). Face panel structural attachment 2010 also comprises plurality of weep holes 2030. Plurality of weep holes 2030 allow for adhesive to flow from between face panel structural attachment 2010 and a face panel.

Filler panel structural attachment 2012 comprises flange 2032 extending from structural body 2004 and substantially perpendicular to both face panel structural attachment 2010 and floor panel structural attachment 2008. Filler panel structural attachment 2012 has plurality of holes 2034 in flange 2032 configured to receive a plurality of fasteners. The plurality of fasteners extending through plurality of holes 2034 will secure filler panel structural attachment 2012 to a filler panel (not depicted). Filler panel structural attachment 2012 also comprises plurality of weep holes 2036. Plurality of weep holes 2036 allow for adhesive to flow from between filler panel structural attachment 2012 and a filler panel.

Corner bracket fitting 2002 comprises structural body 2038 with seat track interface 2040, floor panel structural attachment 2042, face panel structural attachment 2044, and filler panel structural attachment 2046. Seat track interface 2040 comprises cylindrical channel 2048. Cylindrical channel 2048 extends through structural body 2038. Centerline 2049 of cylindrical channel 2048 is parallel to front face 2050 of corner bracket fitting 2002.

Floor panel structural attachment 2042 comprises flange 2052 extending from structural body 2038 in direction 2054. Floor panel structural attachment 2042 further comprises plurality of holes 2056 in flange 2052 configured to receive a plurality of fasteners. The plurality of fasteners extending through plurality of holes 2056 will secure floor panel structural attachment 2042 to a floor panel (not depicted). Floor panel structural attachment 2042 also comprises plurality of weep holes 2058. Plurality of weep holes 2058 allow for adhesive to flow from between floor panel structural attachment 2042 and a floor panel.

Face panel structural attachment 2044 comprises flange 2060 extending from structural body 2038 and substantially perpendicular to floor panel structural attachment 2042. When viewing corner bracket fitting 2002 from front face 2050, face panel structural attachment 2044 is on the right side of structural body 2038. Corner bracket fitting 2002 can be referred to as a right corner bracket fitting. Face panel structural attachment 2044 has plurality of holes 2062 in flange 2060 configured to receive a plurality of fasteners. Face panel structural attachment 2044 also comprises plurality of weep holes 2064. Plurality of weep holes 2064 allow for adhesive to flow from between face panel structural attachment 2044 and a face panel.

Filler panel structural attachment 2046 comprises flange 2066 extending from structural body 2038 and substantially perpendicular to both face panel structural attachment 2044 and floor panel structural attachment 2042. Filler panel structural attachment 2046 has plurality of holes 2068 in flange 2066 configured to receive a plurality of fasteners. Filler panel structural attachment 2046 also comprises plurality of weep holes 2070. Plurality of weep holes 2070 allow for adhesive to flow from between filler panel structural attachment 2046 and a filler panel.

The illustration of corner bracket fitting 2000 and corner bracket fitting 2002 in FIG. 18 is not meant to imply physical or architectural limitations to the manner in which an illustrative embodiment may be implemented. Other components in addition to or in place of the ones illustrated may be used. Some components may be unnecessary. For example, at least one of plurality of weep holes 2024, plurality of weep holes 2030, or plurality of weep holes 2036 are optional.

Figure 21:
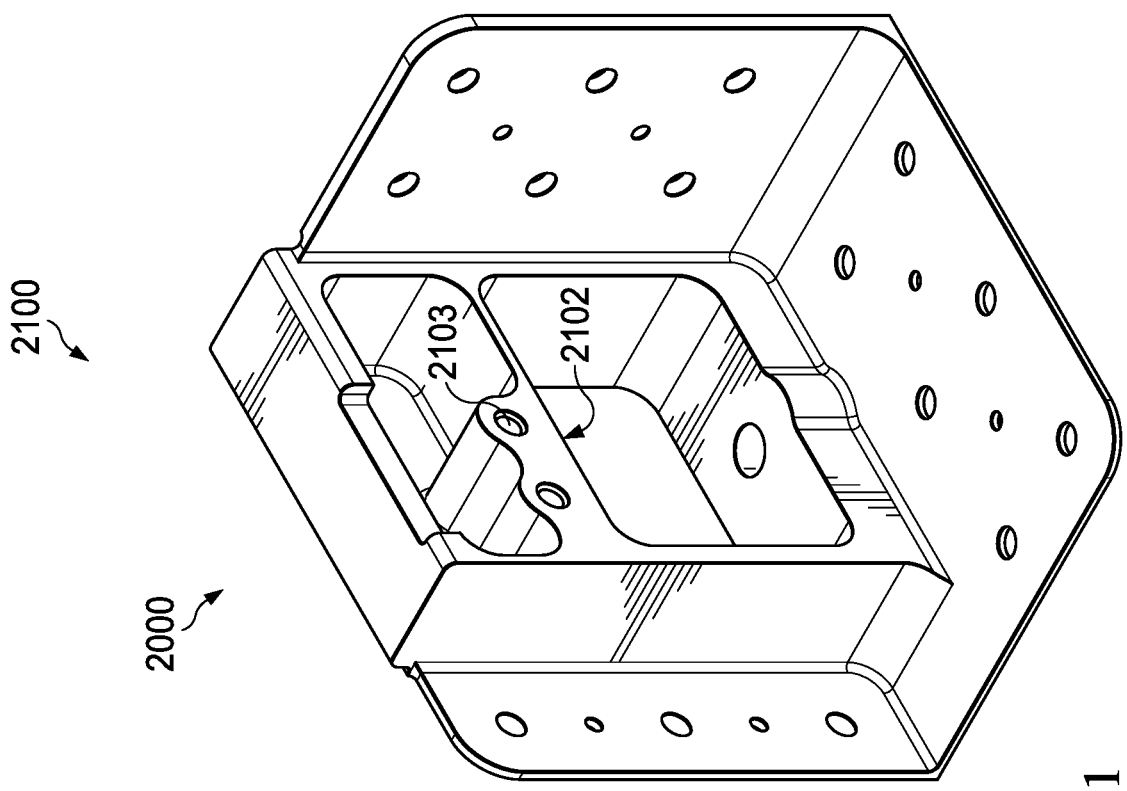
FIG. 21 is an illustration of a perspective back view of a pair of corner brackets of an attachment system in accordance with an illustrative embodiment.
Figure 21:
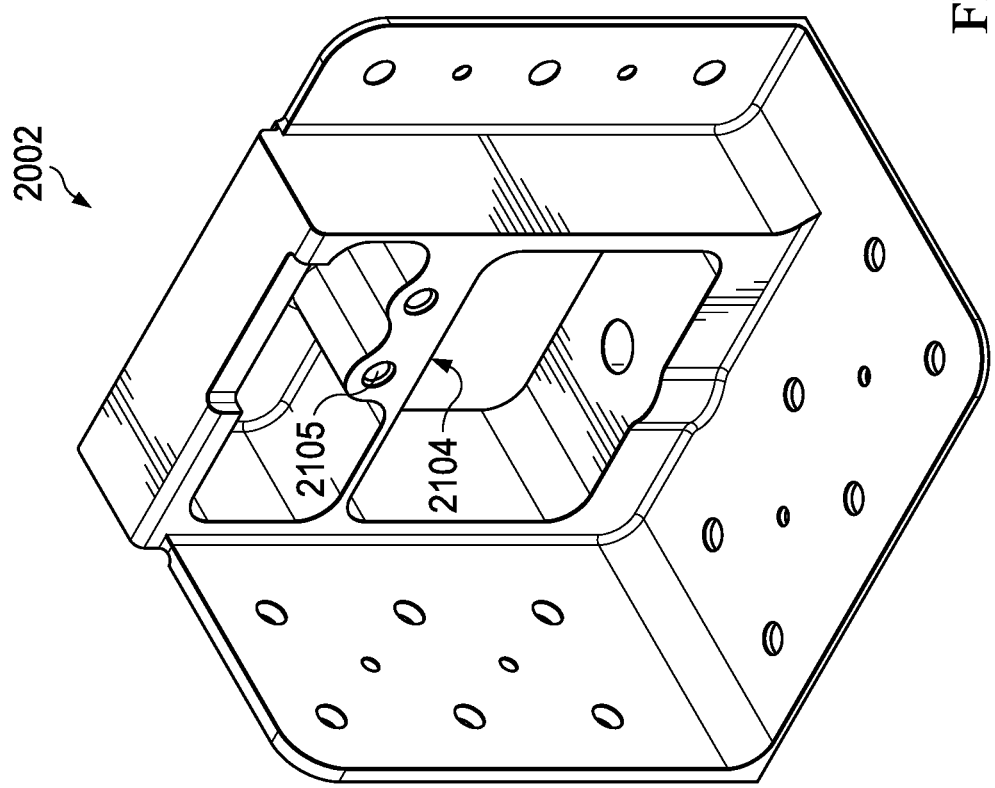

Turning to FIG. 21, an illustration of a perspective back view of a pair of corner bracket fittings of an attachment system is depicted in accordance with an illustrative embodiment. View 2100 is a back-perspective view of corner bracket fitting 2000 and corner bracket fitting 2002. Corner bracket fitting 2000 has connector 2102 in structural body 2004. Corner bracket fitting 2002 has connector 2104 in structural body 2038. Connector 2102 is configured to connect to a door strike. Connector 2102 is a built-in door strike provision. Connector 2102 accommodates forward or aft doors. In some illustrative examples, connector 2102 is hidden from view by a kick strip when not in use. Connector 2102 includes number of tapped holes 2103 to receive a number of helical coils. Number of tapped holes 2103 receives a number of helical coils to allow a door strike to be mechanically fastened to Corner bracket fitting 2000.

Connector 2104 is configured to connect to a door strike. Connector 2104 is a built-in door strike provision. Connector 2104 accommodates forward or aft doors. In some illustrative examples, connector 2104 is hidden from view by a kick strip when not in use. Connector 2104 includes number of tapped holes 2105 to receive a number of helical coils. Number of tapped holes 2105 receives a number of helical coils to allow a door strike to be mechanically fastened to Corner bracket fitting 2002.

Figure 22:
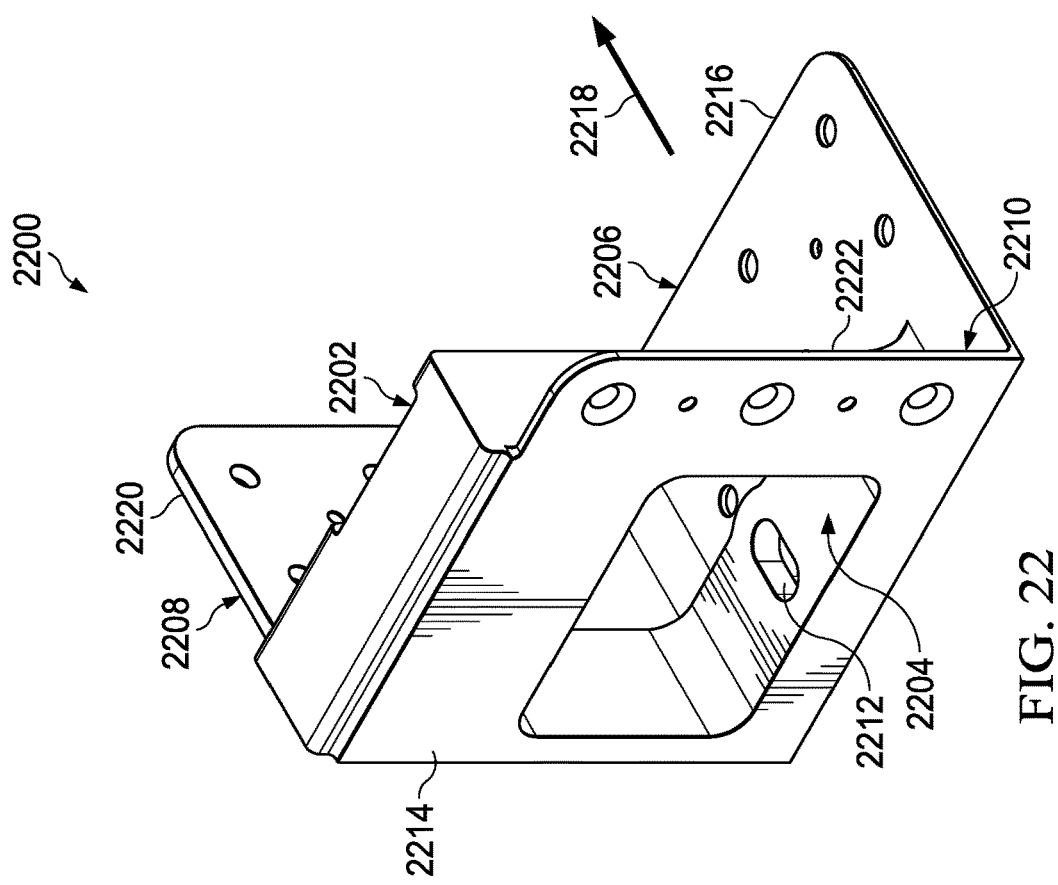
FIG. 22 is an illustration of an upper front perspective view of a corner bracket fitting in accordance with an illustrative embodiment.

Turning to FIG. 22, an illustration of an upper front perspective view of a corner bracket fitting is depicted in accordance with an illustrative embodiment. Corner bracket fitting 2200 can be used to mount a monument in aircraft 100 of FIG. 1. Corner bracket fitting 2200 can be used to mount monument 202 of FIG. 2. Corner bracket fitting 2200 can be used to mount monument 300 in seat track 302 of FIG. 3. Corner bracket fitting 2200 can be the same as left corner bracket fitting 410 of FIG. 4. Corner bracket fitting 2200 can be the same as left corner bracket fitting 510 of FIG. 5. Corner bracket fitting 2200 can be the same as at least one of corner bracket fitting 614 of FIG. 6. Corner bracket fitting 2200 can be the same as corner bracket fitting 908 of FIG. 9. Corner bracket fitting 2200 can be the same as corner bracket fitting 1108 of FIG. 11. Corner bracket fitting 2200 can be the same as left corner bracket fitting 1204 of FIGS. 12-13. Corner bracket fitting 2200 can be the same as corner bracket fitting 1400 of FIGS. 14-15. Corner bracket fitting 2200 can be the same as corner bracket fitting 1600 of FIGS. 16-17.

Corner bracket fitting 2200 comprises structural body 2202 with seat track interface 2204, floor panel structural attachment 2206, face panel structural attachment 2208, and filler panel structural attachment 2210. Structural body 2202 may also be referred to as a frame.

In this illustrative example, seat track interface 2204 comprises slot 2212 extending perpendicular to front face 2214 of corner bracket fitting 2200. In other illustrative examples, seat track interface 2204 comprises a cylindrical channel. In these non-depicted examples, the cylindrical channel extends through structural body 2202. In these non-depicted examples, a centerline of the cylindrical channel is parallel to front face 2214 of corner bracket fitting 2200.

Corner bracket fitting 2200 is a left corner bracket fitting. Corner bracket fitting 2200 is configured to join a left face panel to a floor panel.

Floor panel structural attachment 2206 comprises flange 2216 extending from structural body 2202 in direction 2218 parallel to slot 2212. Face panel structural attachment 2208 comprises flange 2220 extending from structural body 2202 and substantially perpendicular to floor panel structural attachment 2206.

Filler panel structural attachment 2210 comprises flange 2222 extending from structural body 2202 and substantially perpendicular to both face panel structural attachment 2208 and floor panel structural attachment 2206.

Figure 23:
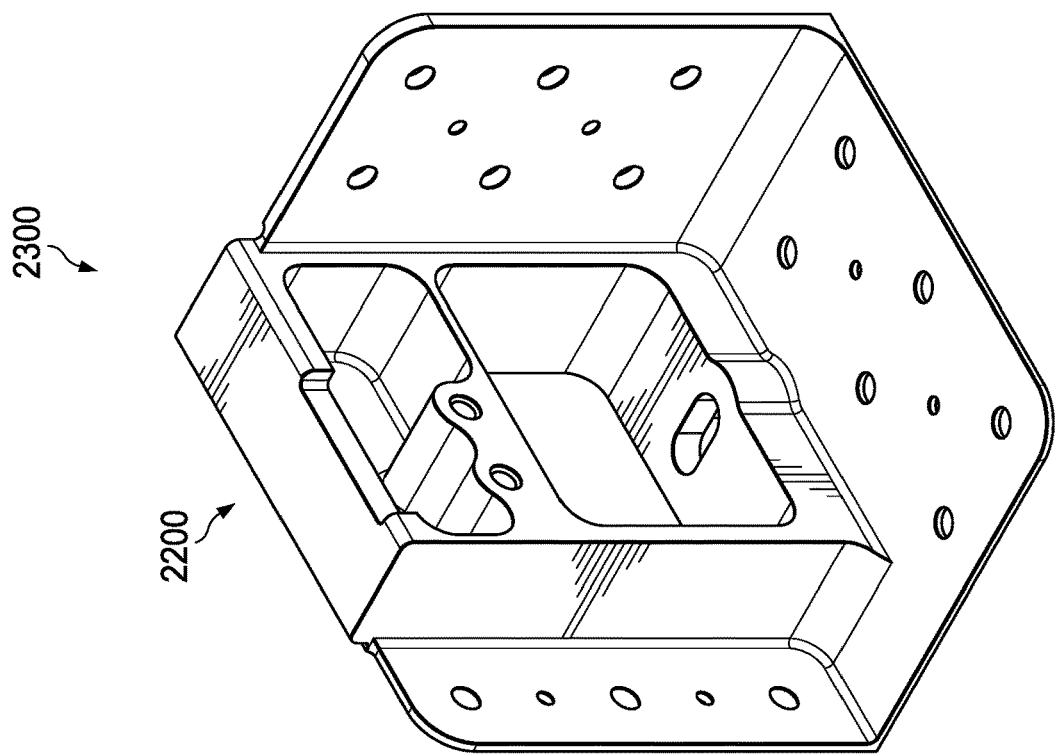
FIG. 23 is an illustration of an upper back perspective view of a corner bracket fitting in accordance with an illustrative embodiment.

Turning to FIG. 23, an illustration of an upper back perspective view of a corner bracket fitting is depicted in accordance with an illustrative embodiment. View 2300 is an upper back perspective view of corner bracket fitting 2200.

Figure 24:
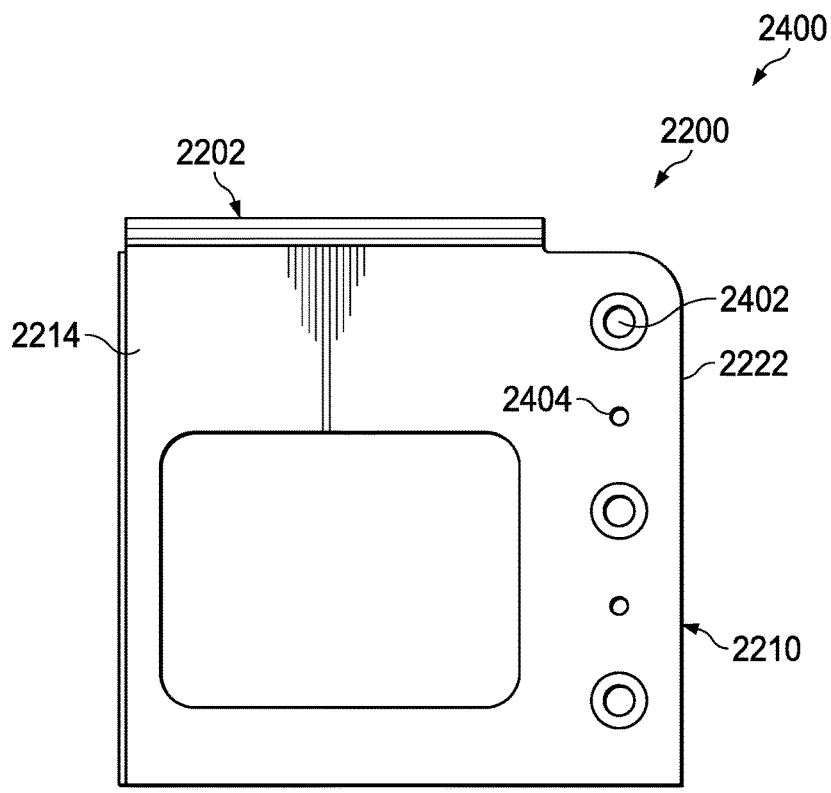
FIG. 24 is an illustration of a front view of a corner bracket fitting in accordance with an illustrative embodiment.

Turning now to FIG. 24, an illustration of a front view of a corner bracket fitting is depicted in accordance with an illustrative embodiment. View 2400 is a front view of corner bracket fitting 2200. In view 2400, plurality of holes 2402 in flange 2222 are visible. Filler panel structural attachment 2210 comprises plurality of holes 2402 in flange 2222 configured to receive a plurality of fasteners. The plurality of fasteners (not depicted) sent through plurality of holes 2402 will join corner bracket fitting 2200 to a filler panel (not depicted). As depicted, filler panel structural attachment 2210 further comprises plurality of weep holes 2404. In some illustrative examples, adhesive is applied between filler panel structural attachment 2210 and a filler panel to bond filler panel structural attachment 2210 to the filler panel. Plurality of weep holes 2404 allows for adhesive to flow from between filler panel structural attachment 2210 and a filler panel.

Figure 25:
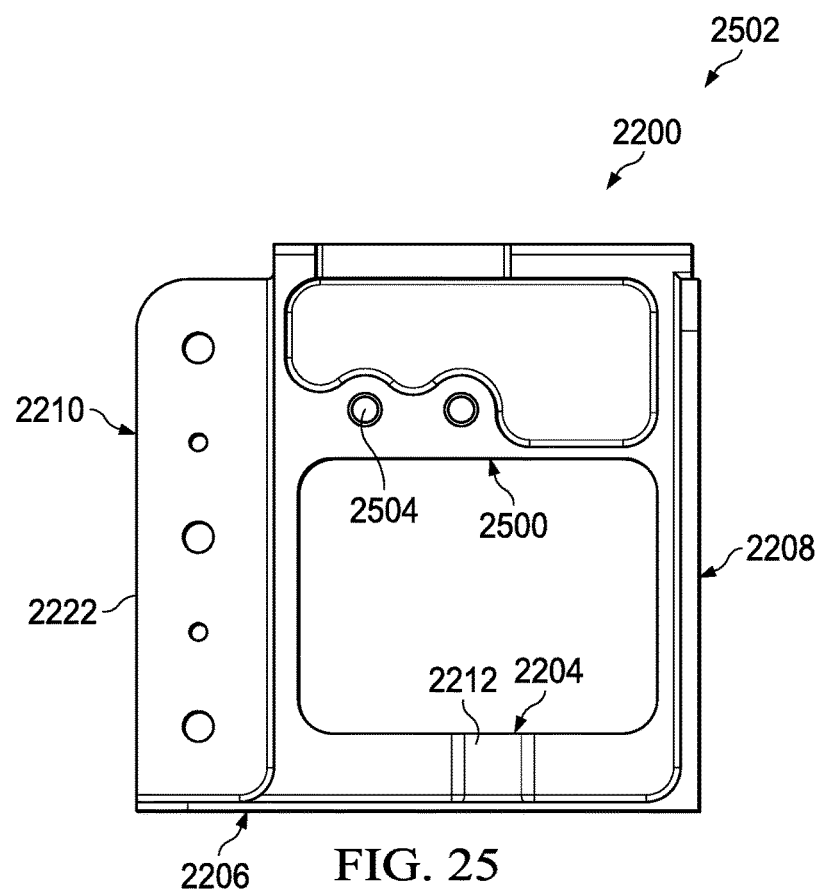
FIG. 25 is an illustration of a back view of a corner bracket fitting in accordance with an illustrative embodiment.

Turning to FIG. 25, an illustration of a back view of a corner bracket fitting is depicted in accordance with an illustrative embodiment. View 2502 is a back view of corner bracket fitting 2200. Connector 2500 of structural body 2202 is visible in view 2502 of corner bracket fitting 2200. Connector 2500 is configured to connect to a door strike. Connector 2500 includes number of tapped holes 2504 to receive a number of helical coils.

Figure 26:
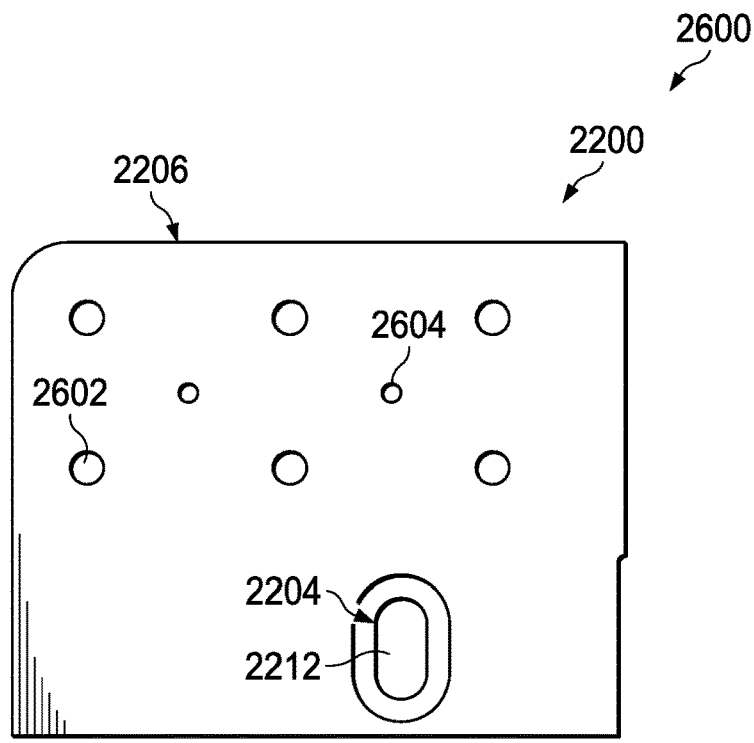
FIG. 26 is an illustration of a bottom view of a corner bracket fitting in accordance with an illustrative embodiment.

Turning to FIG. 26, an illustration of a bottom view of a corner bracket fitting is depicted in accordance with an illustrative embodiment. View 2600 is a bottom view of corner bracket fitting 2200. Floor panel structural attachment 2206 further comprises plurality of holes 2602 in flange 2216 configured to receive a plurality of fasteners. The plurality of fasteners (not depicted) sent through plurality of holes 2602 will join corner bracket fitting 2200 to a floor panel (not depicted).

As depicted, floor panel structural attachment 2206 further comprises plurality of weep holes 2604. In some illustrative examples, adhesive is applied between floor panel structural attachment 2206 and a floor panel (not depicted) to bond floor panel structural attachment 2206 to the floor panel. Plurality of weep holes 2604 allows for adhesive to flow from between floor panel structural attachment 2206 and a floor panel.

Figure 27:
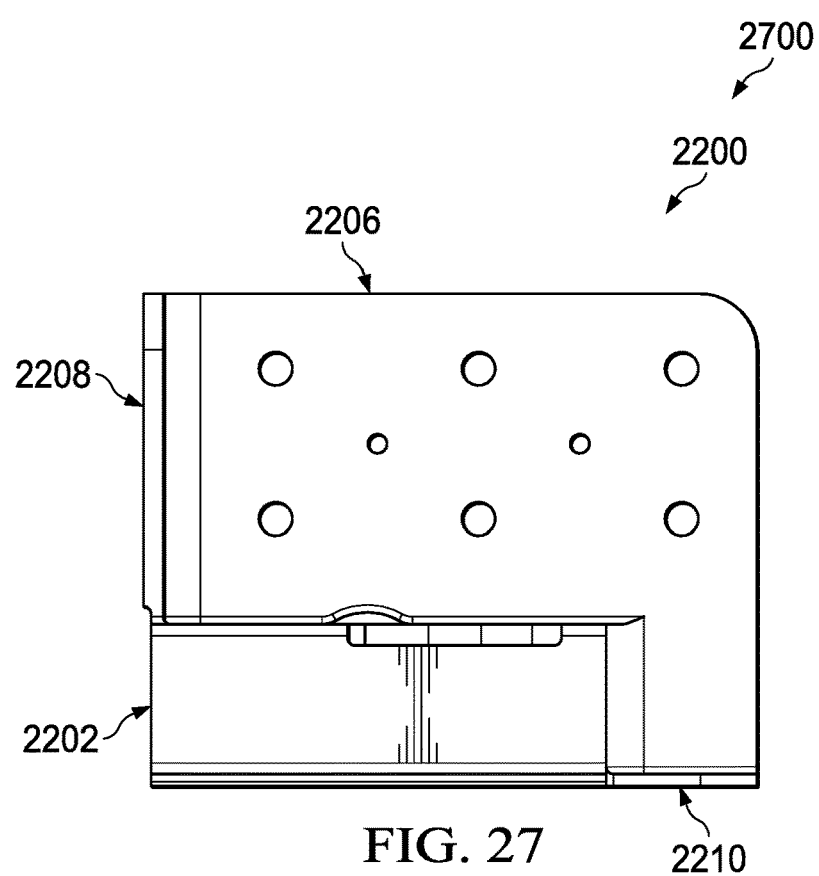
FIG. 27 is an illustration of a top view of a corner bracket fitting in accordance with an illustrative embodiment.

Turning to FIG. 27, an illustration of a top view of a corner bracket fitting is depicted in accordance with an illustrative embodiment. View 2700 is a top view of corner bracket fitting 2200.

Figure 28:
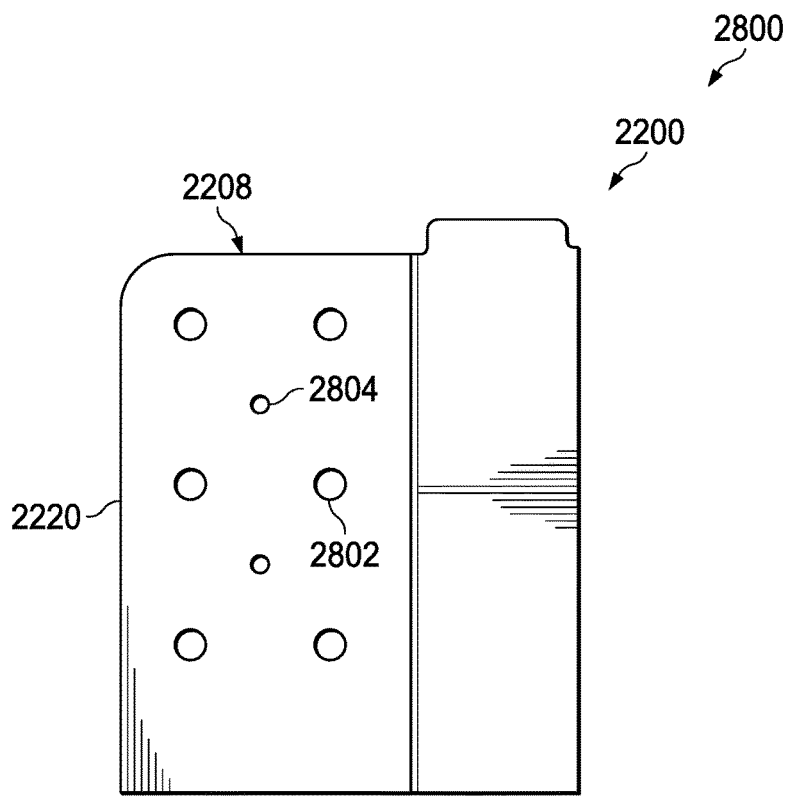
FIG. 28 is an illustration of a left view of a corner bracket fitting in accordance with an illustrative embodiment.

Turning to FIG. 28, an illustration of a left view of a corner bracket fitting is depicted in accordance with an illustrative embodiment. View 2800 is a left view of corner bracket fitting 2200. Face panel structural attachment 2208 further comprises plurality of holes 2802 in flange 2220 configured to receive a plurality of fasteners. The plurality of fasteners (not depicted) sent through plurality of holes 2802 will join corner bracket fitting 2200 to a face panel (not depicted).

As depicted, face panel structural attachment 2208 further comprises plurality of weep holes 2804. In some illustrative examples, adhesive is applied between face panel structural attachment 2208 and a face panel (not depicted) to bond face panel structural attachment 2208 to the face panel. Plurality of weep holes 2804 allows for adhesive to flow from between face panel structural attachment 2208 and a face panel.

Figure 29:
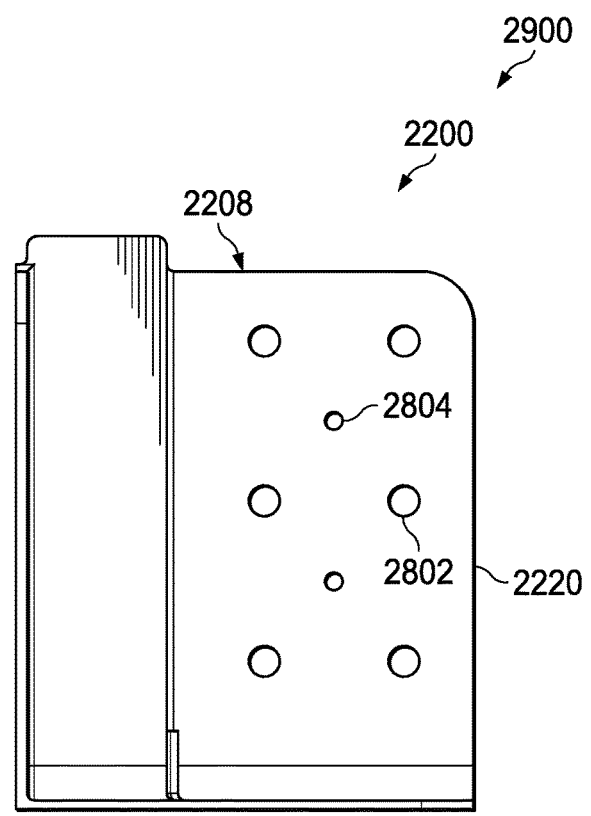
FIG. 29 is an illustration of a right view of a corner bracket fitting in accordance with an illustrative embodiment.

Turning to FIG. 29, an illustration of a right view of a corner bracket fitting is depicted in accordance with an illustrative embodiment. View 2900 is a right view of corner bracket fitting 2200.

Figure 30:
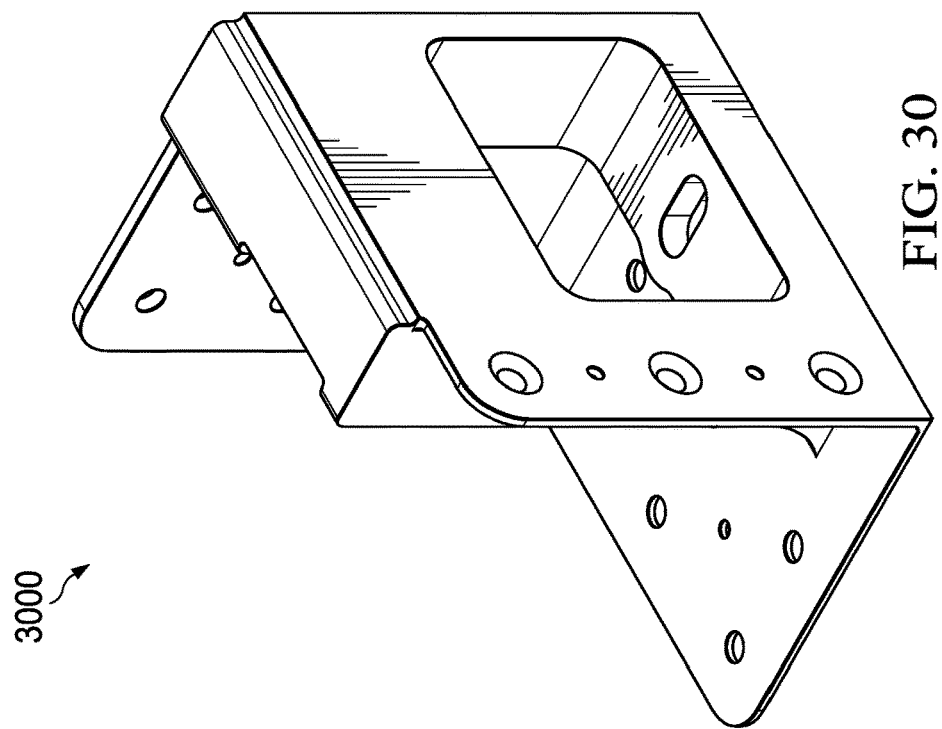
FIG. 30 is an illustration of an upper front perspective view of a corner bracket fitting in accordance with an illustrative embodiment.

Turning to FIG. 30, an illustration of an upper front perspective view of a corner bracket fitting is depicted in accordance with an illustrative embodiment. Corner bracket fitting 3000 can be used to mount a monument in aircraft 100 of FIG. 1. Corner bracket fitting 3000 can be used to mount monument 202 of FIG. 2. Corner bracket fitting 3000 can be used to mount monument 300 in seat track 302 of FIG. 3. Corner bracket fitting 3000 can be the same as right corner bracket fitting 408 of FIG. 4. Corner bracket fitting 3000 can be the same as right corner bracket fitting 508 of FIG. 5. Corner bracket fitting 3000 can be the same as at least one of corner bracket fitting 612 of FIG. 6. Corner bracket fitting 3000 can be the same as corner bracket fitting 808 of FIG. 9. Corner bracket fitting 3000 can be the same as corner bracket fitting 906 of FIG. 9. Corner bracket fitting 3000 can be the same as corner bracket fitting 1106 of FIG. 11. Corner bracket fitting 3000 can be the same as right corner bracket fitting 1202 of FIGS. 12-13. Corner bracket fitting 3000 can be the same as corner bracket fitting 1402 of FIGS. 14-15. Corner bracket fitting 3000 can be the same as corner bracket fitting 1802 of FIGS. 18-19.

Figure 31:
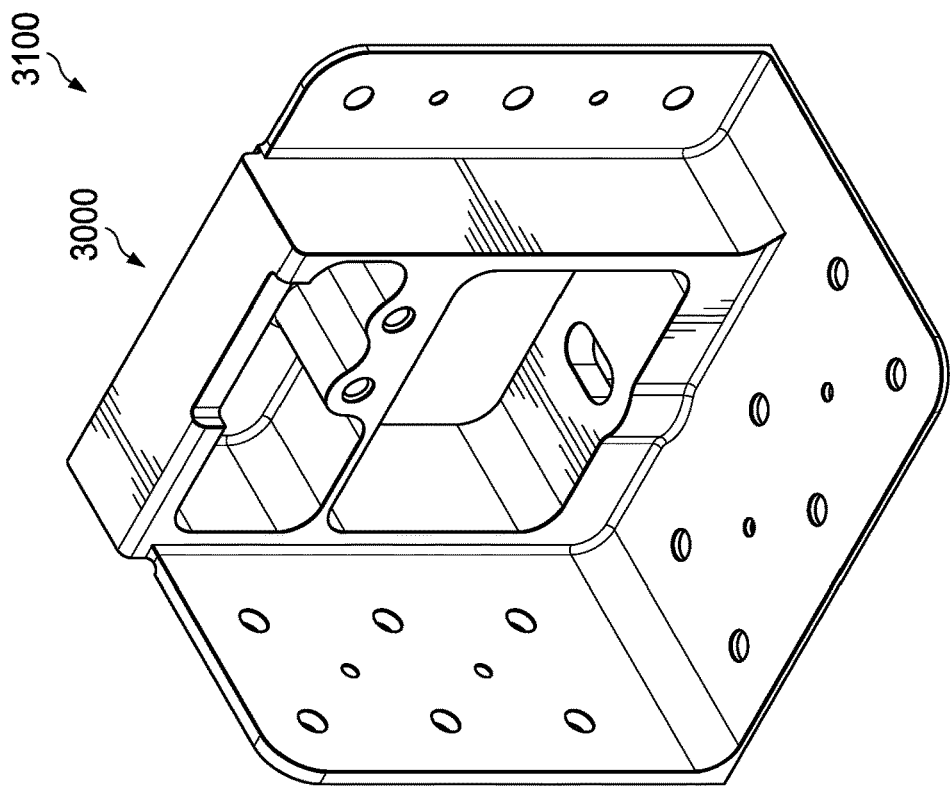
FIG. 31 is an illustration of an upper back perspective view of a corner bracket fitting in accordance with an illustrative embodiment.

Turning to FIG. 31, an illustration of an upper back perspective view of a corner bracket fitting is depicted in accordance with an illustrative embodiment. View 3100 is an upper back perspective view of corner bracket fitting 3000.

Figure 32:
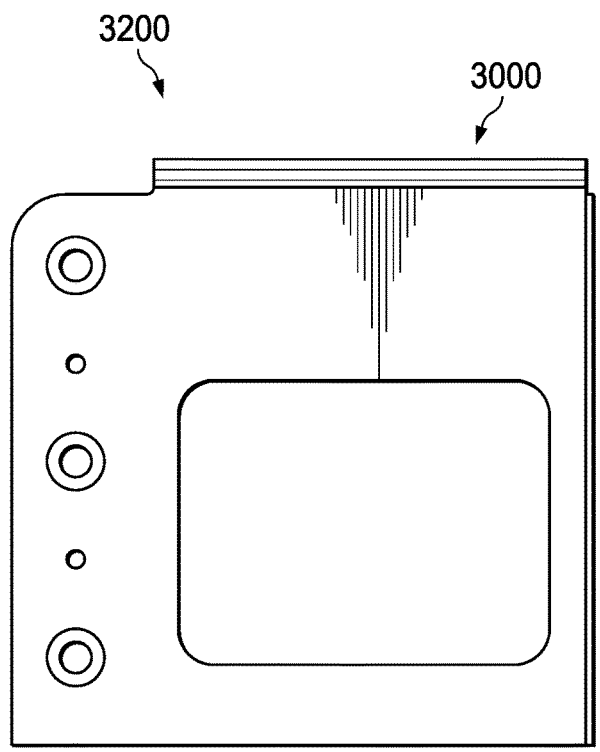
FIG. 32 is an illustration of a front view of a corner bracket fitting in accordance with an illustrative embodiment.

Turning to FIG. 32, an illustration of a front view of a corner bracket fitting is depicted in accordance with an illustrative embodiment. View 3200 is a front view of corner bracket fitting 3000.

Figure 33:
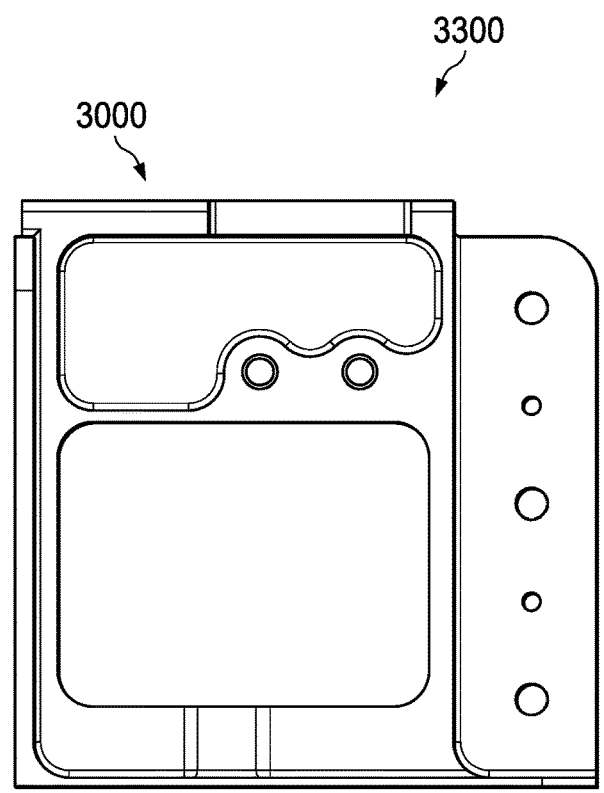
FIG. 33 is an illustration of a back view of a corner bracket fitting in accordance with an illustrative embodiment.

Turning to FIG. 33, an illustration of a back view of a corner bracket fitting is depicted in accordance with an illustrative embodiment. View 3300 is a back view of corner bracket fitting 3000.

Figure 34:
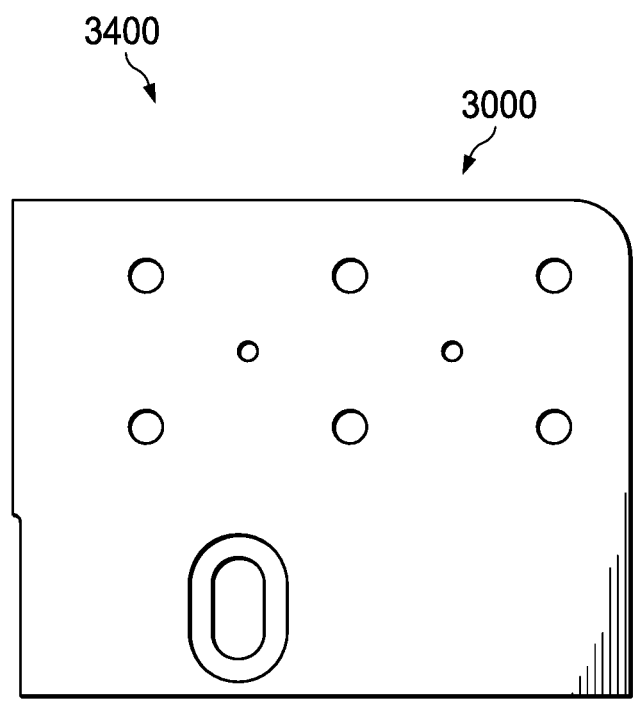
FIG. 34 is an illustration of a bottom view of a corner bracket fitting in accordance with an illustrative embodiment.

Turning to FIG. 34, an illustration of a bottom view of a corner bracket fitting is depicted in accordance with an illustrative embodiment. View 3400 is a bottom view of corner bracket fitting 3000.

Figure 35:
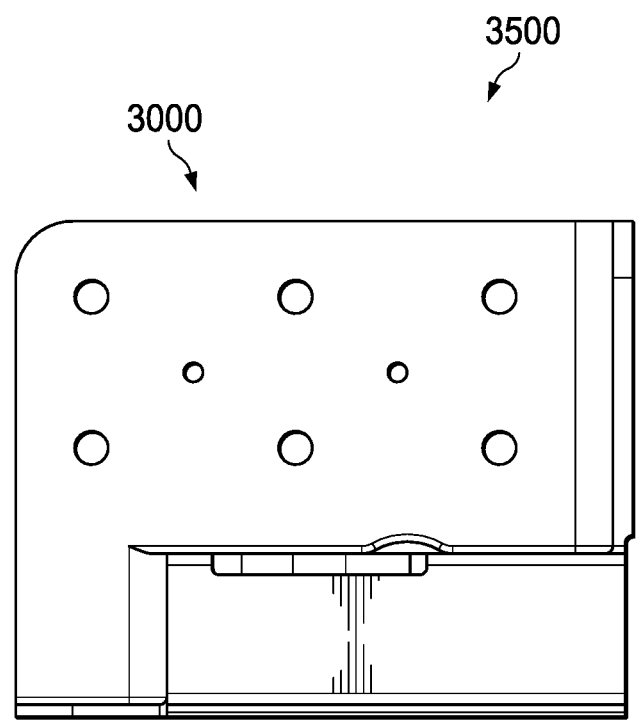
FIG. 35 is an illustration of a top view of a corner bracket fitting in accordance with an illustrative embodiment.

Turning to FIG. 35, an illustration of a top view of a corner bracket fitting is depicted in accordance with an illustrative embodiment. View 3500 is a top view of corner bracket fitting 3000.

Figure 36:
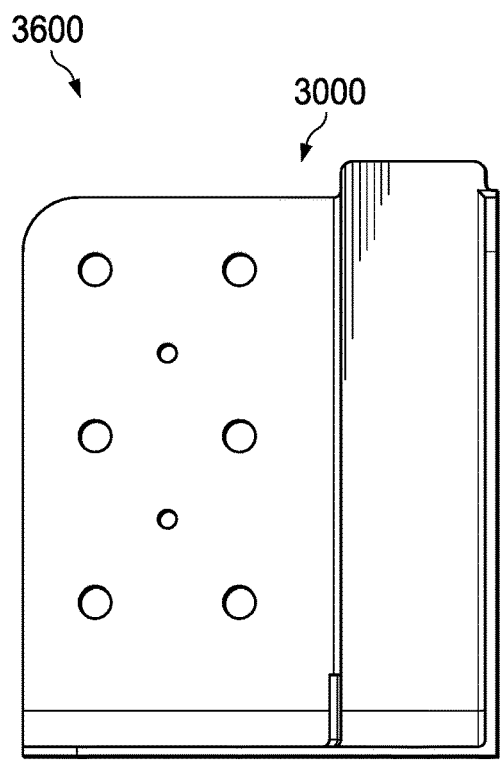
FIG. 36 is an illustration of a left view of a corner bracket fitting in accordance with an illustrative embodiment.

Turning to FIG. 36, an illustration of a left view of a corner bracket fitting is depicted in accordance with an illustrative embodiment. View 3600 is a left view of corner bracket fitting 3000.

Figure 37:
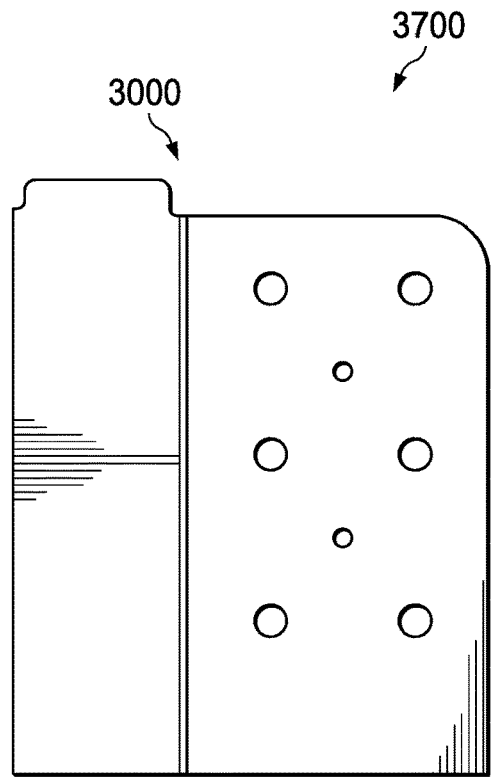
FIG. 37 is an illustration of a right view of a corner bracket fitting in accordance with an illustrative embodiment.

Turning to FIG. 37, an illustration of a right view of a corner bracket fitting is depicted in accordance with an illustrative embodiment. View 3700 is a right view of corner bracket fitting 3000.

Figure 38:
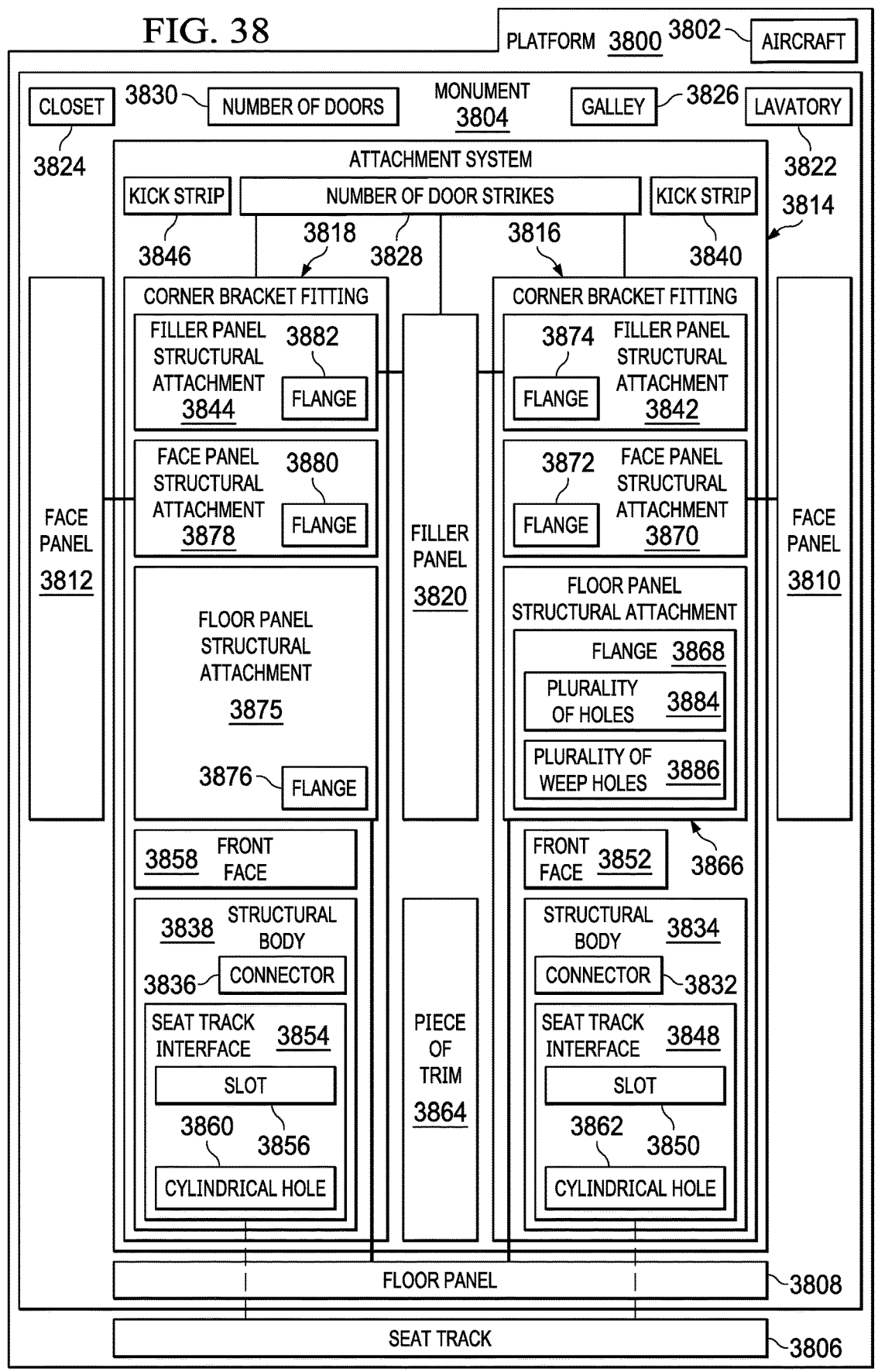
FIG. 38 is an illustration of a block diagram of a platform in which an illustrative embodiment may be implemented.

Turning to FIG. 38, an illustration of a block diagram of a platform is depicted in which an illustrative embodiment may be implemented. In this illustrative example, platform 3800 in FIG. 38 is depicted in a block form to illustrate different components for one or more illustrative embodiments. Platform 3800 takes the form of any desirable vehicle. In some illustrative examples, platform 3800 takes the form of aircraft 3802.

Although illustrative examples in platform 3800 are described with respect to aircraft 3802, an illustrative embodiment may be applied to other vehicles other than aircraft 3802, such as, for example, without limitation, a submarine, a personnel carrier, a tank, a train, an automobile, a bus, a spacecraft, a surface ship, or other suitable vehicles.

Platform 3800 has monument 3804 secured to seat track 3806. Monument 3804 comprises floor panel 3808, face panel 3810 perpendicular to floor panel 3808, face panel 3812 perpendicular to floor panel 3808, and attachment system 3814 connecting floor panel 3808, face panel 3810, and face panel 3812. Attachment system 3814 comprises corner bracket fitting 3816 connecting face panel 3812 to floor panel 3808, corner bracket fitting 3818 connecting face panel 3810 to floor panel 3808, and filler panel 3820 connected to and extending between corner bracket fitting 3816 and corner bracket fitting 3818.

Any of attachment system 308 of FIG. 3, attachment system 406 of FIG. 4, attachment system 506 of FIG. 5, attachment system 608 or attachment system 610 of FIG. 6, attachment system 806 of FIG. 8, attachment system 904 of FIG. 9, attachment system 1104 of FIG. 11, or attachment system 1200 of FIG. 12 can be physical implementations of attachment system 3814. Any of left corner bracket fitting 410 of FIG. 4, left corner bracket fitting 510 of FIG. 5, corner bracket fitting 614 of FIG. 6, corner bracket fitting 626 of FIG. 6, corner bracket fitting 810 of FIG. 8, corner bracket fitting 908 of FIG. 9, corner bracket fitting 1108 of FIG. 11, left corner bracket fitting 1204 of FIG. 12, corner bracket fitting 1400 of FIG. 14, corner bracket fitting 1600 of FIG. 16, corner bracket fitting 1800 of FIG. 18, corner bracket fitting 2000 of FIG. 20, or corner bracket fitting 2200 of FIG. 22 can be physical implementations of corner bracket fitting 3816 or corner bracket fitting 3818. Any of right corner bracket fitting 408 of FIG. 4, right corner bracket fitting 508 of FIG. 5, corner bracket fitting 612 of FIG. 6, corner bracket fitting 624 of FIG. 6, corner bracket fitting 808 of FIG. 8, corner bracket fitting 906 of FIG. 9, corner bracket fitting 1106 of FIG. 11, right corner bracket fitting 1202 of FIG. 12, corner bracket fitting 1402 of FIG. 14, corner bracket fitting 1602 of FIG. 16, corner bracket fitting 1802 of FIG. 18, corner bracket fitting 2002 of FIG. 20 can be physical implementations of corner bracket fitting 3816 or corner bracket fitting 3818.

In some illustrative examples, one of corner bracket fitting 3816 or corner bracket fitting 3818 is referred to as a right corner bracket fitting and the remaining of corner bracket fitting 3816 or corner bracket fitting 3818 is referred to as a left corner bracket fitting. Corner bracket fitting 3816 and corner bracket fitting 3818 are referred to as "right" or "left" based on a location of a respective face panel structural attachment relative to a front face of the respective corner bracket fitting.

Monument 3804 takes any desirable form. In some illustrative examples, monument 3804 is one of lavatory 3822, closet 3824, or galley 3826 of aircraft 3802. Monument 3804 with attachment system 3814 can have a reduced width compared to a monument with conventional attachment systems. In some illustrative examples, monument 3804 with attachment system 3814 is assembled with a reduced amount of time compared to a monument with conventional attachment systems.

In some illustrative examples, attachment system 3814 further comprises number of door strikes 3828 connected to one of corner bracket fitting 3816, corner bracket fitting 3818, or filler panel 3820. Number of door strikes 3828 interfaces with number of doors 3830 of monument 3804. Number of doors 3830 is parallel to filler panel 3820. Number of doors 3830 is configured to interact with number of door strikes 3828. When number of doors 3830 is a single door, number of door strikes 3828 is a single door strike.

In some illustrative examples, number of door strikes 3828 is a single door strike connected to connector 3832 of structural body 3834 of right corner bracket fitting 3816. Connector 3832 is configured to connect to a door strike. Connector 3832 is a built-in door strike provision. Connector 3832 accommodates forward or aft doors. In some illustrative examples, connector 3832 includes a number of tapped holes to receive a number of helical coils. When present, the number of tapped holes receives a number of helical coils to allow a door strike to be mechanically fastened to corner bracket fitting 3816.

In some illustrative examples, number of door strikes 3828 is a single door strike connected to connector 3836 of structural body 3838 of corner bracket fitting 3818. Connector 3836 is configured to connect to a door strike. Connector 3836 is a built-in door strike provision. Connector 3836 accommodates forward or aft doors. In some illustrative examples, connector 3836 includes a number of tapped holes to receive a number of helical coils. When present, the number of tapped holes receives a number of helical coils to allow a door strike to be mechanically fastened to corner bracket fitting 3818.

In some illustrative examples, number of doors 3830 includes two doors. In some illustrative examples, when number of doors 3830 includes two doors, number of door strikes 3828 includes two door strikes connected to filler panel 3820.

In some illustrative examples, corner bracket fitting 3816, corner bracket fitting 3818, and filler panel 3820 are left visible in monument 3804. In some illustrative examples, corner bracket fitting 3816, corner bracket fitting 3818, and filler panel 3820 are treated to improve aesthetics. In some illustrative examples, each of corner bracket fitting 3816, corner bracket fitting 3818, and filler panel 3820 has a decorative finish.

In some illustrative examples, attachment system 3814 of monument 3804 further comprises kick strip 3840 covering a front face of each of corner bracket fitting 3816, corner bracket fitting 3818, and filler panel 3820. The front face of each of corner bracket fitting 3816 and corner bracket fitting 3818 is formed by a respective structural body and a respective filler panel structural attachment. For example, a front face of corner bracket fitting 3816 is formed by structural body 3834 and filler panel structural attachment 3842. As another example, a front face of corner bracket fitting 3818 is formed by structural body 3838 and filler panel structural attachment 3844.

In some illustrative examples, attachment system 3814 further comprises kick strip 3846 covering a back face of each of filler panel 3820 and respective structural bodies of corner bracket fitting 3818 and corner bracket fitting 3816. For example, kick strip 3846 can cover a back face of filler panel 3820, structural body 3834 of corner bracket fitting 3816, and structural body 3838 of corner bracket fitting 3818.

Right corner bracket fitting 3816 and corner bracket fitting 3818 each has a seat track interface. Corner bracket fitting 3816 has seat track interface 3848. In some illustrative examples, seat track interface 3848 of corner bracket fitting 3816 takes the form of slot 3850. In this illustrative example, slot 3850 extends perpendicular to front face 3852 of corner bracket fitting 3816. When slot 3850 extends perpendicular to front face 3852, the major axis of slot 3850 is perpendicular to front face 3852.

Corner bracket fitting 3818 has seat track interface 3854. In some illustrative examples, seat track interface 3854 of corner bracket fitting 3818 takes the form of slot 3856. In this illustrative example, slot 3856 extends perpendicular to front face 3858 of corner bracket fitting 3818. When slot 3856 extends perpendicular to front face 3858, the major axis of slot 3856 is perpendicular to front face 3858.

In some illustrative examples when seat track interface 3848 takes the form of slot 3850, seat track interface 3854 takes the form of cylindrical hole 3860. When seat track interface 3854 takes the form of cylindrical hole 3860, seat track interface 3854 shares a load through seat track 3806.

In some illustrative examples when seat track interface 3854 takes the form of slot 3856, seat track interface 3848 takes the form of cylindrical hole 3862. When seat track interface 3848 takes the form of cylindrical hole 3862, seat track interface 3848 shares a load through seat track 3806.

Attachment system 3814 comprises corner bracket fitting 3816 configured to be joined to and connect face panel 3810 to floor panel 3808, corner bracket fitting 3818 configured to be joined to and connect face panel 3812 to floor panel 3808; and filler panel 3820 configured to be connected to and extend between corner bracket fitting 3816 and corner bracket fitting 3818.

In some illustrative examples, attachment system 3814 further comprises components to obscure at least a portion of at least one of corner bracket fitting 3816, corner bracket fitting 3818, or filler panel 3820. In some illustrative examples, attachment system 3814 includes piece of trim 3864 configured to cover a top face of each of the two corner bracket fittings, corner bracket fitting 3816 and corner bracket fitting 3818, and filler panel 3820.

In some illustrative examples, attachment system 3814 further comprises kick strip 3840. In these illustrative examples, kick strip 3840 is configured to cover a front face of each of corner bracket fitting 3816, corner bracket fitting 3818, and filler panel 3820. In some illustrative examples, attachment system 3814 further comprises kick strip 3846. In these illustrative examples, kick strip 3846 is configured to cover a back face of each of filler panel 3820 and respective structural bodies of corner bracket fitting 3818 and corner bracket fitting 3816.

Number of door strikes 3828 is configured to be connected to one of corner bracket fitting 3816, corner bracket fitting 3818, or filler panel 3820. Each of number of door strikes 3828 could be connected to any of corner bracket fitting 3816, corner bracket fitting 3818, or filler panel 3820. In some illustrative examples, number of door strikes 3828 is installed over kick strip 3846.

In some illustrative examples, corner bracket fitting 3816 comprises structural body 3834 with seat track interface 3848 comprising slot 3850 extending perpendicular to front face 3852 of corner bracket fitting 3816; floor panel structural attachment 3866 comprising flange 3868 extending from structural body 3834 in a direction parallel to the slot 3850; face panel structural attachment 3870 comprising flange 3872 extending from structural body 3834 and substantially perpendicular to floor panel structural attachment 3866; and filler panel structural attachment 3842 comprising flange 3874 extending from structural body 3834 and substantially perpendicular to both face panel structural attachment 3870 and floor panel structural attachment 3866.

In some illustrative examples, floor panel structural attachment 3866 further comprises plurality of holes 3884 in flange 3868 configured to receive a plurality of fasteners. In these illustrative examples, the plurality of fasteners connects corner bracket fitting 3816 to floor panel 3808.

In some illustrative examples, floor panel structural attachment 3866 further comprises plurality of weep holes 3886. The plurality of weep holes allows for adhesive to flow from between floor panel structural attachment 3866 and floor panel 3808.

In some illustrative examples, face panel structural attachment 3870 further comprises a plurality of holes (not depicted) in flange 3872 configured to receive a plurality of fasteners. In these illustrative examples, the plurality of fasteners connects corner bracket fitting 3816 to face panel 3810.

In some illustrative examples, face panel structural attachment 3870 further comprises a plurality of weep holes (not depicted). The plurality of weep holes allows for adhesive to flow from between face panel structural attachment 3870 and face panel 3810.

In some illustrative examples, filler panel structural attachment 3842 further comprises a plurality of holes (not depicted) in flange 3874 configured to receive a plurality of fasteners. In these illustrative examples, the plurality of fasteners connects corner bracket fitting 3816 to filler panel 3820.

In some illustrative examples, filler panel structural attachment 3842 further comprises a plurality of weep holes. The plurality of weep holes (not depicted) allows for adhesive to flow from between filler panel structural attachment 3842 and filler panel 3820.

In some illustrative examples, corner bracket fitting 3818 comprises structural body 3838 with seat track interface 3854 comprising slot 3856 extending perpendicular to front face 3858 of corner bracket fitting 3818; floor panel structural attachment 3875 comprising flange 3876 extending from structural body 3838 in a direction parallel to the slot 3856; face panel structural attachment 3878 comprising flange 3880 extending from structural body 3838 and substantially perpendicular to floor panel structural attachment 3875; and filler panel structural attachment 3844 comprising flange 3882 extending from structural body 3838 and substantially perpendicular to both face panel structural attachment 3878 and floor panel structural attachment 3875.

In some illustrative examples, floor panel structural attachment 3875 further comprises a plurality of holes (not depicted) in flange 3876 configured to receive a plurality of fasteners. In these illustrative examples, the plurality of fasteners connects corner bracket fitting 3818 to floor panel 3808.

In some illustrative examples, floor panel structural attachment 3875 further comprises a plurality of weep holes (not depicted). The plurality of weep holes allows for adhesive to flow from between floor panel structural attachment 3875 and floor panel 3808.

In some illustrative examples, face panel structural attachment 3878 further comprises a plurality of holes (not depicted) in flange 3880 configured to receive a plurality of fasteners. In these illustrative examples, the plurality of fasteners connects corner bracket fitting 3818 to face panel 3812.

In some illustrative examples, face panel structural attachment 3878 further comprises a plurality of weep holes (not depicted). The plurality of weep holes allows for adhesive to flow from between face panel structural attachment 3878 and face panel 3812.

In some illustrative examples, filler panel structural attachment 3844 further comprises a plurality of holes (not depicted) in flange 3882 configured to receive a plurality of fasteners. In these illustrative examples, the plurality of fasteners connects corner bracket fitting 3818 to filler panel 3820.

In some illustrative examples, filler panel structural attachment 3844 further comprises a plurality of weep holes (not depicted). The plurality of weep holes allows for adhesive to flow from between filler panel structural attachment 3844 and filler panel 3820.

The illustration of monument 3804 having attachment system 3814 in FIG. 38 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, kick strip 3840 or kick strip 3846 is optional. In other illustrative examples number of doors 3830 and number of door strikes 3828 are optional. As another example, although only plurality of holes 3884 and plurality of weep holes 3886 are depicted, at least one of a plurality of holes or a plurality of weep holes can be present in at least one of face panel structural attachment 3870, filler panel structural attachment 3842, filler panel structural attachment 3844, face panel structural attachment 3878, or floor panel structural attachment 3875. As yet another example, although plurality of weep holes 3886 are depicted, in other illustrative examples plurality of weep holes 3886 are not present.

Figure 39:
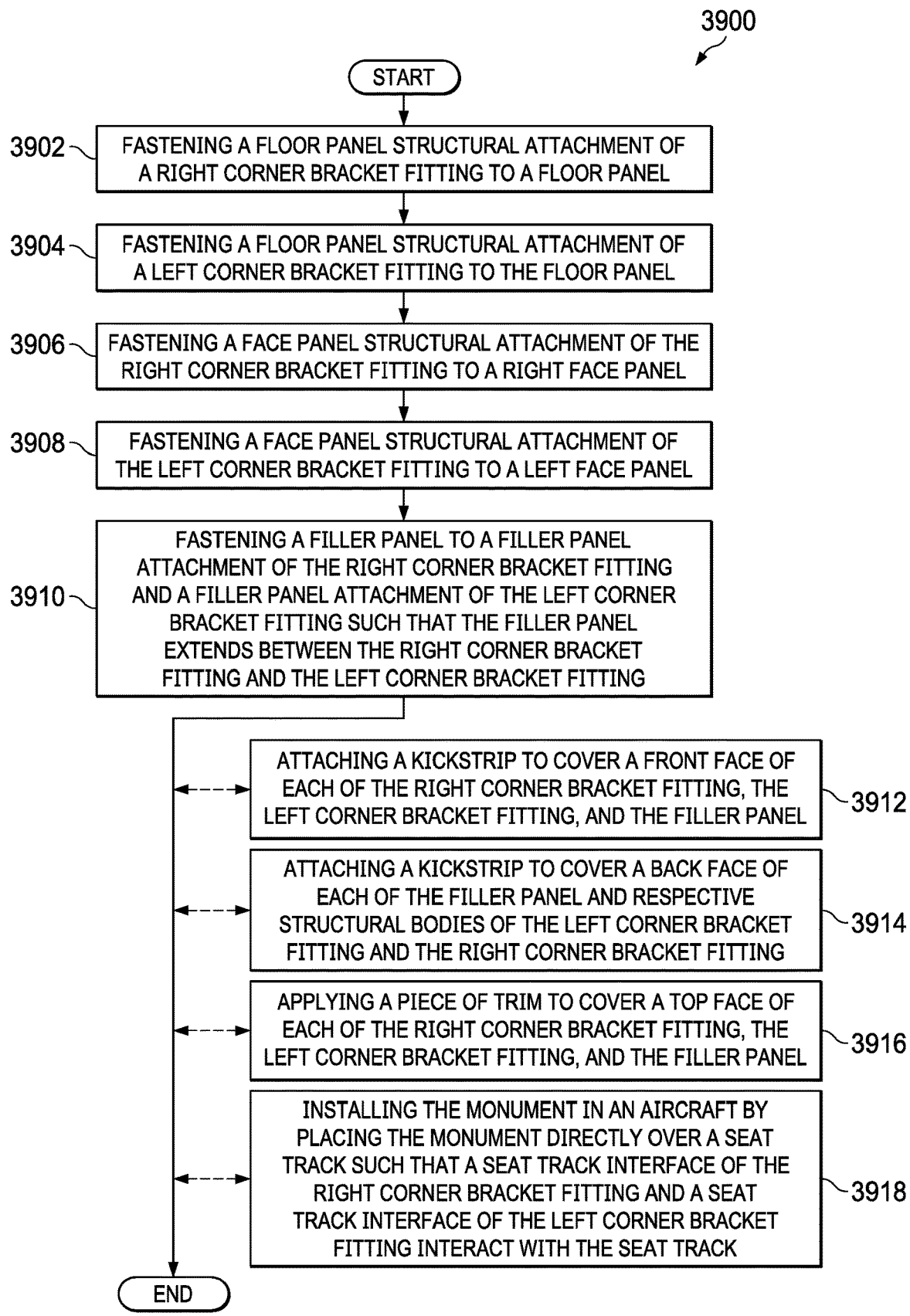
FIG. 39 is a flowchart of a method of forming a monument in accordance with an illustrative embodiment.

Turning to FIG. 39, an illustration of a flowchart of a method of forming a monument is depicted in accordance with an illustrative embodiment. Method 3900 can be used to form a monument secured in body 106 of aircraft 100 of FIG. 1. Method 3900 can be used to form monument 202 of FIG. 2. Method 3900 can be used to form monument 300 of FIG. 3. Method 3900 can be used to form monument 402 of FIG. 4. Method 3900 can be used to form monument 502 of FIG. 5. Method 3900 can be used to form monument 602 of FIGS. 6 and 7. Method 3900 can be used to form monument 802 of FIG. 8. Method 3900 can be used to form monument 902 of FIGS. 9 and 10. Method 3900 can be used to form monument 1102 of FIG. 11. Method 3900 can be performed using attachment system 1200 of FIGS. 12 and 13. Method 3900 can be performed using corner bracket fitting 1400 and corner bracket fitting 1402 of FIGS. 14 and 15. Method 3900 can be performed using corner bracket fitting 1600 and corner bracket fitting 1602 of FIGS. 16 and 17. Method 3900 can be performed using corner bracket fitting 1800 and corner bracket fitting 1802 of FIGS. 18 and 19. Method 3900 can be performed using corner bracket fitting 2200 of FIGS. 22-28. Method 3900 can be used to form monument 3804 of FIG. 38.

Method 3900 fastens a floor panel structural attachment of a right corner bracket fitting to a floor panel (operation 3902). In some illustrative examples, the floor panel structural attachment is fastened to the floor panel by sending a plurality of fasteners through a plurality of holes of the floor panel structural attachment. In some illustrative examples, the floor panel structural attachment is a flange extending out from a structural body of the right corner bracket fitting.

Method 3900 fastens a floor panel structural attachment of a left corner bracket fitting to the floor panel (operation 3904). In some illustrative examples, the floor panel structural attachment is fastened to the floor panel by sending a plurality of fasteners through a plurality of holes of the floor panel structural attachment. In some illustrative examples, the floor panel structural attachment is a flange extending out from a structural body of the left corner bracket fitting.

Method 3900 fastens a face panel structural attachment of the right corner bracket fitting to a right face panel (operation 3906). In some illustrative examples the face panel structural attachment is a flange extending out from the structural body of the right corner bracket fitting perpendicular to the floor panel structural attachment. In some illustrative examples, the face panel structural attachment is fastened to the face panel by sending a plurality of fasteners through a plurality of holes of the face panel structural attachment.

Method 3900 fastens a face panel structural attachment of the left corner bracket fitting to a left face panel (operation 3908). In some illustrative examples the face panel structural attachment is a flange extending out from the structural body of the left corner bracket fitting perpendicular to the floor panel structural attachment. In some illustrative examples, the face panel structural attachment is fastened to the face panel by sending a plurality of fasteners through a plurality of holes of the face panel structural attachment.

Method 3900 fastens a filler panel to a filler panel attachment of the right corner bracket fitting and a filler panel attachment of the left corner bracket fitting such that the filler panel extends between the right corner bracket fitting and the left corner bracket fitting (operation 3910). Afterwards, the method terminates.

In some illustrative examples, method 3900 attaches a kick strip to cover a front face of each of the right corner bracket fitting, the left corner bracket fitting, and the filler panel (operation 3912). In some illustrative examples, the kick strip is attached using an adhesive. In some illustrative examples, method 3900 attaches a kick strip to cover a back face of each of the filler panel and respective structural bodies of the left corner bracket fitting and the right corner bracket fitting (operation 3914). In some illustrative examples, the kick strip is attached using an adhesive.

In some illustrative examples, method 3900 applies a piece of trim to cover a top face of each of the right corner bracket fitting, the left corner bracket fitting, and the filler panel (operation 3916). In some illustrative examples, the trim is adhered to the top face of each of the right corner bracket fitting, the left corner bracket fitting, and the filler panel.

In some illustrative examples, method 3900 installs the monument in an aircraft by placing the monument directly over a seat track such that a seat track interface of the right corner bracket fitting and a seat track interface of the left corner bracket fitting interact with the seat track (operation 3918). In particular, to prevent undesirable load sharing with the floor structure, the fittings on one side of the closet do not carry load in the y-direction. To prevent undesirable load sharing with the floor structure, one of the right corner bracket fitting or the left corner bracket fitting does not carry load in the y-direction due to a slot in the seat track interface.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 3912 through operation 3918 may be optional.

Figure 40:
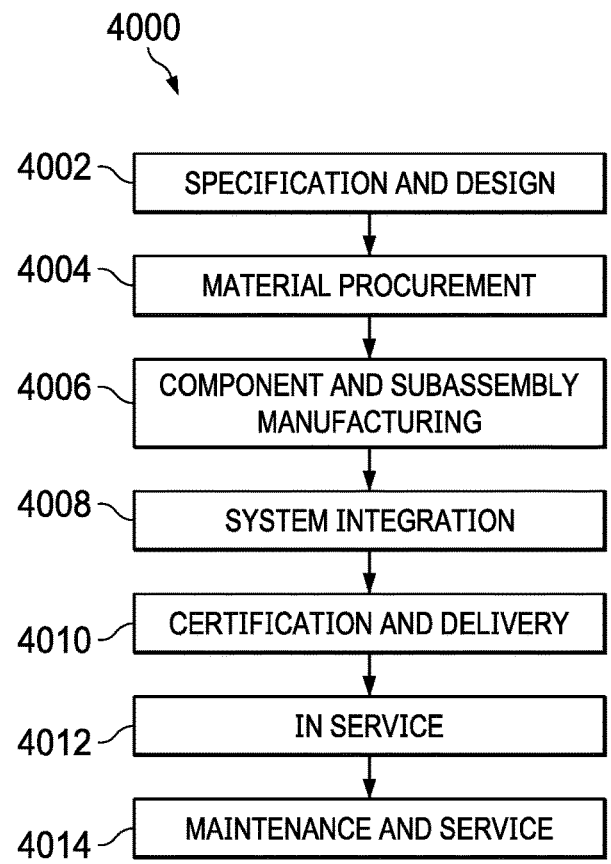
FIG. 40 is an illustration of an aircraft manufacturing and service method in a form of a block diagram in accordance with an illustrative embodiment.
Figure 41:
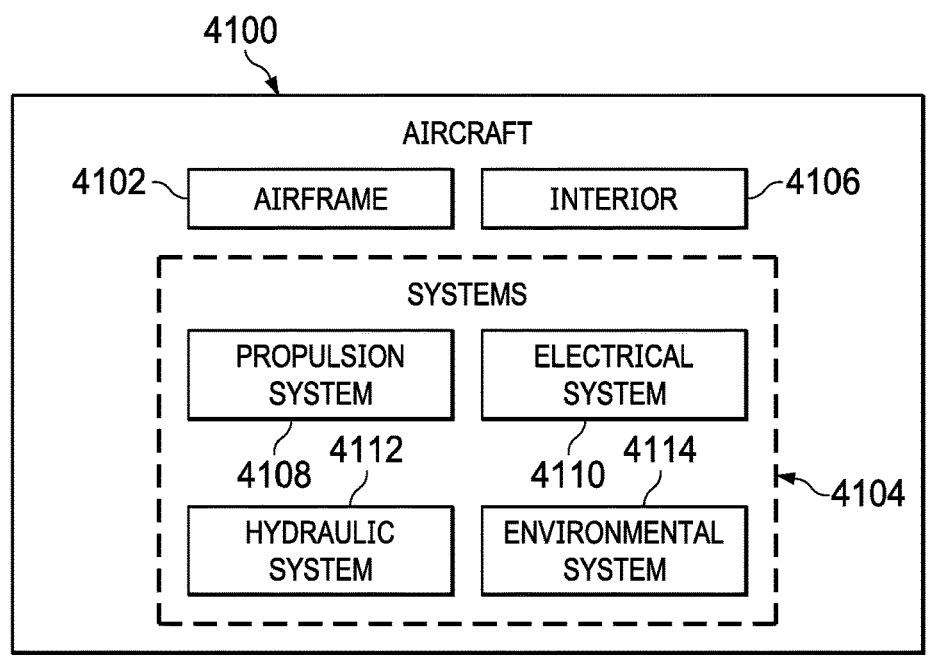
FIG. 41 is an illustration of an aircraft in a form of a block diagram in which an illustrative embodiment may be implemented.

Illustrative embodiments of the present disclosure may be described in the context of aircraft manufacturing and service method 4000 as shown in FIG. 40 and aircraft 4100 as shown in FIG. 41. Turning first to FIG. 40, an illustration of an aircraft manufacturing and service method is depicted in accordance with an illustrative embodiment. During pre-production, aircraft manufacturing and service method 4000 may include specification and design 4002 of aircraft 4100 in FIG. 41 and material procurement 4004.

During production, component and subassembly manufacturing 4006 and system integration 4008 of aircraft 4100 takes place. Thereafter, aircraft 4100 may go through certification and delivery 4010 in order to be placed in service 4012. While in service 4012 by a customer, aircraft 4100 is scheduled for routine maintenance and service 4014, which may include modification, reconfiguration, refurbishment, or other maintenance and service.

Each of the processes of aircraft manufacturing and service method 4000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 41, an illustration of an aircraft is depicted in which an illustrative embodiment may be implemented. In this example, aircraft 4100 is produced by aircraft manufacturing and service method 4000 of FIG. 40 and may include airframe 4102 with plurality of systems 4104 and interior 4106. Examples of systems 4104 include one or more of propulsion system 4108, electrical system 4110, hydraulic system 4112, and environmental system 4114. Any number of other systems may be included.

Apparatuses and methods embodied herein may be employed during at least one of the stages of aircraft manufacturing and service method 4000. One or more illustrative embodiments may be used during component and subassembly manufacturing 4006, system integration 4008, in service 4012, or maintenance and service 4014 of FIG. 40. For example, monument 3804 with attachment system 3814 can be assembled during component and subassembly manufacturing 4006. Monument 3804 with attachment system 3814 can be attached to seat track 3806 of aircraft 3802 during one of component and subassembly manufacturing 4006 or system integration 4008. Monument 3804 taking the form of closet 3824, galley 3826, or lavatory 3822 is utilized by a passenger or crew member while aircraft 4100 is in service 4012. Method 3900 can be used to form monument 3804 during component and subassembly manufacturing 4006.

The illustrative examples provide an attachment system that allows for placement of a monument directly over a seat track. The attachment system and corner bracket fittings of the illustrative examples can be used for centerline or outboard monuments on an aircraft.

The attachment systems of the illustrative examples can accommodate multiple door configurations. The attachment systems of the illustrative examples can accommodate varying monument widths. The attachment systems of the illustrative examples can accommodate changes to a door configuration of a monument width with minimal impact.

The corner bracket fittings of the illustrative examples are engineered to allow flexibility and re-usability. The corner bracket fittings of the illustrative examples are engineered to allow for decreased width monuments with aisle placement directly over seat track locations. In some illustrative examples, the interior of the monument is completely closed out for aesthetics and cleanability.

In the attachment system, the number of door strikes is designed for forward (FWD) or aft (AFT) placement. The number of door strikes can be located on the filler panel for double door configurations.

A unique structural attachment system was developed to allow installation of a closet with an aisle face lying directly above a seat track with access to the stowage area through the aisle face. This arrangement allows for a family of closets with reduced overall width in comparison to existing designs. The attachment system is designed to transfer load from the face and floor panels of the monument into the seat track below. The design of the fitting system supports varying monument sizes in addition to forward swinging, aft swinging, and double door configurations.

In some illustrative examples, the attachment system incorporates standard thin profile kick strips to provide closeout for at least one of sanitary or decorative purposes. In some illustrative examples, the attachment system is designed to work with existing decorative trims.

The attachment systems of the illustrative examples can provide multiple load carrying configurations. In some illustrative examples, to prevent undesirable load sharing with the floor structure, at least one corner bracket fitting of the monument does not carry load in the y-direction. In these illustrative examples, the at least one corner bracket fitting has a slot that is configured to not carry load in the y-direction. In the corner bracket fittings of the illustrative examples, the direction of slotting is perpendicular to the fitting body. The direction of the slotting on the corner bracket fittings of the illustrative examples is unique.

The attachment system of the illustrative examples will allow closets with reduced width while utilizing a common set of standard parts. The design of the attachment system of the illustrative examples reduces the overall number of components and time to assemble the monument.

A corner bracket fitting of the attachment system attaches a bottom corner of an aircraft monument to the floor of an aircraft. The corner bracket fitting comprises a floor panel component sized to fit over a portion of a seat floor rail; a filler panel component attached to the floor panel; a frame attached to the face panel and floor panel component; and a face panel component attached to the floor panel component. In some illustrative examples, the attachment system also comprises a door strike component attached to the frame.

The attachment system attaches a reduced width monument to the floor of an aircraft. In some illustrative examples forming the monument comprises attaching at least two corner bracket fittings to the opposing bottom corners of the door facing panel of the monument.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A monument comprising:
a floor panel;
a left face panel perpendicular to the floor panel;
a right face panel perpendicular to the floor panel; and
an attachment system connecting the floor panel, the left face panel, and the right face panel, the attachment system comprising:
  a right corner bracket fitting connecting the right face panel to the floor panel;
  a left corner bracket fitting connecting the left face panel to the floor panel; and
  a filler panel connected to and extending between the right corner bracket fitting and the left corner bracket fitting,
wherein at least one of the right corner bracket fitting and the left corner bracket fitting comprises a slot extending perpendicular to a front face of the at least one of the right corner bracket fitting or the left corner bracket fitting, wherein the at least one of the right corner bracket fitting and the left corner bracket fitting does not carry load in a direction parallel to the slot direction, and the slot is present to prevent undesirable load sharing with a floor structure.

2. The monument of claim 1 further comprising:
a kick strip covering a front face of each of the right corner bracket fitting, the left corner bracket fitting, and the filler panel.

3. The monument of claim 2, wherein the front face of each of the right corner bracket fitting and the left corner bracket fitting is formed by a respective structural body and a respective filler panel structural attachment.

4. The monument of claim 3 further comprising:
a kick strip covering a back face of each of the filler panel and respective structural bodies of the left corner bracket fitting and the right corner bracket fitting.

5. The monument of claim 1 further comprising a number of door strikes connected to one of the right corner bracket fitting, the left corner bracket fitting, or the filler panel.

6. The monument of claim 5 further comprising a number of doors parallel to the filler panel, the number of doors configured to interact with the number of door strikes.

7. The monument of claim 1, wherein the right corner bracket fitting and the left corner bracket fitting each has a seat track interface, wherein the respective seat track interface of at least one of the right corner bracket fitting or the left corner bracket fitting comprises a slot extending perpendicular to a respective front face of the right corner bracket fitting or the left corner bracket fitting.

8. The monument of claim 1, wherein the monument is one of a galley, a closet, or a lavatory.

9. The monument of claim 1 further comprising a plurality of fasteners and an adhesive securing the left corner bracket fitting to the left face panel and the floor panel.

10. The monument of claim 1, wherein each of the right corner bracket fitting and the left corner bracket fitting comprises:
a respective structural body with a seat track interface;
a respective floor panel structural attachment comprising a flange extending from the respective structural body;
a respective face panel structural attachment comprising a flange extending from the respective structural body and substantially perpendicular to the respective floor panel structural attachment; and
a respective filler panel structural attachment comprising a flange extending from the respective structural body and substantially perpendicular to both the respective face panel structural attachment and the respective floor panel structural attachment.

11. The attachment system of claim 1 further comprising:
a piece of trim configured to cover a top face of each of the right corner bracket fitting, the left corner bracket fitting, and the filler panel.

12. An attachment system comprising:
a right corner bracket fitting configured to be joined to and connect a right face panel to a floor panel;
a left corner bracket fitting configured to be joined to and connect a left face panel to the floor panel; and
a filler panel configured to be connected to and extend between the right corner bracket fitting and the left corner bracket fitting,
wherein at least one of the right corner bracket fitting and the left corner bracket fitting comprises a slot extending perpendicular to a front face of the at least one of the right corner bracket fitting or the left corner bracket fitting, wherein the at least one of the right corner bracket fitting and the left corner bracket fitting does not carry load in a direction parallel to the slot direction, and the slot is present to prevent undesirable load sharing with a floor structure.

13. The attachment system of claim 12 further comprising:
a piece of trim configured to cover a top face of each of the right corner bracket fitting, the left corner bracket fitting, and the filler panel.

14. The attachment system of claim 12 further comprising:
a kick strip configured to cover a front face of each of the right corner bracket fitting, the left corner bracket fitting, and the filler panel.

15. The attachment system of claim 14, wherein the front face of each of the right corner bracket fitting and the left corner bracket fitting is formed by a respective structural body and a respective filler panel structural attachment.

16. The attachment system of claim 15 further comprising:
a kick strip configured to cover a back face of each of the filler panel and respective structural bodies of the left corner bracket fitting and the right corner bracket fitting.

17. The attachment system of claim 12 further comprising:
a number of door strikes configured to be connected to one of the right corner bracket fitting, the left corner bracket fitting, or the filler panel.

18. The attachment system of claim 12, wherein the right corner bracket fitting and the left corner bracket fitting each has a seat track interface, wherein the respective seat track interface of at least one of the right corner bracket fitting or the left corner bracket fitting comprises a slot extending perpendicular to a respective front face of the right corner bracket fitting or the left corner bracket fitting.

19. A corner bracket fitting comprising:
a structural body with a seat track interface;
a floor panel structural attachment comprising a first flange extending from the structural body;
a face panel structural attachment comprising a second flange extending from the structural body and substantially perpendicular to the floor panel structural attachment; and
a filler panel structural attachment comprising a flange extending from the structural body and substantially perpendicular to both the face panel structural attachment and the floor panel structural attachment,
wherein the seat track interface comprises a slot extending perpendicular to a front face of the corner bracket fitting, and wherein the first flange of the floor panel structural attachment extends from the structural body in a direction parallel to the slot, wherein the corner bracket fitting does not carry load in the direction parallel to the slot direction, and the slot is present to prevent undesirable load sharing with a floor structure.

20. The corner bracket fitting of claim 19, wherein the floor panel structural attachment further comprises a plurality of holes in the first flange configured to receive a plurality of fasteners.

21. The corner bracket fitting of claim 20, wherein the floor panel structural attachment further comprises a plurality of weep holes.

22. The corner bracket fitting of claim 19, wherein the floor panel structural attachment further comprises a plurality of weep holes.

23. The corner bracket fitting of claim 19, wherein the structural body further comprises a connector configured to connect to a door strike.

24. The corner bracket fitting of claim 23, wherein the connector includes a number of tapped holes to receive a number of helical coils.

25. A method of forming a monument, the method comprising:
fastening a floor panel structural attachment of a right corner bracket fitting to a floor panel;
fastening a floor panel structural attachment of a left corner bracket fitting to the floor panel;
fastening a face panel structural attachment of the right corner bracket fitting to a right face panel;
fastening a face panel structural attachment of the left corner bracket fitting to a left face panel; and
fastening a filler panel to a filler panel attachment of the right corner bracket fitting and a filler panel attachment of the left corner bracket fitting such that the filler panel extends between the right corner bracket fitting and the left corner bracket fitting
wherein at least one of the right corner bracket fitting and the left corner bracket fitting comprises a slot extending perpendicular to a front face of the at least one of the right corner bracket fitting or the left corner bracket fitting, wherein the at least one of the right corner bracket fitting and the left corner bracket fitting does not carry load in a direction parallel to the slot direction, and the slot is present to prevent undesirable load sharing with a floor structure.

26. The method of claim 25 further comprising:
attaching a kick strip to cover a front face of each of the right corner bracket fitting, the left corner bracket fitting, and the filler panel; and
attaching a kick strip to cover a back face of each of the filler panel and respective structural bodies of the left corner bracket fitting and the right corner bracket fitting.

27. The method of claim 25 further comprising:
applying a piece of trim to cover a top face of each of the right corner bracket fitting, the left corner bracket fitting, and the filler panel.

28. The method of claim 25 further comprising:
installing the monument in an aircraft by placing the monument directly over a seat track such that a seat track interface of the right corner bracket fitting and a seat track interface of the left corner bracket fitting interact with the seat track.

* * * * *